United States Patent [19]
Borbas et al.

[11] 3,965,458
[45] June 22, 1976

[54] CENTRAL PROCESSOR FOR A TELEPHONE EXCHANGE

[75] Inventors: Robert A. Borbas; John P. Dufton, both of Brockville; James H. Foster, Smithsfalls; Jeffrey W. Siegel, Brockville, all of Canada

[73] Assignee: GTE Automatic Electric (Canada) Limited, Brockville, Canada

[22] Filed: Sept. 27, 1974

[21] Appl. No.: 510,092

[52] U.S. Cl. .......................... 340/172.5; 179/18 ES
[51] Int. Cl.[2] ...................... H04Q 3/54; G06F 9/06
[58] Field of Search ............... 340/172.5; 179/18 ES

[56] References Cited
UNITED STATES PATENTS

| | | | |
|---|---|---|---|
| 3,094,610 | 6/1963 | Humphrey, Jr. et al. ........ | 340/172.5 |
| 3,614,741 | 10/1971 | McFarland, Jr. et al. ....... | 340/172.5 |
| 3,644,901 | 2/1972 | Zingg .............................. | 349/172.5 |
| 3,662,349 | 5/1972 | Bartlett et al. ................... | 340/172.5 |
| 3,812,297 | 5/1974 | Borbas ............................. | 179/18 ES |
| 3,820,084 | 6/1974 | Jones et al. ...................... | 340/172.5 |

*Primary Examiner*—Gareth D. Shaw
*Assistant Examiner*—C. J. Bartz
*Attorney, Agent, or Firm*—Richard O. Gray, Jr.

[57] ABSTRACT

A central processor for controlling the operation of the subsystems of a telephone exchange switching system which are interconnected on a common data bus to establish requested service between telephone subscribers, wherein the exchange system includes a program memory also connected to the common data bus for storing a plurality of selectable multiple bit operational codes to be utilized by the central processor in response to a particular service being requested, a program address register for selecting a desired operational code from the program memory, an instruction register for storing the selected operational codes and a control word generator which provides function control signals in response to the particular operational codes stored in the instruction register. A bit time counter coupled to the control word generator controls the timing of the central processor so that the function control signals are supplied in proper time sequence. The central processor additionally includes an arithmetic logic unit which is responsive to the function control signals to perform the required logic and arithmetic functions as dictated by the selected operational code. Temporary stores are also provided and a bus address register provides storage of a particular address of a subsystem to receive the data produced by the arithmetic logic unit.

21 Claims, 41 Drawing Figures

FIG.2

| IR Bits | | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|---|
| (a) OP-0 | Branch to Subroutine | 0 | 0 | 0 | 0 | | | | | | ADR | | | | | | | | | | |
| (b) OP-1 | Compare | 0 | 0 | 0 | 1 | ACY | | | | | | | CA | | | | | | | | |
| (c) OP-2 | Mask | 0 | 0 | 1 | 0 | ACY | | | | | | | CA | | | | | | | | |
| (d) OP-3 | Superimpose | 0 | 0 | 1 | 1 | ACY | | | | | | | CA | | | | | | | | |
| (e) OP-6 | Byte Test | 0 | 1 | 1 | 0 | S | BYTE | | | | MK | | | COMP | | | ACY | | | | |
| (f) OP-7 | Byte Set | 0 | 1 | 1 | 1 | S | BYTE | | | | MK | | | SUPER | | | ACY | | | | |
| (g) OP-8 | Data Handling | 1 | 0 | 0 | 0 | M | F | | | | P | | | ACX | | | ACY | | | | |
| (h) OP-9 | Scan | 1 | 0 | 0 | 1 | I | C | | | | P1 | | | P2 | | | ACY | | | | |
| (i) OP-0 | Rotate Right | 1 | 0 | 1 | 0 | | | | | | N | | | ACX | | | ACY | | | | |
| (j) OP-C | Add Literal | 1 | 1 | 0 | 0 | ACY | | | | | | | L | | | | | | | | |
| (k) OP-D | Branch | 1 | 1 | 0 | 1 | | | | | | ADR | | | | | | | | | | |
| (l) OP-E | Branch Indirect | 1 | 1 | 1 | 0 | | | | | | | | | | | | ACY | | | | |
| (m) OP-F | Load | 1 | 1 | 1 | 1 | ACY | | | | | | | CA | | | | | | | | |

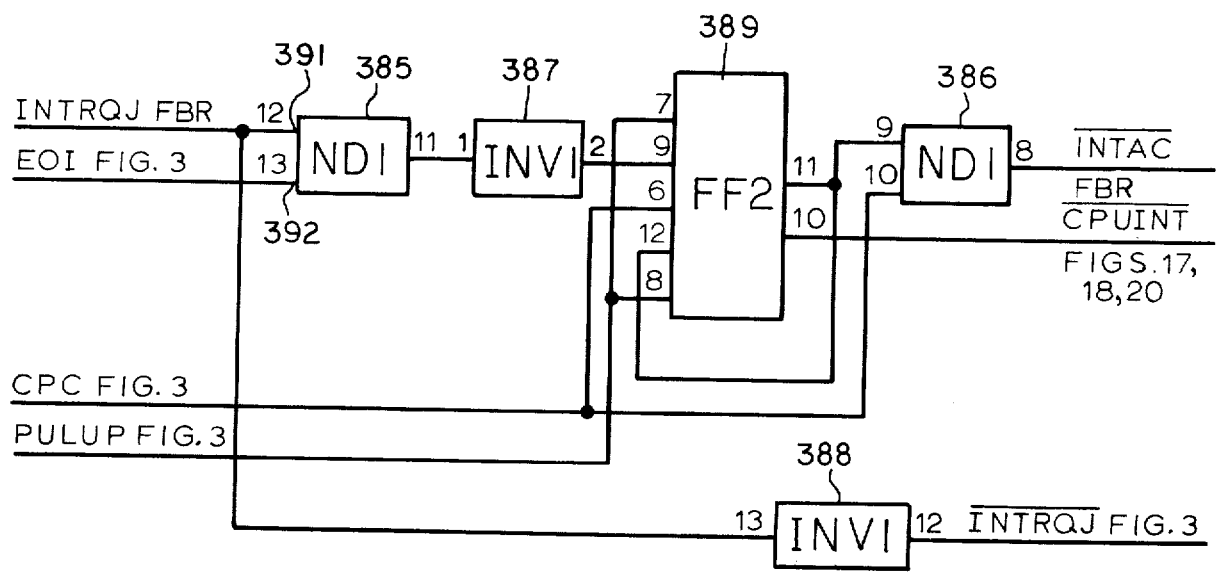
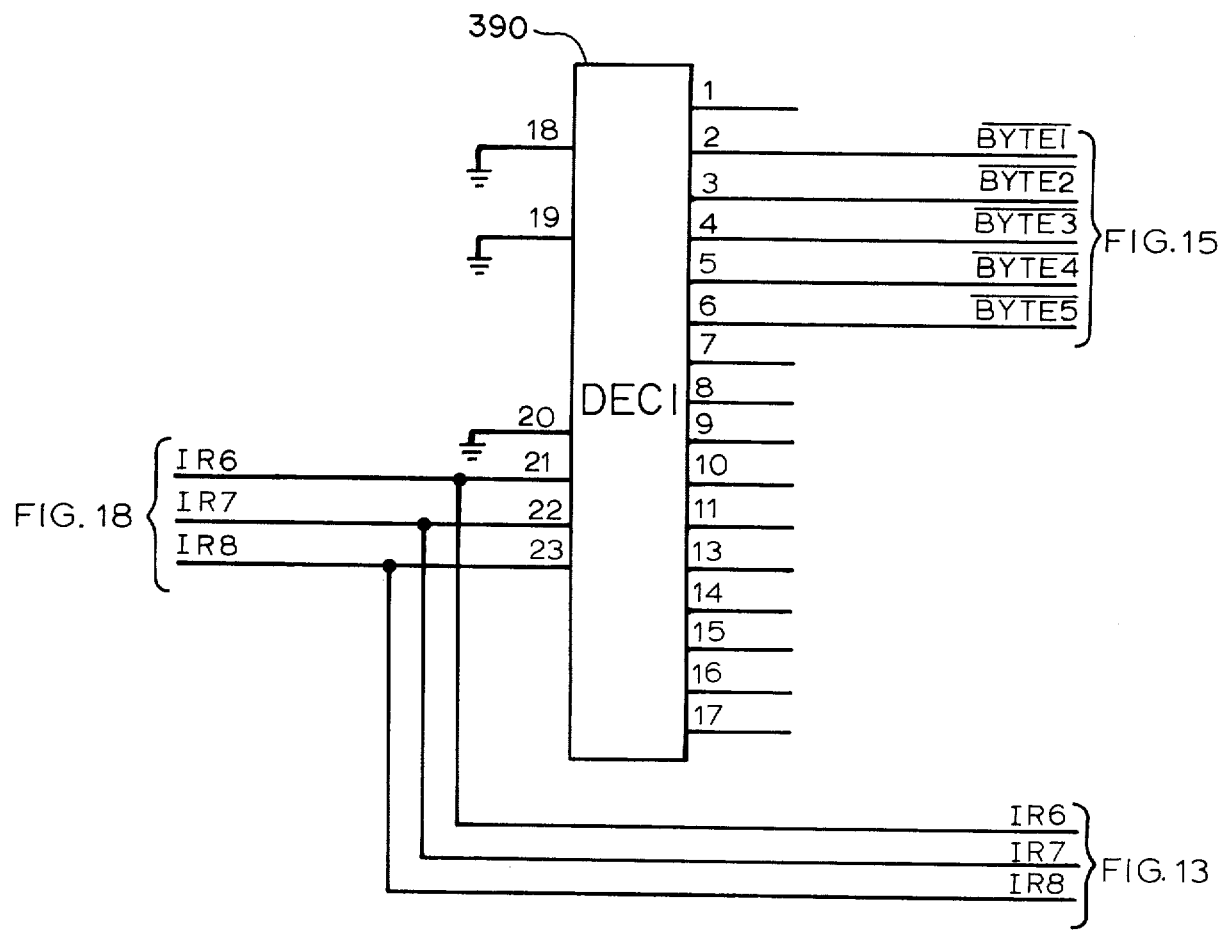
FIG. 14

CENTRAL PROCESSOR FOR A TELEPHONE EXCHANGE

BACKGROUND OF THE INVENTION

The present invention is generally directed to a central processor for use in a telephone exchange switching system and in particular to a central processor for use in a telephone switching system wherein the subsystems of the system are interconnected on a common data bus.

Modern telephone exchanges operate in response to a central processor which controls all of the necessary functions within the exchange system to provide requested service. One type of well known exchange system is disclosed in Borbas et al, U.S. Pat. No. 3,767,863 which issued on Oct. 23, 1973 and which is assigned to the assignee of the present invention. The exchange system theredisclosed is a system wherein the subsystems of the exchange are interconnected on a common data bus and each has an interface unit so that it may be specifically addressed. Among the subsystems is a program memory which contains the operational codes to be utilized by the central processor to control the overall function of the system.

Each of the subsystems is interfaced to the central processor by a bus control unit which is fully disclosed and claimed in Borbas, U.S. Pat. No. 3,812,297 which is also assigned to the assignee of the present invention. The bus control unit theredescribed is one which is compatible with the present invention. Any further reference to a bus control unit may be made to the aforementioned U.S. Pat. No. 3,812,297. The bus control unit theredescribed provides an address cycle followed by a data cycle indicated by signals on the control conductors for use by the central processor.

To control the operation of a telephone exchange such as the one disclosed in the aforementioned U.S. Pat. No. 3,767,863, a central processor is required. It operates under commnad of operational codes to control the function of the subsystems connected to the common data bus to provide the desired service between the subscribers.

It is therefore an object of the present invention to provide an improved central processor for telephone exchange systems.

It is a further object of the present invention to provide a central processor for controlling the operations of the subsystems of a telephone exchange system which are interconnected onto a data bus.

It is a still further object of the present invention to provide a central processor which controls the function of the system subsystems under command of operational codes provided by a program memory within the system and wherein the operational codes are selectable in response to the particular service desired.

The present invention provides a central processor for controlling the operation of subsystems which are interconnected on a common data bus of a telephone exchange to. establish requested service between telephone subscribers, wherein the exchange includes a program memory also connected to the common data bus for storing a plurality of addressable multiple bit operational codes to be utilized by the central processor in response to the particular service being requested. The central processor includes a program address register for storing the program memory address of a selected operational code and for addressing the program memory to cause it to transmit the selected operational code over the common data bus. The central processor also includes an instruction register for storing the selected operational code and for providing subsystem address signals responsive to the selected operational code, an arithmetic logic unit coupled to the instruction register for transmitting the subsystem address signals, the arithmetic logic unit additionally being coupled to the common data bus for transferring the selected operational code from the program memory to the instruction register, and for performing logic and arithmetic functions responsive to function control signals to provide subsystem data and operation signals, a bus address register coupled between the arithmetic logic unit and the common data bus for storing the address of a selected subsystem responsive to the subsystem address signals, a bit time counter for providing operational timing signals and a control word generator coupled to the instruction register for providing the function control signals responsive to the selected operational code stored in the instruction register and coupled to the bit time counter for coacting therewith to provide the function control signals in proper time sequence.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings and in the several figures of which like reference numerals indicate identical elements and in which:

FIG. 2 is a graphic representation of the contents of the operational codes which are utilized by the central processor of FIG. 1;

FIGS. 4–16 are detailed schematic diagrams of the control word generator of the central processor of FIG. 1;

DESCRIPTION OF THE PREFERRED EMBODIMENT

Figure 1:
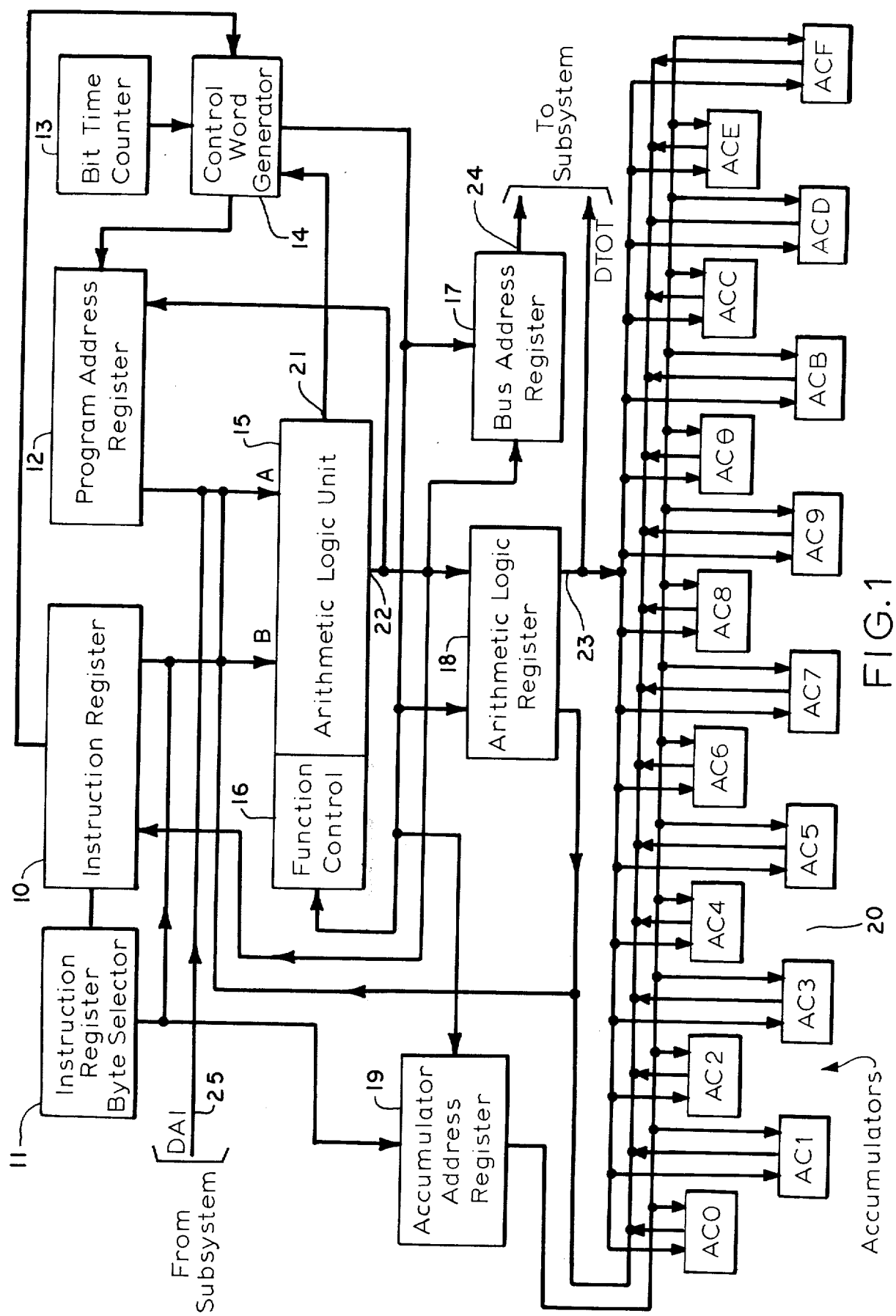
FIG. 1 is a block schematic representation of a central processor embodying the present invention.

Referring to the block diagram of FIG. 1, the central processor thererepresented includes instruction register (IR) 10, instruction register byte selector (IRBYS) 11, program address register (PAR) 12, bit time counter (BTC) 13, control word generator 14, arithmetic logic unit (ALU) 15, function control (FCT) 16, bus address register (BAR) 17, arithmetic logic register (ALR) 18, accumulator address register (ACCADR) 19 and a plurality of accumulators 20 each having its own designation AC0-ACF.

The program address register 12 is coupled to input A of the arithmetic logic unit 15. It is a 16 bit store which stores the address of the next operational code and addresses the program memory to obtain a selected operational code to be read by the central processor. Bit time counter 13 is coupled to control word generator 14 and is a 16 bit shift register which controls the timing of the central processor so that the executions are performed in proper time sequence. It is driven by a central processor clock (CPC) not shown. The CPC pulses have a frequency of 5MHz or periods of 200ns. Instruction register 10 is a 20 bit store which stores each program instruction as it is obtained from the program memory or a central processing unit test panel which provides manual access to the central processor. The central processor operates in accordance with a 20 bit operational code obtained from program memory and it is this operational code which is stored in the instruction register. The instruction register also provides subsystem address signals responsive to the selected operational code and is coupled to the instruction register byte selector 11 so that individual bytes of the selected operational code may be referenced for performing specific operations. The instruction register 10 is also coupled to the control word generator 14.

Control word generator 14 in response to the first four or more bits of the operational code in the instruction register provides function control signals which are applied to function control 16. Function control 16 is a part of the arithmetic logic unit 15 and in response to the function control signals supplied by the control word generator 14, informs the arithmetic logic unit what specific function it will perform for any one of the 16 different operational codes.

The arithmetic logic unit 15 contains the logic circuitry required to carry out the arithmetic and logic operational code instructions. It has two data inputs, input B and input A. It additionally has an output 21 coupled to the control word generator for providing a data compare function when necessary, an output 22 coupled to the bus address register 17, arithmetic logic register 18, instruction register 10 and the program address register 12 for providing the program address register with a specific program memory address in response to the selected operational code.

The arithmetic logic unit not only performs the arithmetic and logic functions of the central processor but it additionally serves as a conduit to transfer the data received over DAI line 25 from the telephone exchange subsystems to the central processor circuits to which it is coupled. For instance, when a particular instruction in program memory is to be selected, the program address register provides the address of the selected operational code within the program memory and transfers this address to input A of the arithmetic logic unit. The program address is then transferred from output 22 of the arithmetic logic unit 15 to the bus address register 17 which contains the address of the program memory. Upon receipt of a ready signal from the bus control unit the selected operational code is received from program memory over DAI line 25 into input A of the arithmetic logic unit whereupon it is transferred from output 22 of the arithmetic logic unit to the instruction register. The bus control unit herein referred to coordinates the usage of the common data bus by the central processor and the subsystems so that interfering signals do not result on the common data bus. For a full and complete description of the bus control unit, reference may be made to the previously mentioned 3,812,297 patent. Also, for a full and complete description as to how a particular operational code is selected in response to a particular call for service, reference may be made to the previously referred to U.S. Pat. No. 3,767,863.

As previously mentioned, the arithmetic logic unit provides the arithmetic and logic functions of the central processor in response to function control signals generated by the control word generator 14. Table 1 lists these functions against the input levels required at the function control 16.

Table 1

| | ALU Function Control Commands | | | | |
|---|---|---|---|---|---|
| M (MODE) | S8 | S4 | S2 | S1 | FUNCTION |
| 1 | 1 | 1 | 1 | 1 | A |
| 1 | 1 | 0 | 1 | 0 | B |
| 1 | 1 | 0 | 1 | 1 | A.B |
| 1 | 1 | 1 | 1 | 0 | A+B |
| 1 | 0 | 1 | 1 | 0 | AB |
| 1 | 1 | 0 | 0 | 1 | AB |
| 1 | 0 | 0 | 0 | 0 | A |
| 1 | 0 | 0 | 1 | 1 | 0 |
| 0 | 1 | 0 | 0 | 1 | A PLUS B |
| 0 | 0 | 0 | 0 | 0 | A PLUS 1* |
| 0 | 1 | 1 | 1 | 1 | A MINUS 1 |
| 0 | 0 | 1 | 1 | 0 | A MINUS B* |

WHERE: Mode = 1, logic operation
Mode = 0, arithmetic operation
A ALU A
B ALU B
*"CARRY" bit to units digit must be true The arithmetic logic register 18 consists of a 20 bit store which is used to temporarily store the data received from the ALU output 22. The data temporarily stored in the arithmetic logic register 18 may be gated to the arithmetic logic unit inputs for further processing, to one of the accumulators, or to the subsystem over line DTOT addressed by the bus address register. Accumulators 20 consist of 16, 20 bit accumulators (AC0-ACF) which may be used to temporarily store data during processor operations. The accumulator address register 19 is used to select a particular accumulator in response to the instruction register byte selector or the control word generator. The input data to the accumulators comes directly from the arithmetic logic register 18 and the output data can go to either input A or input b of the arithmetic logic unit 15. The bus address register 17 receives and stores the 20 bit subsystem address of the particular subsystem to be read into or written out of the arithmetic logic unit. This address is presented to the common data bus during an address cycle, thus enabling data flow to and from the particular subsystem. The data which is to be transferred to a subsystem is provided at arithmetic logic register output 23 and the subsystem address is provided at bus address register output 24.

All functions of the central processor are controlled by the coded commands of the particular operational code obtained from program memory and fed into the instruction register 10. FIG. 2 shows the contents of the instruction register in symbolic form for each operational code. It is to be noted that operational codes 4, 5 and B are not used but are available for possible future use. FIG. 2 shows that the first four bits of the instruction register always contain the operational code number while the blocks are assigned various parameters of that operational code. The blocks are assigned various mnemonics (i.e. M, I, ACX, etc) which are used in the following description of each of the operational codes bit time by bit time.

It must be mentioned that the first four bits of the instruction register should not be confused with the function control signals as shown in Table 1 which are generated by the control word generator. The control word generator looks at the first four or more bits of the instruction register and then generates the M, S8, S4, S2 and S1 function control signals in response to these bits. It might also be mentioned that the control word generator in conjunction with the bit time counter and the particular operational code in process looks at individual bytes of the operational code from bit time to bit time. The control word generator can therefore be thought of as a microprogrammer. It generates responsive to the bit time counter and the selected operational code a second multiple bit code, five bits of which are the function control signals. The remaining bits of information of the control word generator contain information such as addressing information so that the central processor will know where the data obtained from the arithmetic logic unit is to go, for example. The control word generator also increments the program address register to provide it with sequential program memory addresses.

The operation of the central processor of FIG. 1 may best be understood by detailing each of the 13 operational codes which are used by the central processor for each bit time of execution. In order to aid in the understanding of the following description, reference may be made to the glossary of terms listed below.

| ACC | Accumulator Lead |
|---|---|
| ACC | Accumulator |
| ACCA | Accumulator Address Selection |
| ACCB | Leads |
| ACCC | |
| ACCSTR | |
| ACCAD | Address Input to Select Accumulator |
| ACCWR | Accumulator Write |
| ADDL | Add Literal OP-C |
| ADST1 | |
| ADST2 | Accumulator Address Leads |
| ADST4 | |
| ADST8 | |
| ALR | Arithmetic Logic Register |
| ALRCL | ALR Clear |
| ALRLDA | Arithmetic Logic Register Load |
| ALRLDB | Control |
| ALRLDC | |
| ALRLD1 | |
| ALRLD2 | Arithmetic Logic Register |
| ALRLD3 | Byte Load Leads |
| ALRLD4 | |
| ALRLD5 | |
| ALRS1 | ALR Function Control Leads |
| ALRS2 | |

-continued

| ALUTHC | Carry Lead to Thousands Digit of ALU |
|---|---|
| ALUTC | Carry Lead to Tens Digit of ALU |
| ALU | Arithmetic Logic Unit |
| ALUA | Input A of ALU |
| ALUAA | |
| ALUAB | ALUA Data Selection Leads |
| ALUAST | |
| ALUA=B | "Comparing" Output of ALU |
| ALUB | Input B of ALU |
| ALUBA | |
| ALUBB | ALUB Data Selection Leads |
| ALUBC | |
| ALUBST | |
| BAR | Bus Address Register |
| BARLD | Bus Address Register Load |
| BCS | False State While CP Waiting for BCUS |
| BCUS | Bus Control Strobe for Data |
| BR | Branch OP-D |
| BT0 | |
| BT1 | Bit Time Counter Outputs |
| BT2-BT13 | |
| BRIND | Branch Indirect OP-E |
| BUSWT | Bit Wait |
| BYTE1 | |
| BYTE2 | |
| BYTE3 | ALR Byte Selection Leads |
| BYTE4 | |
| BYTE5 | |
| BYTST | Byte Test OP-6 |
| BYSET | Byte Set OP-7 |
| COMP | Compare OP-1 |
| CPC | Central Processor Clock (Controlled) |
| CPUINT | CPU Interrupt |
| CV | Function Converter |
| CV-S1 | |
| CV-S2 | |
| CV-S4 | ALU Function Control Leads |
| CV-S8 | |
| CV-M | |
| CVR-S1 | |
| CVR-S2 | |
| CVR-S4 | ALU Function Control Leads |
| CVR-S8 | |
| CVR-M | |
| CVR-CAR | Carry Logic for ALU |
| DAI01-DAI20 | Data In Lines |
| DATA | Data Handling OP-8 |
| DDSA | |
| DDSB | Data Display Selection Leads |
| DDSC | |
| DDSST | |
| DLP | Data Display Lamp |
| DSELA | |
| DSELB | Data Selection Leads |
| DSELC | |
| EOI | End of Instruction |
| EOSC | End of Scan |
| FBR | Fault Buffer |
| FCT | Function Input to ALU |
| FETCH | Obtain Data from Program Memory |
| INTAC | Interrupt Acknowledge from CPU |
| INTRQJ | Interrupt Request Flip-Flop Q Side |
| IR | Instruction Register |
| IRA | IR Byte Selection Control |
| IRB | |
| IRDEC | IR Decrement |
| IRH=1 | IR Byte 3=1 |
| IR LOAD | Instruction Register Load |
| IRST | Enable Lead to IR Byte Selector Lead |
| IRX8-IRX1 | IR Byte Selection Leads |
| JSR | Jump to Subroutine OP-0 |
| LOAD | Load OP-F |
| MASK | Logical AND OP-2 |
| PAR | Program Address Register |
| PARCT | PAR Count |
| PARTHC | PAR Carry Into Thousands |
| PARLD | PAR Load |
| PAUSEJ | Q Output of PAUSE FF |
| PULUP | Logic 1 pull-up |
| ROT | Rotate OP-θ |
| SCAN | Scan OP-9 |
| SCINH | Scan Inhibit |
| SC13 | Scan OP-9 Bit Time 13 |
| SSACC | Store Selection Accumulator |
| SSALR | Store Selection ALR |
| SSALU | Store Selection ALU Output |
| SSALUA | Store Selection ALUA Input |
| SSALUB | Store Selection ALUB Input |
| SSBAR | Store Selection BAR |
| SSIR | Store Selection IR |
| SSPAR | Store Selection PAR |
| STIN | Start Data In Cycle |
| STINOT | Start In or Start Out |

-continued

| | |
|---|---|
| TOT | Start Data Out Cycle |
| SUPER | Superimpose OP-3 (logical OR) |
| SYRST | System Reset |
| SYRT | Reset and Halt |

During the description of each of the operational codes it would be advantageous to review FIG. 2 in order to appreciate what information is contained in the individual bits of the operational codes under consideration.

OP-0 BRANCH TO SUB ROUTINE (JSR, INTERNAL MACHINE MNEMONIC)

The central processor under the command of this operational code stores the contents of the program address register in accumulator F (ACF) and then branches to the address given (ADR) in instruction register bits 5–20.

At bit time 0 (BT0) the address contained in the program address register is loaded into the bus address register. The output of the program address register is transferred to input A of the arithmetic logic unit. The output of the arithmetic logic unit is transferred to the bus address register and loaded into the bus address register when BARLD equals BT0.CPC. The 20 bits of the bus address register will always contain the address of the operational code within the program memory which is to be read by the central processor. At bit time 0 a start bus input transfer is requested. The bit time counter (BTC) is updated to BT1 on the clock pulse.

At bit time 1 the bit time counter is inhibited due to a bus wait signal which indicates that the central processor is waiting for the input of the operational code from program memory. The DAI line 25 will contain the contents of the address presented to the bus address register during bit time 0. The output of the arithmetic logic unit is transferred to the instruction register and loaded into the instruction register at bit time 1. After the operational code is read into the instruction register, the instruction register will contain the contents of the address previously defined by the program address register (operational code plus data). The program address register is advanced by one count to the next address and the bit time counter is advanced to bit time 2.

At bit time 2 the output of the program address register is transferred to the arithmetic logic unit at input A. The output of the arithmetic logic unit is loaded into the arithmetic logic register so that the arithmetic logic register will now contain the contents of the program address register. The bit time counter is then advanced to bit time 3.

At bit time 3 the output of the arithmetic logic register feeds directly into the accumulators. The particular accumulator selected is accumulator F (ACF). The instruction register bits 5–20 (ADR) are then transferred to the program address register through input B of the arithmetic logic unit. The program address register is then loaded with the instruction register bits 5–20 from output 22 and the bit time counter is reset to 0 ending the operation of OP code 0.

Command sequence bit time for bit time are listed in Table 2 below.

Table 2

| BIT TIME | OP-O Branch to Subroutine DATA TRANSFER | OPERATION |
|---|---|---|
| 0 | PAR→ BAR | PAR →ALU A<br>REQ. STIN (start in)<br>SET FETCH |
| | | ALU →BAR<br>F(A) →FCT |
| 1 | DAR →IR<br>PAR+1 →PAR<br>RESET FETCH ON BCUS<br>(bus control unit strobe) | DAI →ALU A |
| | | ALU →IR (BCUS)<br>PAR+1 →PAR (BCUS)<br>RESET FETCH (BCUS)<br>IF PREVIOUS TO BCUS<br>F(A) →FCT |
| 2 | PAR →ALR | PAR →ALU A |
| | | ALU →ALR<br>F →ACC ADR<br>F(B) →FCT |
| 3 | ALR →ACF<br>ADR →PAR<br>RESET BTC | ADR →ALU B |
| | | ALU →PAR<br>ALU →ACF<br>F(A) →FCT<br>BTO →BTC |

OP-1 COMPARE (COMP)

This operational code calls for the central processor to compare the contents of address CA (IR bits 9–20) with the contents of the accumulator named in ACY (IR bits 5–8) as shown in FIG. 2b. If the results of the comparison show that the two numbers are not equal the next sequential program instruction must be skipped.

At bit time 0 the address contained in the program address register is loaded into the bus address register. By transfer of the address from the program address register to input A of the arithmetic logic unit, through the arithmetic logic unit to output 22 and then to the bus address register. The bus address register bits 5–20 will contain the program memory address which must be read into the instruction register. At bit time 0 a start bus input transfer is requested. The bit time counter is updated to BT1 and a bus wait signal is produced.

At bit time 1 the bit time counter is inhibited due to the bus wait signal. At this point in time the central processor is waiting for the input of data from the program memory. The operational code from program memory transferred through the arithmetic logic unit to the instruction register. The instruction register will now contain the contents of the address previously defined by the program address register and the data.

At bit time 2, the information in instruction register bits 9–20 (CA) are taken to the arithmetic logic unit input B. The output of the arithmetic logic unit is loaded into the bus address register. At this time the bus address register bits 1–8 contain "0" and bus address register bits 9–20 contain instruction register bits 9–20 (CA). A start in (STIN) is requested (STCRT. COMP 2) and the bus control unit cycle is started. A bus wait signal is produced and the bit time counter is advanced to bit time 3.

At bit time 3, due to the bus wait signal, the bit time counter is inhibited. The address presently in the bus address register is presented to program memory and the contents of that address is taken to input A of the arithmetic logic unit from DAI line 25. The accumulator address is defined by instruction register bits 5–8 (ACY). The contents of the accumulator specified by IR bits 5–8 are presented to the input B of the arithmetic logic unit. Now the data on the A inputs of the ALU and the data on the B inputs of the ALU are compared. If the results of the comparison show that the two numbers are not equal the next sequential program instruction will be skipped. If they are equal the next sequential program instruction will be executed.

At bit time 4, the bit time counter is reset to 0 completing the end of the instruction. The full command sequence is shown in Table 3 below.

Table 3

| BIT TIME | DATA TRANSFER | OP-1 Compare OPERATION |
|---|---|---|
| 0 | PAR →BAR | PAR →ALU A<br>REQ. STIN<br>SET FETCH |
|  |  | ALU →BAR<br>F(A) →FCT |
| 1 | DAI→ IR<br>PAR+1 →PAR<br>RESET FETCH ON BCUS | DAI →ALU A |
|  |  | ALU→ IR (BCUS)<br>PAR+1 →PAR (BCUS)<br>RESET FETCH (BCUS)<br>F(A) →FCT BEFORE BCUS<br>F(B) →FCT AFTER BCUS |
| 2 | CA →BAR<br>REQUEST START<br>BUS INPUT<br>TRANSFER (STIN) | CA →ALU B<br>REQ. STIN |
|  |  | ALU →BAR<br>ACY →ACC ADR |
| 3 | BUSWT (BUS WAIT)<br>IF DAI≠ACY<br>PAR+1→ PAR | DAI→ ALU A<br>ACC →ALU B |
|  |  | F(A⊕B)→FCT<br>IF ALU A=B<br>PAR+1 →PAR |
| 4 | RESET BTC | F(A)→ FCT<br>BTO →BTC |

OP-2 MASK

This instruction requires the central processor to mask (logical AND) a literal in the program with the contents in the specified accumulator. The literal is referenced by CA (IR bits 9–20) and the accumulator by ACY (IR bits 5–8). The result is then stored in ACY. The IR blocks are shown in FIG. 2c.

On BT0 the address contained in the program address register is loaded into the bus address register through the arithmetic logic unit. A start bus input transfer is requested and the bit time counter is updated to BT1.

On BT1 the bit time counter is inhibited due to the bus wait signal. At this point in time the central processor is waiting for the input of data from the program memory. The data (DAI) lines 25 feeds the arithmetic logic unit at input A with the selected operational code and the operational code is then transferred through the ALU to output 22 where it is loaded into the instruction register. Instruction register now contains the operational code corresponding to the address previously defined by the program address register. The program address register is advanced by one count to the next address and the bit time counter is advanced to BT2.

At bit time 2, IR bits 9–20 (CA) are taken to the arithmetic logic unit at input B. The output of the arithmetic logic unit is then transferred into the bus address register. At this time, bus address register bits 1–8 contain "0" and bits 9–20 (CA). A start in is requested and the bus control unit cycle is started. The bit time counter is then advanced to BT3.

The address presently in the bus address register is presented to the program memory and the contents of that address is taken to input A of the arithmetic logic unit. The accumulator address is defined by instruction register bits 5–8 (ACY). The accumulator outputs are transferred to input B of the arithmetic logic unit. The arithmetic logic unit function is determined by instruction register bits 1–4. The output of the arithmetic logic unit now contains the result of the data at input A and the data at input B of the arithmetic logic unit inputs ANDed together. The output of the arithmetic logic unit is loaded into the arithmetic logic register and the bit time counter is advanced to bit time 4.

On bit time 4 the contents of the arithmetic logic register are loaded into the selected accumulator as specified by instruction register bits 5–8 (ACY). The bit time counter is then reset to 0 indicating the completion of the operational code. The full command sequence for the MASK operational code is shown in Table 4.

Table 4

| BIT TIME | DATA TRANSFER | OP-2 Mask OPERATION |
|---|---|---|
| 0 | PAR→BAR | PAR →ALU A<br>REQ. STIN<br>SET FETCH |
|  |  | ALU→BAR<br>F(A) →FCT |
| 1 | DAI→IR<br>PAR+1 →PAR<br>RESET FETCH ON BCUS | DAI →ALU A |
|  |  | ALU→IR (BCUS)<br>PAR+1 →PAR (BCUS)<br>RESET FETCH (BCUS)<br>F(A) →FCT BEFORE BCUS<br>F(B) →FCT AFTER BCUS |
| 2 | CA →BAR<br>REQUEST STIN | CA →ALU B<br>REQ. STIN |
|  |  | ALU →BAR<br>ACY →ACC ADR |
| 3 | BUSWT<br>DAI. (ACY) →ALR | DAI→ALU A<br>(ACY) →ALU B |
|  |  | F(A.B)→ FCT<br>ALU →ALR (BCUS)<br>ACY →ACC ADR |
| 4 | ALR →ACY<br>RESET BTC |  |
|  |  | ALR →ACY<br>F(A) →FCT<br>BTO →BTC |

OP-3 SUPERIMPOSE (SUPER)

This instruction requires the central processor to superimpose (logical inclusive OR) a literal in the program with the contents of a selected accumulator. The literal is referenced by CA (IR bits 9–20) and the accumulator by ACY (IR bits 5–8). The result is then stored in ACY. The IR blocks are shown in FIG. 2 d.

On BT0 the address contained in the program address register is loaded into the bus address register through the arithmetic logic unit. The first four bits of the bus address register will always be "0". Bus address register bits 5–20 contain the program memory address which will be read into the instruction register. A start bus input transfer is requested and the bit time counter is updated to BT1.

At bit time 1 the bit time counter is inhibited due to the bus wait signal. At this point in time the central processor is waiting for the input of the operational code from the program memory. The operational code is transferred through DAI lines 25 through the ALU and to the instruction register. Instruction register now contains the operational code as referenced by the address previously defined by the program address register. Bit time counter is then advanced to bit time 2.

At bit time 2 IR bits 9–20 (CA) are taken to the arithmetic logic unit input B. The output of the arithmetic logic unit is loaded into the bus address register. At this time bus address register bits 1–8 contain 0 and bus address register bits 9–20 contain IR bits 9–20 (CA). A start in is requested and the bus control unit cycle is begun. A bus wait signal is produced and the bit time counter is advanced to BT3.

A bit time 3 the bit time counter is inhibited. The address presently in the bus address register is presented to the program memory and the contents of that address are taken to input A of the arithmetic logic unit from the DAI line 25. The accumulator address is defined by IR bits 5–8 (ACY). The accumulator outputs are taken to the input B of the arithmetic logic unit. The ALU function is determined by IR bits 1–4. The output of the arithmetic logic unit now contains the result of the input A and input B inputs superimposed together. The output of the arithmetic logic unit is loaded into the arithmetic logic register. The bit time counter is advanced to BT4.

On BT4 the contents of the arithmetic logic register are loaded into the accumulator specified by IR bits 5–8 (ACY). The bit time counter is then reset to 0 indicating the completion of the operation. The full command sequence is shown in Table 5.

Table 5

| BIT TIME | DATA TRANSFER | OPERATION |
|---|---|---|
| 0 | PAR →BAR | PAR →ALU A<br>REQ. STIN<br>SET FETCH |
| | | ALU →BAR<br>F(A) →FCT |
| 1 | DAI →IR<br>PAR+1 →PAR<br>RESET FETCH ON BCUS | DAI →ALU A |
| | | ALU →IR (BCUS)<br>PAR+1 →PAR (BCUS)<br>RESET FETCH (BCUS)<br>F(A)→ FCT BEFORE BCUS<br>F(B)→ FCT AFTER BCUS |
| 2 | CA → BAR<br>REQUEST STIN | CA →ALU B<br>REQ. STIN |
| | | ALU→ BAR<br>ACY→ ACC ADR |
| 3 | BUSWT<br>DAI+(ACY) →ALR | DAI →ALU A<br>ACY →ALU B |
| | | F(A+B)→ FCT<br>ALU→ ALR (BCUS)<br>ACY →ACC ADR |
| 4 | ALR →ACY<br>RESET BTC | ALR →ACY<br>F(A) →FCT |

Table 5-continued

| BIT TIME | DATA TRANSFER | OPERATION |
|---|---|---|
| | | BT0→ BTC |

OP-6 BYTE TEST (BYTST)

This instruction requires the central processor to mask a specific byte in the contents of an accumulator with MK (IR bits 9–12). The accumulator is defined in ACY (IR bits 17–20) and the byte by BYTE (IR bits 6–8). The result is then compared with COMP (IR bits 13–16). If S (IR bit 5) is 0 and the bytes are equal or if S is equal to 1 and the bytes are unequal, the next instruction is skipped. The IR blocks are shown in FIG. 2e.

On BT0 the address contained in the program address register is loaded into the bus address register through the ALU. The first four bits of the BAR will always be 0. BAR bits 5–20 contain the program memory address whose contents will be read into the instruction register. The bit time counter is updated to BT1 and a bus wait signal is produced.

On bit time 1 the BTC is inhibited due to the bus wait signal. At this point in time the central processor is waiting for the input of the data from the program memory. The operational code in DAI line 25 is fed to the ALU input A. The DAI line will contain the operational code as represented by the address presented to the bus address register during bit time 0. The output of the ALU is taken to the instruction register and loaded into the instruction register. The instruction register now contains the operational code. The program address register is advanced by one count to the next address and the bit time counter is advanced to BT2.

At bit time 2 the ALR is cleared and the accumulator address is defined by instruction register bits 17–20 (ACY). The accumulator output is taken to the ALU at input A from the accumulators. The IRX bits are defined by IR bits 9–12 (MK). The IRX bits are taken to the ALU at input B. The ALU function is determined by the operational code and bit time. The output of the ALU now contains the result of the input A and input B ALU inputs exclusive "ORed" function. The output of the ALU is loaded into one byte position of the ALR. The byte position is determined by the IR bits 6, 7 and 8. Assuming byte 1, ALR bits 1–4 will be loaded.

At bit time 3, the result of the above operation, stored in the ALR is transferred to the A input of the ALU. The IRX bits, in this case defined by IR bits 13–16 are transferred to input B of the ALU. The ALU function is determined by the operational code and the bit time. The output of the ALU will be 0 if the A input and B input of the ALU are equal. This result is loaded into the ALR and the bit time counter is advanced to BT4.

At bit time 4, the output of the ALR is transferred to input A of the ALU. The ALU function is determined by the OP code and bit time. If IR bit 5 is equal to 0 and input A of the ALU is equal to 0, the PAR is advanced by one count. If IR bit 5 is equal to 1 and input A is not equal to 0, the PAR is advanced by one count. The BTC is then reset to 0 indicating the completion of the operation. The full command sequence is shown in Table 6.

Table 6

| BIT TIME | DATA TRANSFER | OP-6 Byte Test OPERATION |
|---|---|---|
| 0 | PAR →BAR | PAR →ALU A<br>REQ. STIN<br>SET FETCH |
| | | ALU →BAR<br>F(A) →FCT |
| 1 | DAI →IR<br>PAR+1 →PAR<br>RESET FETCH ON BCUS | DAI →ALU A |
| | | ALU →IR (BCUS)<br>PAR+1 →PAR (BCUS)<br>RESET FETCH (BCUS)<br>F(A)→FCT BEFORE BCUS<br>ACY→ ACC ADR<br>BYTE3 →IRBYS<br>F(A.B) →FCT AFTER BCUS |
| 2 | CLEAR ALR<br>ACY.MK →ALR (BYTE) | ALR CLEAR (ALRCL)<br>ACY→ ALU A<br>IRX →ALU B |
| | | ALU →ALR (BYTE)<br>BYTE4 →IRBYS<br>F(A⊕B)→FCT |
| 3 | ALR ⊕COMP →ALR(BYTE) | ALR →ALU A<br>IRX →ALU B |
| | | ALU →ALR (BYTE)<br>F(Ā) →FCT |
| 4 | SKIP NEXT<br>INSTRUCTION | ALR - ALU A |
| | IF 1 (S=0).(ALR=0)<br>IF 2 (S=1).(ALR=1)<br>RESET BTC | IF 1 (S̄).(ALU A=B)<br>OR 2 (S).(ALU A=B)<br>PAR+1 →PAR<br>F(A) →FCT<br>BTO →BTC |

OP-7 BYTE SET (BYSET)

This instruction requires the central processor to mask a specific byte in the contents of an accumulator with MK (IR bits 9–12). The accumulator is defined in ACY (IR bits 17–20) and the byte is specified by BYTE (IR bits 6–8). The result is then superimposed with SUPER (IR bits 13–16). If S (IR bit 5) is a 0 the overall result is placed in the original byte of ACY with all other bytes in ACY being cleared. If S is equal to 1 the other bytes will not be affected. The IR blocks are shown in FIG. 2f.

On BT0 the address contained in the PAR is loaded into the BAR through the ALU. The first four bits of the BAR will always be 0. BAR bits 5–20 contain the program memory address which will be used by the central processor to read the selected operational code from program memory. On BT0 a start bus input transfer is requested. The bit time counter is updated to BT1 and a bus wait signal is provided.

On BT1 the BTC is inhibited due to the bus wait signal. At this point in time the central processor is waiting for the operational code input from the program memory. The data in the DAI lines 25 will feed the operational code to the ALU at input A. The operational code then is transferred from output 22 to the instruction register where it is stored. The instruction register now contains the operational code referenced by the address previously defined in the PAR. The PAR is advanced by one count to the next address and the BTC is advanced to BT2.

On bit time 2 the accumulator address is defined by IR bits 17–20 (ACY). The accumulator outputs are taken to the ALU input A. The ALU function is determined by IR5. If IR5 equals 0, the ALU outputs will also equal 0. If IR5 is equal to one, the ALU outputs will equal the contents of ACY. The output of the ALU is loaded into the ALR which will now contain either all 0 or the contents of ACY. The BTC is advanced to BT3.

On bit time 3 the accumulator outputs are taken to the ALU at input A. The IRX bits are defined by IR bits 9–12 (MK). The IRX bits are transferred to the ALU at input B. The function is determined by the operational code in bit time. In this case the function is A.B. The output of the ALU now contains the result of ALU A and B inputs masked together. The output of the ALU is transferred into one byte position of the ALR. The byte position is determined by IR bits 6–8 (BYTE). Assuming byte 1, ALU bits 1–4 will be loaded into the ALR. The remaining ALR bits 5–20 will contain all 0 or the contacts of ACY bits 5–20. The BTC is advanced to BT4.

On bit time 4 the ALR outputs are taken to the ALU ar input A. The IRX bits are defined by IR bits 13–16 (Super). The IRX bits are taken to the ALU at input B. The ALU function is determined by the OP code and bit time and in this case the function is A+B. The output of the ALU now contains the result of the ALU input A and B superimposed together. The output of the ALU is loaded into one byte position of the ALR. The byte position is determined by the IR bit 6, 7 and 8 (byte). Assuming byte 1, ALR bits 1–4 will be loaded and the BTC is advanced to BT5.

On bit time 5 the contents of the ALR are loaded into the accumulator defined by IR bits 17–20 (ACY). If S is equal to 0, the accumulator will contain Y0000 or if S is equal to one the accumulator will contain YXXXX.

The BTC is then reset to 0 indicating completion of the operation. The full command sequence for OP-7 is shown in Table 7.

Table 7

| BIT TIME | DATA TRANSFER | OP-7 Byte Set OPERATION |
|---|---|---|
| 0 | PAR→BAR | PAR →ALU A<br>REQ. STIN<br>SET FETCH |
| | | ALU→BAR<br>F(A)→FCT |
| 1 | DAI→IR<br>PAR+1→PAR<br>RESET FETCH ON BCUS | DAI →ALU A |
| | | ALU→IR (BCUS)<br>PAR+1→PAR (BCUS)<br>RESET FETCH (BCUS)<br>F(A)→FCT BEFORE BCUS<br>ACY→ACC ADR<br>IF S=0; F(0)→ FCT AFTER BCUS<br>IF S=1; F(A)→FCT AFTER BCUS |
| 2 | SET ALR TO 0(IF S=0)<br>OR ACY(IF S=1) | (ACY)→ALU A |
| | | ALU→ALR<br>ACY→ACC ADR<br>BYTE3→IRBYS<br>F(A.B)→FCT |
| 3 | ACY.MK →ALR(BYTE) | ALR→ALU A<br>IRX→ALU B |
| | | ALU→ALR (BYTE)<br>BYTE4→IRBYS<br>F(A+B)→FCT |
| 4 | ALR+SUPER→ALR(BYTE) | ALR→ALU A<br>IRX→ALU B |
| | | ALU→ALR(BYTE)<br>ACY→ACC ADR |
| 5 | ALR→ACY<br>RESET BTC | ALR→ACY<br>F(A)→FCT<br>BTO→BTC |

OP-8 DATA HANDLING (DATA)

This instruction is a series of sub-instructions to the central processor commanding it to handle specific pieces of data in a certain way. The mode of operation is controlled by M (IR bit 5). If M is equal to 1 there is a data transfer between the central processor and a subsystem with address P (IR bits 9–12). ACX (IR bits 13–16) indicates which accumulator contains the address of the device within the subsystem. ACY (IR bits 17–20) indicates the accumulator within which the data to be transferred is located or which will receive the data while F (IR bits 6–8) orders any modifications to be made on the device address bits contained in ACX. The alternate mode indicated by M equal to 0 requests various logical arithmetic operations within the central processor on data contained in the ACX and ACY. The F bits will indicate the function to perform and the P bits will indicate what to do with the result. Table 8 shows all of the possible operations of this operational code and mnemonic for each. FIG. 2g shows the blocks of the instruction register.

On bit time 0 the address contained in the PAR is loaded into the BAR through the ALU. BAR bits 5–20 contain the address of the operational code within the program memory to be read into the instruction register. A bus start input transfer is requested and the bit time counter is updated to BT1 and a bus wait signal is provided.

On bit time 1 the BTC is inhibited due to the bus wait signal. At this point in time the central processor is waiting for the operational code from the program memory. The operational code in DAI line 25 is fed to the ALU at input A. The output of the ALU is transferred to the instruction register where it is loaded. The instruction register now contains the contents of the operational code which was in the address of the program memory previously defined by the PAR. The BTC is advanced to BT2.

On bit time 2 the contents of the accumulator given by bits 13–16 of the IR is fed into the ALU input A. In this case the function to be performed by the ALU is F(A). The output of the ALU is loaded into the ALR so that the ALR now contains the contents of the accumulator defined by ACX. The BTC is advanced to BT3.

On bit time 3 the content of the ACX is taken to the ALU at input A. The content of the defined accumulator (ACY) is taken to the ALU at input B. If M is equal to 0, the defined accumulator (ACY) is contained in IR bits 17–20. If M is equal to 1, the defined accumulator (ACY) is always accumulator 0. Depending on the mode (M) the function performed by the ALU will vary. These functions are shown in Table 8. The output of the ALU is loaded into the ALR so that the ALR now contains the resultant of the function performed by the ALU. The bit time counter is advanced to BT4.

Bit time 4 is only utilized if M is equal to 0. If M is equal to one this bit time is not used, that is, the bit time counter is advanced to BT5 with all of the data remaining intact. If M is equal to 0 the accumulator address is defined by IR bits 17–20 (ACY). If IR bits 5 and 12 are both equal to 0, the result currently in the ALR (obtained during bit time 3) is loaded into the accumulator defined by IR bits 17-20. The output of the ALR is also taken to the ALU at input A. The ALU function is determined by the data handling operational code and bit time. In this case, the function is equal to F($\overline{A}$). If required the PAR is incremented. Regardless of whether or not the PAR is incremented, the BTC is reset to 0.

On bit time 5, if M is equal to 1, the data transfer mode, IR bits 9-12 define the subsystem to be accessed. ALR bits 5-20 contain the address of the subsystem to be accessed (during bit time 3). The IRX bits are defined by IR bits 9-12 (P). IR bits 9-12 (P) and ALR bits 5-20 (address) are taken to the input B of the ALU. In this case, the function defined by the operational code and bit time is F(B). The output of the ALU is loaded into the BAR and the content of the ALR (address) is placed back into the accumulator defined by IR bits 13-16 (ACX). The bit time counter is now advanced to BT6.

During bit time 6 the contents of the accumulator defined by IR bits 17-20 (ACY) are placed into the ALR. The accumulator address is defined by IR bits 17-20 (ACY). The contents of the accumulator ACY is determined by the operational code and bit time and is F(A). The output of the ALU is transferred into the ALR and the direction of the data transfer is determined by IR bit 8. If IR bit 8 is equal to 0, the data transfer is from a subsystem to the central processor. If IR 8 is equal to 1, the data transfer is from the central processor to a subsystem. The bit time counter is advanced to BT7.

Bit time 7 is only used for transfer from a subsystem to the central processor of data. The DAI line is taken to the ALR via the ALU input A. The function of the ALU is determined by the operational code and the bit time. In this case the function is F(A). The output of the ALU is loaded into the ALR and the bit time counter is advanced to BT8 after the data transfer is complete.

During bit time 8 the contents of the ALR (data received from the subsystem) is loaded into the accumulator defined by the IR bits 17-20 (ACY). IR bits 17-20 (ACY) define the accumulator. The content of the ALR is loaded into the accumulator (ACY). The bit time counter is reset to 0 signifying the end of the operational code. The full command sequence for OP-8 is shown in Table 9.

Table 8

| IR CONTENTS | OPERATION | MNEMONIC | MODE |
|---|---|---|---|
| 80XXX | move (ACX →ACY) | MOV | ARITH/LOGIC |
| 81XXX | logical and (ACX.ACY →ACY) | AND | ARITH/LOGIC |
| 82XXX | add (ACX PLUS ACY →ACY) | ADD | ARITH/LOGIC |
| 83XXX | increment (ACX PLUS 1 →ACY) | INC | ARITH/LOGIC |
| 84XXX | inclusive or (ACX+ACY →ACY) | IOR | ARITH/LOGIC |
| 85XXX | compliment ($\overline{ACX}$ →ACY) | COM | ARITH/LOGIC |
| 86XXX | subtract (ACX−ACY→ ACY) | SUB | ARITH/LOGIC |
| 87XXX | decrement (ACX−1 →ACY) | DEC | ARITH/LOGIC |
| 88XXX | load indirect | LOD | DATA TRANSFER |
| 8⊖XXX | load indirect + | LOD+ | DATA TRANSFER |
| 8CXXX | load indirect − | LOD− | DATA TRANSFER |
| 8EXXX | load indirect x | LODx | DATA TRANSFER |
| 89XXX | store indirect | STR | DATA TRANSFER |
| 8BXXX | store indirect + | STR+ | DATA TRANSFER |
| 8DXXX | store indirect − | STR− | DATA TRANSFER |
| 8FXXX | store indirect x | STRx | DATA TRANSFER |

NOTE: In data transfer mode:
+: auto increment address
−: auto decrement address
x: take ACO contents and add to ACX
load: from subsystem to ACY
store: from ACY to subsystem

| ARITH/LOGIC RESULT COMMAND | |
|---|---|
| P | RESULT |
| XXX0 | load result into ACY |
| XXX1 | do not load result |
| XX0X | do not skip next instruction |
| X01X | skip if result = 0 |
| X11X | skip if result ≠ 0 |
| 0XXX | spare |
| 1XXX | spare | are taken to the ALU input A. The function in this case

Table 9

| BIT TIME | OP-8 Data Handling DATA TRANSFER | OPERATION |
|---|---|---|
| 0 | PAR →BAR | PAR →ALU A<br>REQ. STIN<br>SET FETCH |
| | | ALU →BAR<br>F(A) →FCT |
| 1 | DAI→ IR<br>PAR+1 →PAR<br>RESET FETCH ON BCUS | DAI   ALU A |
| | | ALU →IR (BCUS)<br>PAR+1 →PAR (BCUS)<br>RESET FETCH (BCUS)<br>F(A) →FCT |

Table 9-continued

| BIT TIME | OP-8 Data Handling DATA TRANSFER | OPERATION |
|---|---|---|
| | | ACX →ACC ADR |
| 2 | ACX →ALR | ACX →ALU A |
| | | ALU →ALR<br>IR BITS 5–8+CV→ FCT<br>(IF M=0), ACY →ACC ADR<br>(IF M=1), 0→ACC ADR |
| 3 | If M=0, ALR (F)ACY →ALR<br>If M=1, ALR (F)ACO →ALR | ALR→ ALU A<br>AC(0 OR Y)→ ALU B |
| | | ALU →ALR<br>ACY → ACC ADR<br>F(A)→FCT |
| 4 | IF M=0 AND IR12=0<br>ALR →ACY<br>RESET BTC<br>IF M=0<br>IF SKIP CONDITIONS<br><br>MET<br>PAR+1 →PAR<br>IF M=0<br>RESET BTC<br>IF M=1<br>GO ON TO BT5 | ALR → ALU A<br><br>IF M̄.ĪR̄1̄2̄, ALR →ACY<br>IF (1)ĪR̄5̄.IR10.IR11.ALU A=B<br>OR (2)ĪR̄5̄.IR10.IR11.ALU<br>A=B<br>PAR+1 →PAR<br>IF ĪR̄3̄, F(A) → FCT<br>IF ĪR̄3̄, BTO →BTC<br>IF IR5, F(B)→ FCT<br>ACX →ACC ADR<br>BYTE3 →IRBYS |
| 5 | ALR→ ACX<br>P PLUS ALR5–20 →BAR | IRX PLUS ALR5–20→ALU B |
| | | ALR→ACX<br>ALU →BAR<br>ACY→ACC ADR<br>F(A)→FCT |
| 6 | ACY →ALR<br>REQ. STIN FOR LOD<br>SERIES<br>REQ. STOT FOR STR<br>SERIES | ACY →ALU A<br>IF ĪR̄8̄, REQ. STIN<br><br>IF IR8, REQ. STOT |
| | | ALU→ ALR<br>F(A) →FCT |
| 7 | DAI →ALR(IF IR8) | DAI→ ALU A |
| | | IF ĪR̄8̄, ALU→ALR (BCUS)<br>ACY→ ACC ADR<br>F(A) →FCT |
| 8 | ALR→ ACY<br>RESET BTC | ALR→ ACY<br>F(A)→ FCT<br>BTO →BTC |

OP-9 SCAN (SCAN)

This operational code causes the central processor to scan addresses looking for particular data conditions. Initially, it loads the data address by P1 (IR bits 9–12) and AC0 bits 5–20. P1 gives the page address of the subsystem to be scanned and AC0 gives the remaining 16 bits of the first address to be checked. I (IR bit 5) is then examined. If I is equal to 1, P2 (IR bits 13–16) is combined with bits 5–20 of the data already loaded. This gives a second data address in a similar manner to the P1 and ACO combination. This new data is then loaded in place of the original data. If I is equal to 0, P2 is not used and the original data is left unchanged. The loaded data is masked with the contents of AC1, then compared with the contents of AC2. If the comparison shows them equal and C (IR bit 6) is 0 (SNE), or unequal and C is equal to 1 (SNN) then the next program instruction is carried out. Otherwise AC3, bits 1–8 are decremented and the result checked for 0. If the result is 0 then the next instruction is skipped. If the result is not 0 then AC3, bits 9–20, are added to AC0 and the entire instruction is repeated. The IR block for OP-9 are shown in FIG. 2h.

At bit time 0 the address contained in the PAR is loaded into the BAR through the ALU. BAR bits 5–20 contain a program memory address whose contents will be read into the instruction register. A start bus input transfer is requested and the bit time counter is updated to BT1 while a bus wait signal is provided.

On bit time 1 the BTC inhibited due to the bus wait signal. At this point in time the central processor is waiting for the operational code to be transferred from the program memory. The operational codes on the DAI line 25 is fed to the ALU at input A. The DAI lines will contain the contents of the address presented to the bar during bit time 0. The output of the ALU is taken to the instruction register and loaded into the instruction register. The instruction register will now contain the operational code from the program memory as addressed by the BAR. The BTC is advanced to bit time 2.

At bit time 2 the contents of AC0 are directed to the input A of the ALU and are stored in the ALR. A 0 is placed in the accumulator address register and IR bits 9–12 (P1) are placed in the instruction register byte selector. The bit time counter is then advanced to BT3.

At bit time 3, if IR bit 5 (I) is equal to 0, the bit time counter is advanced to BT4. If I is equal to 1, the contents of the instruction register byte selector plus bits 5–20 of the ALR are placed onto input B of the ALU. A start in command is then requested. Data flows through the ALU and is stored in the BAR to be placed onto the common data bus. The contents of the ALR are placed in AC0. The bit time counter is advanced to BT4.

At bit time 4, if I is equal to 0, IR bits 9–12 (P1) are placed into the instruction register byte selector and a 0 is placed in the accumulator address register. The bit time counter is advanced to BT5. If I is equal to 1, data is received from the bus via the DAI line 25 and input A of the ALU. The ALU output is stored in the ALR. IR bits 13–16 (P2) are placed in the instruction register byte selector and 0 in the accumulator address register. The bit time counter is then advanced to BT5.

At bit time 5 a start in command is requested. The contents of the instruction register byte selector plus bits 5–20 of the ALR are placed into input B of the ALU. For I=0, the contents of the instruction register byte selector will be P1, and for I=1, the contents will be P2. Data flows through the ALU and is stored in the BAR to be placed on the bus. If I is equal to 0, the contents of the ALR are placed in AC0. The bit time counter is advanced to BT6.

At BT6 the data on the DAI line 25 from the bus is placed on input A of the ALU and the contents of AC1 (i.e., the MASK constant) on input B of the ALU. The two inputs A and B are masked and the result is stored in the ALR. A 1 is placed in the accumulator address register if BCUS has not occurred; a 2 is placed in the accumulator address register if BCUS has occurred. The bit time counter is advanced to BT7.

Bit time 7 lasts for 400 ns. The contents of the ALR (i.e., the result of the mask operation) are placed on input A and the contents of AC2 (i.e., the COMPARE constant) are placed on input B of the ALU. The contents of inputs A and B of the ALU are compared. The bit time counter is reset to BT0 if the contents of input A are equal to the contents of input B and if the IR bit 6 (C) is equal to 0 or if the contents of input A are not equal to the contents of input B of the ALU and if IR bit (C) is equal to 1. If these conditions are not met, a 3 is placed in the accumulator address register and the bit time counter is advanced to BT8.

At bit time 8 the contents of AC3 are placed in input A of the ALU and a constant, 01000, is placed at input B of the ALU. In order to decrement bits 1–8 of AC3 by 1, the contents of input A of the ALU. The result is placed in the ALR. A 3 is placed in the accumulator address register. Bit time counter advanced to BT9.

At BT9, the contents of the ALR are placed in AC3 and a 3 is placed in the accumulator address register. The bit time counter is then advanced to bit time 10.

The bit time 10, the ALR is cleared. The contents of AC3 are placed onto input A of the ALU. The ALU output bits 1–8 are stored in the ALR. The bit time counter is advanced to BT11.

Bit time 11 lasts for 400 ns. The contents of the ALR are placed on input A of the ALU. If input A is equal to 0, the PAR is incremented by 1 and the bit time counter is reset to bit time 0. If input A is not equal to 0, a 3 is placed in the accumulator address register. The bit time counter is then advanced to BT12.

At BT12, the ALR is cleared. Bits 9–20 of AC3 are stored in the ALR via input A of the ALU. A 0 is placed in the accumulator address register. The bit time counter is advanced to BT13.

At BT13 the contents of the ALR are placed onto input A of the ALU and the contents of AC0 are placed onto input B of the ALU. Input A and input B are added and the sum stored in ALR. This gives the new starting address to continue the scan. If I is equal to 1, the bit time counter is reset to BT3. If I is equal to 0, the BT time counter is reset to BT5. The full command sequence for this operational code is shown in Table 10.

Table 10

| BIT TIME | DATA TRANSFER | OP-9 Scan OPERATION |
|---|---|---|
| 0 | PAR →BAR | PAR→ ALU A<br>REQ. STIN<br>SET FETCH |
| | | ALU →BAR<br>F(A)→FCT |
| 1 | DAI→IR<br>PAR+1→PAR<br>RESET FETCH ON BCUS | DAI→ALU A |
| | | ALU→ IR (BCUS)<br>PAR+1→PAR (BCUS)<br>RESET FETCH (BCUS)<br>F(A)→FCT<br>0 →ACC ADR |
| 2 | AC0→ALR | AC0→ ALU A |
| | | F(B)→FCT<br>ALU →ALR<br>0→ACC ADR<br>BYTE3→IRBYS |
| 3 | IF I=1,<br>P1 PLUS ALR5–20 →BAR<br>REQUEST STIN<br>ALR  AC0<br>IF I=0,<br>GO TO BT4 | IRX PLUS ALR5–20→ ALU B<br>IF I, REQ. STIN |
| | | IF I, ALU→BAR<br>IF I, ALR→ACO |
| 4 | IF I=1,<br>DAI →ALR<br>IF I=0<br>GO TO BT5 | DAI →ALU A |
| | | IF I, ALU→ALR (BCUS)<br>IF PREVIOUS TO BCUS, F(A)→FCT |

Table 10-continued

| BIT TIME | DATA TRANSFER | OP-9 Scan OPERATION |
|---|---|---|
| | | IF AFTER BCUS, F(B) → FCT |
| | | IF I=0, BYTE3 → IRBYS |
| | | IF I=1, BYTE4 → IRBYS |
| | | 0 → ACC ADR |
| 5 | REQUEST STIN<br>IF I=0<br>P1 PLUS ALR5-20 → BAR<br>ALR → ACO<br>IF I=1,<br>P2 PLUS ALR5-20 → BAR | REQ. STIN<br>IRX PLUS ALR5-20    ALU B |
| | | $\overline{\text{ALU}}$ → BAR<br>IF I=0,<br>ALR → ACO |
| 6 | DAI.AC1 → ALR | DAI → ALU A<br>AC1 → ALU B |
| | | IF PREVIOUS TO BCUS,<br>1 → ACC ADR<br>F(A.B) → FCT<br>IF AFTER BCUS,<br>2 → ACC ADR<br>F(A⊕B) → FCT |
| 7<br>(400 NS) | RESET TO BT0 IF:<br>(ALR=AC2).(C=0)<br>(ALR≠AC2).(C=1) | ALR → ALU A<br>AC2 → ALU B |
| | | IF (ALU A=B).(C=0)<br>OR (ALU A=B).(C=1)<br>BT0 → BTC<br>F(A) → FCT<br>IF $(\overline{\text{ALU A=B}})$.(C=0)<br>OR (ALU A=B).(C=1)<br>F(A-B) → FCT<br>3 → ACC ADR. $(\overline{\text{SCINH}})$ |
| 8 | AC3-01000 → ALR | AC3 → ALU A<br>01000 → ALU B<br>FORCE UNITS CARRY |
| | | $\overline{\text{ALU}}$ → ALR<br>3 → ACC ADR |
| 9 | ALR → AC3 | |
| | | ALR → AC3<br>F(A) → FCT<br>3 → ACC ADR |
| 10 | CLEAR ALR<br>AC3 → ALR(BYTE1 and 2) | PULSE $\overline{\text{ALRCL}}$<br>AC3 → ALU A |
| | | ALU → ALR(BYTES1 and 2)<br>F(A) → FCT |
| 11 | IF ALR=0<br>PAR+1 → PAR<br>RESET BTC | ALR → ALU A |
| | | 3 → ACC ADR<br>F(A) → FCT<br>IF ALU A=B<br>PAR+1 → PAR<br>BT0 → BTC |
| 12 | CLEAR ALR<br>AC3 → ALR(BYTE3, 4, 5) | PULSE $\overline{\text{ALRCL}}$<br>AC3 → ALU A<br>ALU → ALR(BYTE3, 4, 5)<br>F($\overline{\text{A}}$ PLUS B) → FCT<br>0 → ACC ADR |
| 13 | ALR PLUS ACO → ALR<br>IF I=0<br>RESET TO BT5<br>IF I=1<br>RESET TO BT3 | ALR → ALU A<br>ACO → ALU B |
| | | ALU → ALR<br>F(B) → FCT<br>IF I=0<br>BT5 → BTC<br>IF I=1<br>BT3 → BTC |

OP-⊕ ROTATE RIGHT (ROT)

This instruction requires the central processor to rotate the contents of the accumulator addressed by ACX (IR bits 13–16) and preset number of bits to the right. The number of bits to rotate is specified by N (IR bits 9–12). The result is then stored in the accumulator addressed by ACY (IR bits 17–20). If N is equal to O, a rotation of 16 bits is required while all other numbers call for a directly corresponding number of rotations. The IR blocks are shown in FIG. 2i.

At bit time O the address contained in the PAR is loaded into the BAR through the ALU. BAR bits 5–20 contain the program memory address whose contents will be read into the instruction register. A start bus input transfer is requested and the bit time counter is updated to BT1. Also, a bus wait signal is provided.

At BT1 the bit time counter is inhibited due to the bus wait signal. At this point in time the central processor is waiting for the input of the operational code from the program memory. The operational code is fed over DAI line 25 to input A of the ALU. It is then transferred from the output of the ALU to the instruction register where it is stored. The instruction register now contains the contents of the operational code which was addressed by the PAR. The bit time counter is advanced to BT2.

At bit time 2 the ACX accumulator is defined by IR bits 13–16. The output of the accumulator is taken to the input A of the ALU. The output of the ALU is loaded into the ALR and the BTC is advanced to BT3.

At bit time 3 IR bits 9–12 are used to generate the IR byte 3=1 command. Assuming that N is equal to 3, the bit time counter is inhibited for two processor clock cycles. Each central processor clock causes the ALR to shift its contents one bit to the right. When the command IR byte 3=1 becomes true, the BTC inhibit signal is removed and the next processor clock causes the ALR to shift its contents one more bit to the right and advance the bit time counter to BT4. This results in the ALR being shifted a total of three bits to the right.

At BT4 the ACY accumulator is defined by IR bits 17–20. The output of the ALR is loaded into the accumulator and the BTC is reset to O ending the function. The full command sequence for this operation is shown in Table 11.

Table 11

| BIT TIME | OP-θ Rotate Right DATA TRANSFER | OPERATION |
|---|---|---|
| 0 | PAR → BAR | PAR → ALU A<br>REQ. STIN<br>SET FETCH |
|   |   | ALU → BAR<br>F(A) → FCT |
| 1 | DAI → IR<br>PAR+1 → PAR<br>RESET FETCH ON BCUS | DAI → ALU A |
|   |   | ALU → IR (BCUS)<br>PAR+1 → PAR (BCUS)<br>RESET FETCH (BCUS)<br>F(A) → FCT<br>ACX  ACC ADR |
| 2 | ACX → ALR | ACX → ALU A |
|   |   | ALU → ALR |
| 3 | ROTATE ALR 1 BIT RIGHT<br>IF N≠1<br>INHIBIT BTC | SET ALR S2,<br>ALR S1 to ROTR<br>IF N≠1<br>INHIBIT BTC |

Table 11-continued

| BIT TIME | OP-θ Rotate Right DATA TRANSFER | OPERATION |
|---|---|---|
|   | DECREMENT N | ROTATE ALR<br>DECREMENT N<br>ACY → ACC ADR |
| 4 | ALR → ACY<br>RESET BTC | ALR → ACY<br>F(A) → FCT<br>BT0 → BTC |

OP-C ADD LITERAL (ADDL)

This instruction requires the central processor to take the literal stored in L (IR bits 9–20) and add in to the contents of the accumulator defined by ACY (IR bits 5–8). The result is then stored in ACY. The IR blocks for OP-7 are shown in FIG. 2j.

At bit time O the address contained in the PAR is loaded into the BAR through the ALU. BAR bits 5-12 contain the program memory address whose contents will be read into the instruction register. A start bus input transfer is requested and the bit time counter is updated to BT1. A bus wait signal also is provided.

At bit time 1 the BTC is inhibited due to the bus wait signal. At this point in time the central processor is waiting for the input of the operational code from the program memory. The operational code is fed over DAI line 25 to the ALU at input A. The DAI line will contain the operational code as addressed by the PAR. The output of the ALU is taken to the IR and loaded into the instruction register. The instruction register now contains the operational code which was addressed from program memory. The BTC is advanced to BT2.

At bit time 2 the accumulator address is defined by IR bits 5–8 (ACY). The output of the accumulator is taken to the ALU input A. IR bits 9–20 are taken to input B of the ALU. The ALU function is determined by the operational code and bit time and in this case is F(A PLUS B). The output of the ALU now contains the result of the addition of the inputs at input A and input B added together. The output of the ALU is loaded into the ALR and the BTC is advanced to BT3.

At bit time 3 the contents of the ALR are loaded into the accumulator defined by IR bits 5–8 (ACY). The bit time counter is then reset to 0 indicating the completion of the operation. The full command sequence for this operation is shown in Table 12.

Table 12

| BIT TIME | OP-C Add Immediate DATA TRANSFER | OPERATION |
|---|---|---|
| 0 | PAR → BAR | PAR → ALU A<br>REQ. STIN<br>SET FETCH |
|   |   | ALU → BAR<br>F(A) → FCT |
| 1 | DAI → IR<br>PAR+1 → PAR<br>RESET FETCH ON BCUS | DAI → ALU A |
|   |   | ALU → IR (BCUS)<br>PAR+1 → PAR (BCUS)<br>RESET FETCH (BCUS)<br>F(A) → FCT BEFORE BCUS<br>ACY → ACC ADR<br>F(A PLUS B) → FCT AFTER BCUS |
| 2 | ACY PLUS L → ALR | ACY → ALU A<br>L → ALU B |

Table 12-continued

| BIT TIME | DATA TRANSFER | OP-C Add Immediate OPERATION |
|---|---|---|
|  |  | ALU →ALR |
|  |  | ACY → ACC ADR |
| 3 | ALR →ACY |  |
|  | RESET BTC | ALR →ACY |
|  |  | F(A) →FCT |
|  |  | BTO →BTC |

OP-D BRANCH (BR)

This operational code requires the central processor to branch directly from its present program address to the one defined by ADR (IR bits 5–20). The IR blocks are shown in FIG. 2k.

At bit time 0 the address contained in the PAR is loaded into the BAR through the ALU. BAR bits 5–20 contain the program memory address whose contents will be read into the instruction register. A start bus input transfer is requested and the bit time counter is updated to BT1. Also, a bus wait signal is provided.

At BT1 the BTC is inhibited due to the bus wait signal. At this point in time the central processor is waiting for the input of the operational code from the program memory. The operational code from the program memory is transferred over DAI line 25 to input A of the ALU. It is then transferred from the output 22 of the ALU to the instruction register where it is loaded. The instruction register now contains the operational code addressed by the PAR. The bit time counter is advanced to BT2.

At BT2 IR bits 5–20 are taken to the input B of the ALU. The output of the ALU is loaded into the PAR and the bit time counter is reset to O indicating the end of the operation. The full command sequence for this operational code is shown in Table 13.

Table 13

| BIT TIME | DATA TRANSFER | OP-D Branch OPERATION |
|---|---|---|
| 0 | PAR→BAR | PAR →ALU A |
|  |  | REQ. STIN |
|  |  | SET FETCH |
|  |  | ALU →BAR |
|  |  | F(A) →FCT |
| 1 | DAI →IR | DAI→ALU A |
|  | PAR+1 →PAR |  |
|  | RESET FETCH ON BCUS | ALU →IR (BCUS) |
|  |  | PAR+1 →PAR (BCUS) |
|  |  | RESET FETCH (BCUS) |
|  |  | F(A) →FCT BEFORE BCUS |
|  |  | F(B) →FCT AFTER BCUS |
| 2 | IR 5–20 →PAR | ADR →ALU B |
|  | RESET BTC |  |
|  |  | ALU →PAR |
|  |  | F(A) →FCT |
|  |  | BT0 →BTC |

OP-E BRANCH INDIRECT (BRIND)

This operational code requires the central processor to branch from its present program address to the one defined by the accumulator ACY (IR bits 17–20). The IR blocks are shown in FIG. 2 1.

At bit time 0 the address contained in the PAR is loaded into the BAR through the ALU. BAR bits 5–20 contain the program memory address whose contents will be read into the instruction register. A start bus input transfer is requested and the bit time counter is updated to BT1 along with the provision of a bus wait signal.

At bit time 1 the BTC is inhibited due to the bus wait signal. At this point in time the central processor is waiting for the input of the operational code from the program memory. The operational code from the program memory is received over DAI line 25 at input A of the ALU. The output of the ALU transfers the operational code to the instruction register where it is stored. The instruction register now contains the contents of the operational code as addressed by the PAR. The BTC is advanced to BT2.

At bit time 2 the accumulator address is defined by IR bits 17–20 (ACY). The output of the accumulator is taken to the ALU at input A. The output of the ALU is loaded into the PAR and the bit time counter is reset to 0 indicating the end of the operation. The full command sequence for this operational code is shown in Table 14.

Table 14

| BIT TIME | DATA TRANSFER | OP-E Branch Indirect OPERATION |
|---|---|---|
| 0 | PAR→BAR | PAR →ALU A |
|  |  | REQ. STIN |
|  |  | SET FETCH |
|  |  | ALU   BAR |
|  |  | F(A)  FCT |
| 1 | DAI→IR | DAI→ ALU A |
|  | PAR+1 →PAR |  |
|  | RESET FETCH ON BCUS | ALU →IR (BCUS) |
|  |  | RESET FETCH (BCUS) |
|  |  | F(A) →FCT |
|  |  | ACY→ ACC ADR |
| 2 | ACY →PAR | ACY →ALU A |
|  | RESET BTC |  |
|  |  | ALU→PAR |
|  |  | F(A)→ FCT |

Table 14-continued

OP-E Branch Indirect

| BIT TIME | DATA TRANSFER | OPERATION |
|---|---|---|
| | | BT0 → BTC |

OP-F LOAD (LOAD)

This instruction requires the central processor to load the contents of an address defined by CA (IR bits 9–20) and store it in the accumulator defined by ACY (IR bits 5–8). The IR blocks are shown in FIG. 2m.

At bit time 0 the address contained in the PAR is loaded into the BAR through the ALU. BAR bits 5–20 contain the program memory address whose contents will be read into the instruction register. A bus start input transfer is requested and the bit time counter is updated to BT1. Also a bus wait signal is provided.

At bit time 1 the bit counter is inhibited due to the bus wait signal. At this point in time the central processor is waiting for the input of the operational code from the program memory. The operational code is transferred over the DAI line 25 to input A of the ALU. It is then transferred from the output of the ALU to the instruction register. The instruction register now contains the operational code as addressed by the PAR from the program memory. The BTC is now advanced to BT2.

At bit time 2 IR bits 9–20 (CA) are transferred to input B of the ALU. A start in is requested and the bus control unit cycle is started. The output of the ALU is loaded into the BAR and a bus wait signal is provided. The BTC is then advanced to BT3.

At bit time 3 because of the bus wait signal, the BTC is inhibited at this time. The central processor is waiting for the input data from the program memory. The DAI line feeds the ALU at input A. The output of the ALU is loaded into the ALR and the bit time counter is advanced to BT4.

At bit time 4 the accumulator address is defined by IR bits 5–8 (ACY). The accumulator is loaded and the bit time counter is reset to 0 ending the operation. The full command sequence for the operational code is shown in Table 15.

Table 15

OP-F Load

| BIT TIME | DATA TRANSFER | OPERATION |
|---|---|---|
| 0 | PAR → BAR | PAR → ALU A<br>REQ. STIN<br>SET FETCH |
| | | ALU → BAR<br>F(A) → FCT |
| 1 | DAI → IR<br>PAR+1 → PAR<br>RESET FETCH ON BCUS | DAI → ALU A |
| | | ALU → IR (BCUS)<br>PAR+1 → PAR (BCUS)<br>RESET FETCH (BCUS)<br>F(A) → FCT BEFORE (BCUS)<br>F(B) → FCT AFTER BCUS |
| 2 | CA → BAR<br>REQUEST STIN | CA → ALU B<br>REQ. STIN |
| | | ALU → BAR |
| 3 | BUSWT<br>DAI → ALR | DAI → ALU A |
| | | F(A) → FCT<br>ALU → ALR (BCUS)<br>ACY → ADD ADR |
| 4 | ALR → ACY<br>RESET BTC | ALR → ACY<br>F(A) → FCT<br>BT0 → BTC |

As can be noticed from the previous description of the operational codes, bit times 0 and 1 are common to all of the operational codes. Bit times 0 and 1 are referred to as the primary FETCH cycle wherein the particular operational code as represented by the address in the PAR is obtained from program memory and stored in the instruction register. Also common to each of the operational codes is the termination of the bus wait signal indicating that the operational code obtained from the program memory at the address in the PAR has been read into the instruction register.

FIGS. 3–41 are detailed schematic representations of the central processor of FIG. 1. Each of the circuits thereshown are comprised of standard 7400 series of circuits. Each of the individual logic blocks in the drawings has a mnemonic therein which indicates the particular type of 7400 device. The table below gives each mnemonic representation with its equivalent 7400 series number and a brief description of the type of circuit.

| MNEMONIC | 7400 EQUIV. | DESCRIPTION |
|---|---|---|
| ND1 | 7400 | QUAD 2-NAND |
| ND2 | 7401 | QUAD 2-NAND (OC) |
| NR1 | 7402 | QUAD 2-NOR |
| INV1 | 7404 | HEX INVERTER |
| INV2 | 7405 | HEX INVERTER (OC) |
| IBD1 | 7406 | HEX INVERTER BUFFER (OC) |
| BD1 | 7407 | HEX BUFFER |
| AND1 | 7408 | QUAD 2-AND |
| SMTR1 | 7413 | DUAL 4-NAND (SCHMITT TRIGGER) |
| ND3 | 7420 | DUAL 4-NAND |
| ND4 | 7430 | 8-NAND |
| ND5 | 7438 | QUAD 2-NAND BUFFER (OC) |
| ND6 | 7440 | DUAL 4-NAND BUFFER |
| AO11 | 7451 | DUAL 2×2 AND/OR/INVERT |
| AO12 | 7454 | 4×2 AND/OR/INVERT |
| FF1 | 7474 | DUAL D FLIP-FLOP |
| LTCH1 | 7475 | DUAL 2-BIT LATCH |

-continued

| MNEMONIC | 7400 EQUIV. | DESCRIPTION |
| --- | --- | --- |
| F2 | 7476 | DUAL JK FLIP-FLOP |
| XOR1 | 7486 | QUAD 2-EXCLUSIVE-OR |
| MEM1 | 7489 | 16×4 RAM |
| CTR1 | 7493 | 1+3 BIT COUNTER |
| SHFT3 | 7496 | 5+BIT SHIFT REG. |
| LTCH2 | 74100 | DUAL 4-BIT LATCH |
| MONO1 | 74121 | MONOSTABLE |
| MONO2 | 74123 | DUAL RETRIGGERABLE MONO |
| MX3 | 74150 | 16 → 1 MULTIPLEXER |
| MX1 | 74153 | DUAL 4 → 1 MULTIPLEXER |
| DEC1 | 74154 | 1/16 DECODER |
| DEC2 | 74155 | 1/8 or DUAL 1/4 DECODER |
| MX2 | 74157 | QUAD 2 → 1 MULTIPLEXER |
| SHFT4 | 74164 | 8 BIT SHIFT REG. |
| ALU1 | 74181 | 4-BIT ARITHMETIC AND LOGIC UNIT |
| CTR2 | 74193 | 4-BIT UP/DOWN COUNTER |
| SHFT2 | 74198 | 8-BIT SHIFT REG. |

Each input and output lead as shown on FIGS. 3–41 are labeled with the type of signal placed thereon in abbreviated form and reference to the glossary of terms will provide a brief definition of the various abbreviations utilized in the figures. Also, each such lead is also labeled with a figure number indicating to which circuit the particular lead is to be connected to.

Figure 3:
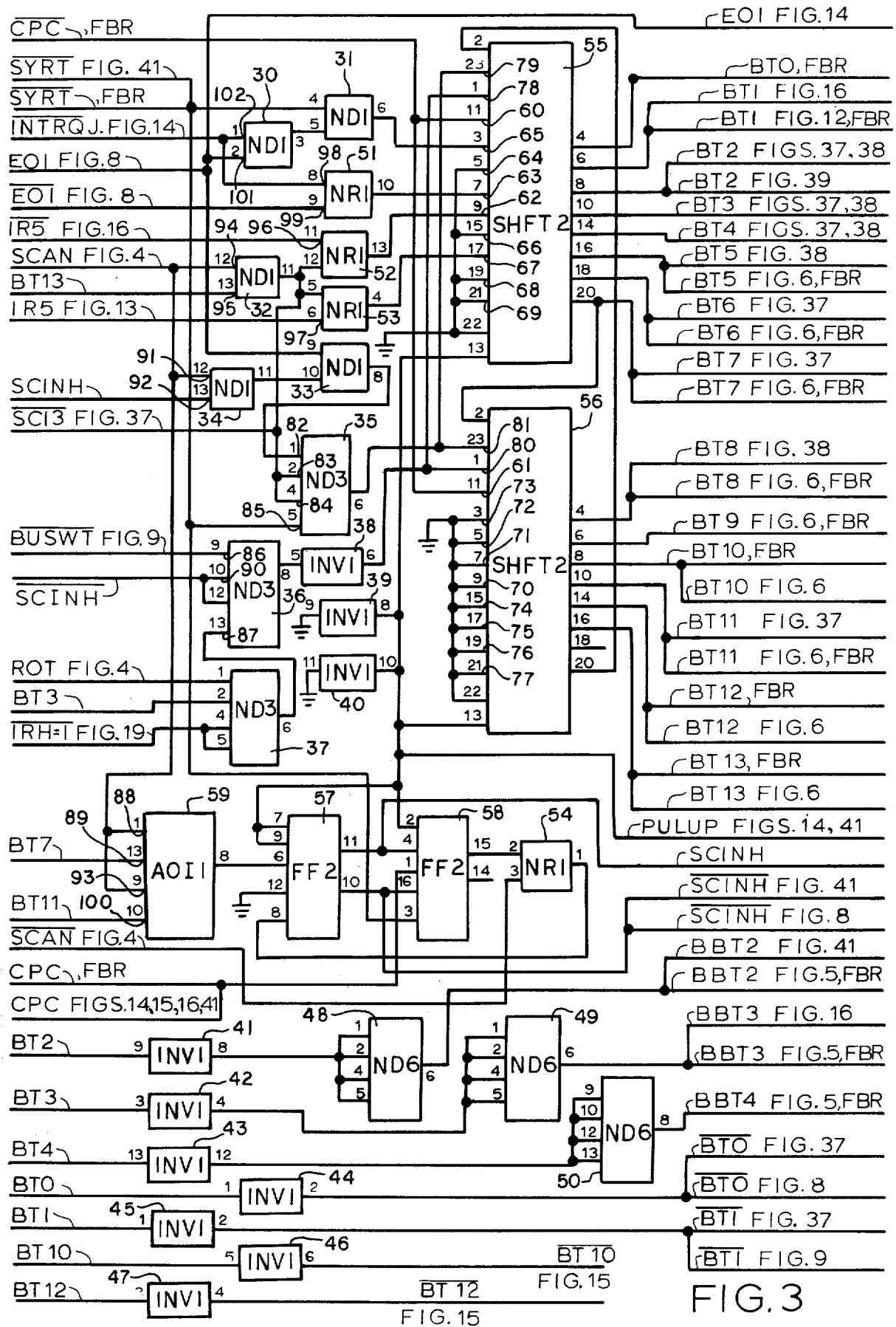
FIG. 3 is a detailed schematic diagram of the bit time counter of the central processor of FIG. 1.

Referring specifically to FIG. 3, FIG. 3 shows a detailed schematic diagram of the bit time counter of the central processor of FIG. 1. It comprises 7400 QUAD 2-NAND gates 30–34, 7420 DUAL 4-NAND gates 35–37, 7404 HEX INVERTERS 38–37, 7440 DUAL 4-NAND BUFFER gates 48–50, 7402 QUAD 2-NOR gates 51–54, 74198 8-bit SHIFT REGISTERS, 55 and 56, 7476 DUAL JK FLIP-FLOPS 57 and 58 and a 7451 DUAL 2×2 AND/OR/INVERTER 59.

The bit time counter of FIG. 3 is a 16 bit shift register with shift registers 55 and 56 operating in series. It generates at its output lead BT0-BT13 bit time signals to be used to initialize the logic control circuits in the central processor. Bit time counter is driven on its clock inputs 60 and 61 with central processor clock pulses at lead CPC and may be considered to be a free running counter. However, logic levels inputs 62–77 along with control function inputs 78-81 provide for parallel loading, shifting down or inhibiting the bit time counter as required for the processor operation codes. The bit time counter input functions include bus wait (BUSWT), system reset (SYRT), rotate operational code, scan operational code, interrupt (INTRQJ), and end of instruction (EOI).

For the bus wait function, during bit time 1 of each operational code the central processor must wait until a data transfer has been completed. Because the length of time required to perform a data transfer is longer than one bit time (200 ns.), the bit time counter is inhibited until the data transfer has been completed. Input 82 and NAND gate 35 will be high due to EOI (end of instruction) being low. Inputs 83 and 84 will be high due to $\overline{SCT3}$ being high. Input 85 will be high due to $\overline{SYRT}$ (system reset) being high. Therefore, control function input 79 and 81 will be low. Control function input 78 and 80 will be low due to $\overline{BUSWT}$ at input 6 of NAND gate 36 being low. Control function inputs 80 and 81 and 78 and 79 being low will inhibit the advance of the bit time counter. As soon as the data transfer is complete, $\overline{BUSWT}$ goes high allowing control function input 78 and 80 to go high. The next central processor clock pulse advances the bit counter to BT2.

In performing the system reset function, during a system reset, $\overline{SYRT}$ is forced low. Input 65 of shift register 55 will be high. A low on input 85 of NAND gate 35 forces control function input 79 and 81 high. Control function input 78 and 80 are forced high due to all inputs of NAND gate 36 being high. $\overline{SYRT}$ being low forces $\overline{BUSWT}$ and $\overline{SCINH}$ to go high during system reset. Input 87 of NAND gate 36 is forced high due to the fact that the down counter of FIG. 19 will eventually reach count one. Control function inputs 78 and 79 and 80 and 81 all being high allow the shift registers to parallel load the data on input 65 to lead BT0. The bit time counter is now at bit time 0.

Figure 19:
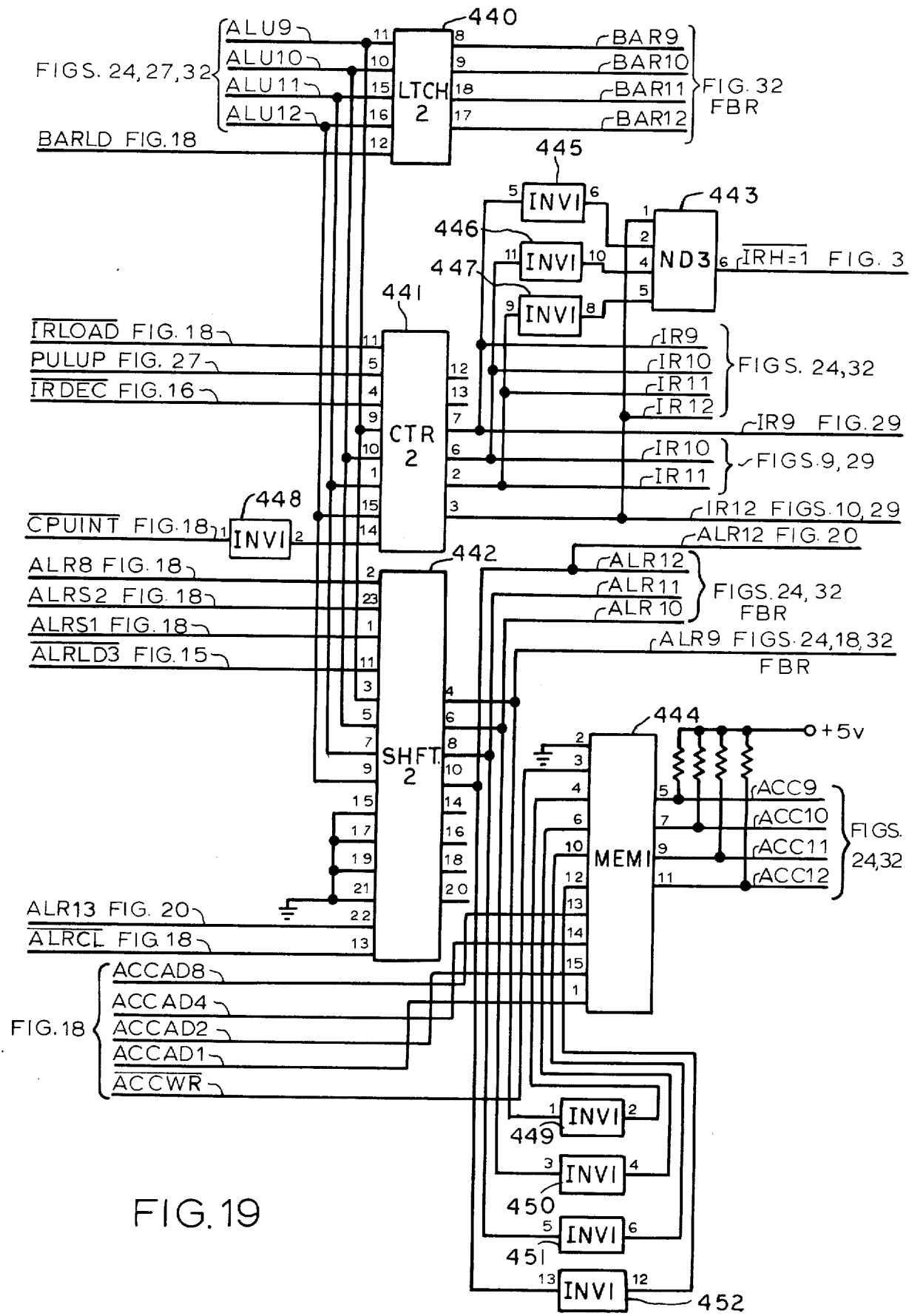

During the rotate operational code, bit time 3 of the rotate operational code is extended beyond 200 ns. to allow the down counter of FIG. 19 to reach count 1. Control function inputs 79 and 81 will be low due to all inputs of NAND gate 35 being high. Control function inputs 78 and 80 will be low due to all inputs of NAND gate 37 being high (input $\overline{IRH=1}$ will be high as long as the down counter of FIG. 19 does not contain count 1). Control function inputs 80 and 81 and 78 and 79 being low inhibit the bit time counter. Thus bit time 3 is extended. As soon as the down counter reaches count 1, $\overline{IRH=1}$ goes low causing control function input 78 and 80 to go high. The bit time counter will advance to the next bit time on the next central processor clock pulse.

During certain portions of the scan operational code it is necessary to inhibit the bit time counter or force it to a new bit time (other than normal advancements). Bit time 7 is extended to 400 ns. by inhibiting the bit time counter. At the beginning of bit time 7 control function input 78 and 80 are high due to all the inputs to NAND gate 36 being high. Control function input 79 and 81 are low due to all inputs of NAND gate 35 being high. Flip-flop 57 will be set due to inputs 88 and 89 of dual and/or/inverter 59 being high. Control function inputs 78 and 80 go low due to $\overline{SCINH}$ at input 90 of NAND gate 36 being low. Control function inputs 79 and 81 are maintained low due to inputs 91 and 92 of NAND gate 34 being high. The bit time counter is now inhibited from advancing to the next bit time. Flip-flop 58 will now set on the next central processor clock pulse. The output of NOR gate 54 goes low and clears flip-flop 57. Control function inputs 78 and 80 now go high due to $\overline{SCINH}$ going high. Flip-flop 58 resets on the next central processor clock pulse. The bit time counter will now advance to the next bit time on the next central processor clock pulse. In this manner bit time 7 was extended to 400 ns. Bit time 11 is extended to 400 ns. in a similar manner by inputs 93 and 100 of the dual and/or/inverter 59. During bit time 13 of the scan operational code a decision must be made. If IR bit 5 is equal to 1, the bit time counter should be set to bit time 3. If IR bit 5 is not equal to 1, the bit time counter must be set to BT5. Control function inputs 78 and 80 will be high due to all inputs of NAND gate 36 being high. Control function inputs 79 and 81 will be high due to inputs 94 and 95 of NAND gate 32 being high. If IR 5 is equal to 1, input 96 of NOR gate 52 is low, thus input 62 of shift register 55 is high. The bit time counter will be set to bit time 3 on the next central processor clock pulse. If IR 5 is equal to 0, input 97 or NOR gate 53 will be low, thus input 67 of shift register 55 will be high. The bit time counter will then set to BT5 on the next central processor clock pulse.

When an interrupt occurs the bit time counter is not affected until the end of instruction (EOI) is reached. If at the end of an instruction $\overline{INTRQJ}$ is low, input 63 of viding true high logic levels for use in the central processor. Table 16 shows the hexadecimal input to operational code relationships.

Table 16:

| | | | | | Hexadecimal Input to OP Code Relationships | |
|---|---|---|---|---|---|---|
| DECI - INPUT | | | | HEXA- | | |
| A8 | A4 | A2 | A1 | DECIMAL | OP CODE | DESCRIPTION |
| 0 | 0 | 0 | 0 | 0 | 0 (JSR) | Jump to Subroutine |
| 0 | 0 | 0 | 1 | 1 | 1 (COMP) | Compare |
| 0 | 0 | 1 | 0 | 2 | 2 (MASK) | Mask |
| 0 | 0 | 1 | 1 | 3 | 3 (SUPER) | Superimpose |
| 0 | 1 | 0 | 0 | 4 | — | Not Used |
| 0 | 1 | 0 | 1 | 5 | — | Not Used |
| 0 | 1 | 1 | 0 | 6 | 6 (BYTST) | Byte Test |
| 0 | 1 | 1 | 1 | 7 | 7 (BYSET) | Byte Set |
| 1 | 0 | 0 | 0 | 8 | 8 (DATA) | Data Handling |
| 1 | 0 | 0 | 1 | 9 | 9 (SCAN) | Scan |
| 1 | 0 | 1 | 0 | θ | 10 (ROT) | Rotate Right |
| 1 | 0 | 1 | 1 | B | — | Not Used |
| 1 | 1 | 0 | 0 | C | 12 (ADDL) | Add Literal |
| 1 | 1 | 0 | 1 | D | 13 (BR) | Branch |
| 1 | 1 | 1 | 0 | E | 14 (BRIND) | Branch Indirect |
| 1 | 1 | 1 | 1 | F | 15 (LOAD) | Load | shift register 55 goes high due to inputs 98 and 99 of NOR gate 51 being low. Control function inputs 79 and 81 will both be high due to input 82 of NAND gate 35 being low and all inputs of NAND gate 36 being high. The bit time counter is set to BT2 on the next central processor clock pulse.

Each operational code utilizes a certain number of bit times. Regardless of the number of bit times associated with each operational code, EOI goes high at the conclusion of the final bit time. Input 65 of shift register 55 goes high due to input 101 of NAND gate 30 going high (input 102 is normally high). Control function inputs 78 and 80 are high due to input 82 of NAND gate 35 being low. The bit time counter is set to BT0 on the next central processor clock pulse. Note if $\overline{INTRQJ}$ is low at the end of an instruction the bit time counter will be set to BT2 on CPC.

Bit time BT2, BT3 and BT4 are buffered to provide more drive for central processor control functions. For example, BT2 is buffered by inverter 41 and NAND gate 48 to provide BBT2.

Bit times BT0, BT1, BT10 and BT11 are inverted by inverters 44, 45, 46 and 47 respectively thus providing true logic 0 levels for use with central processor control functions.

Figure 4:
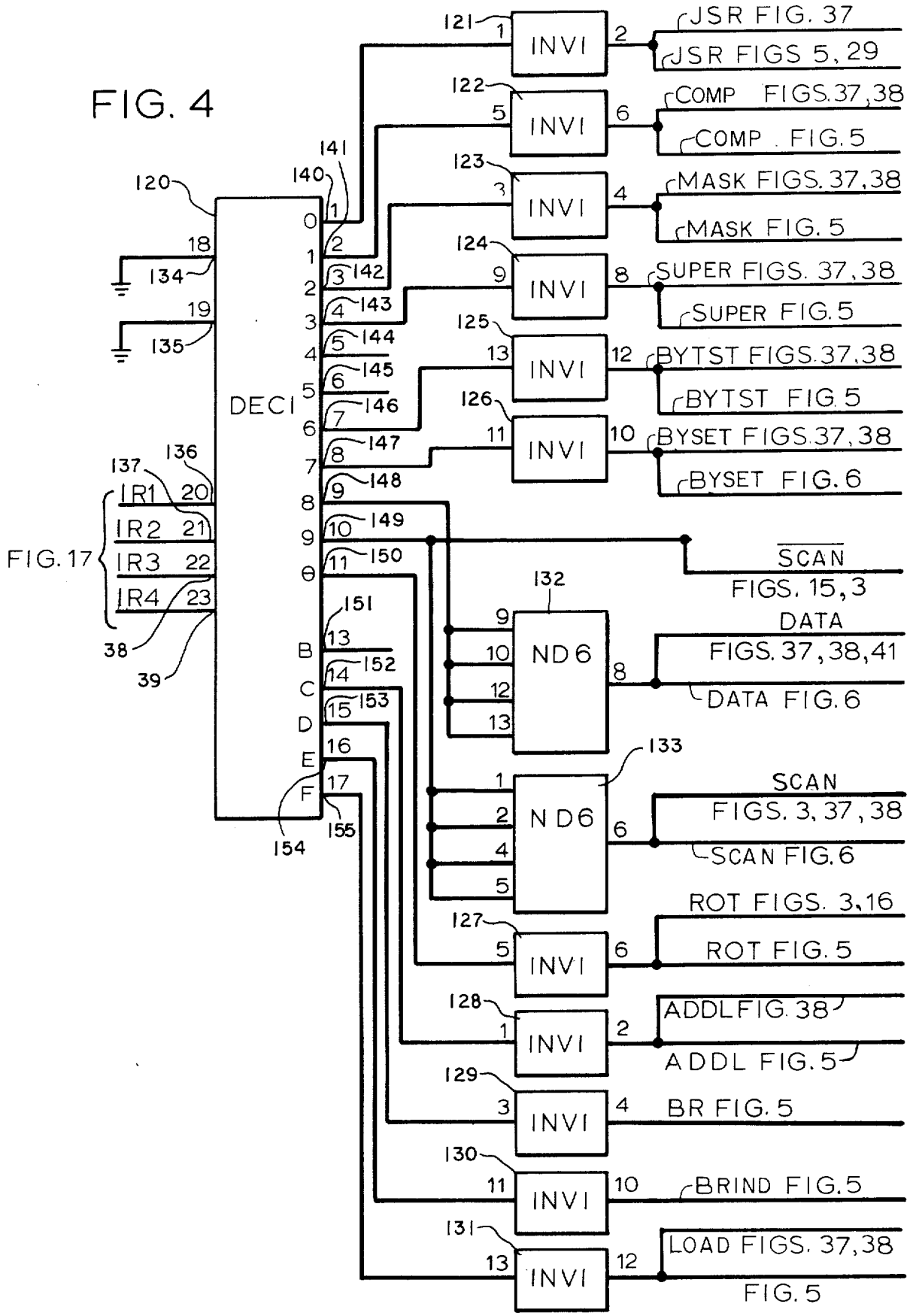
Figure 5:
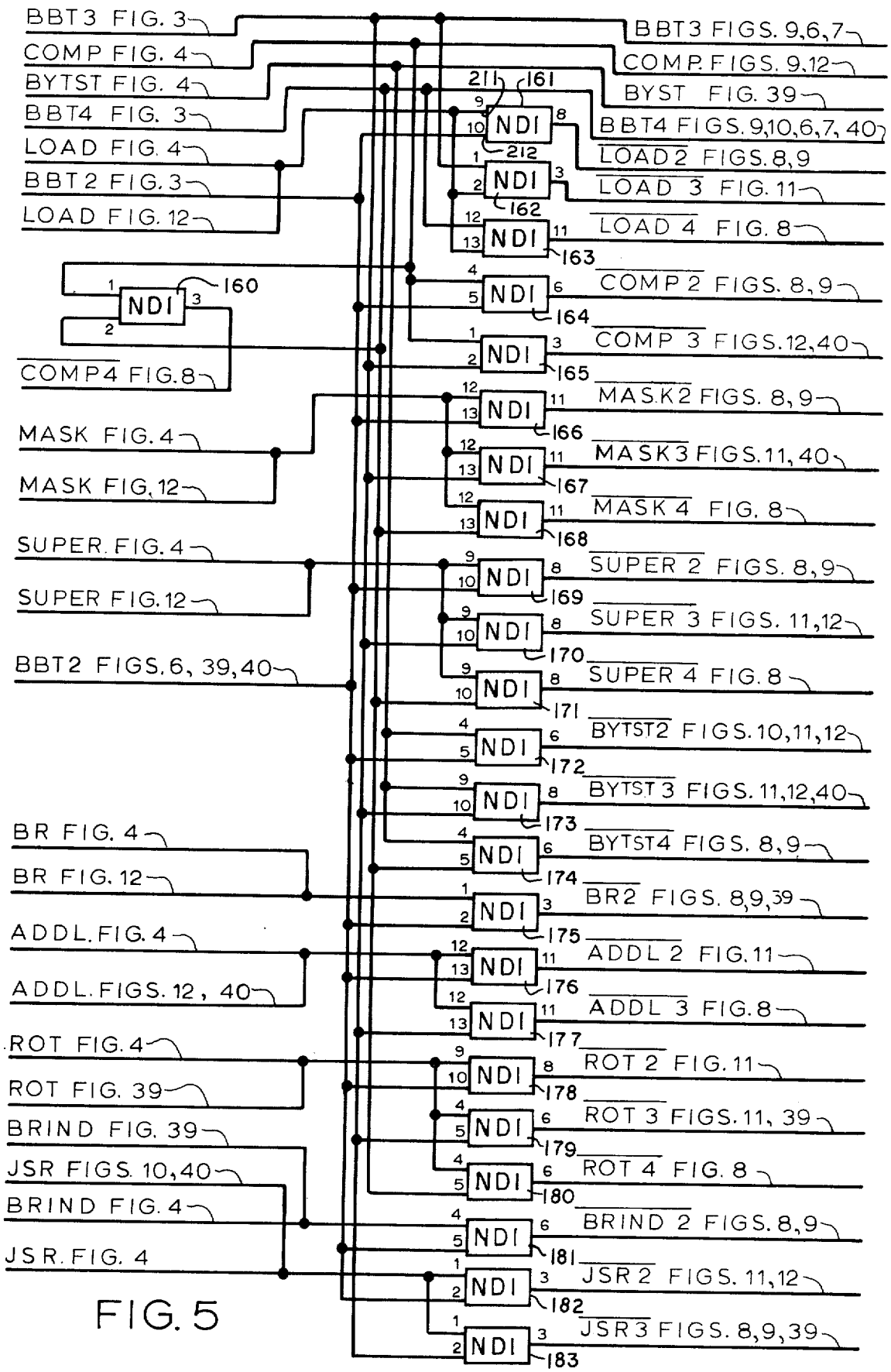
Figure 6:
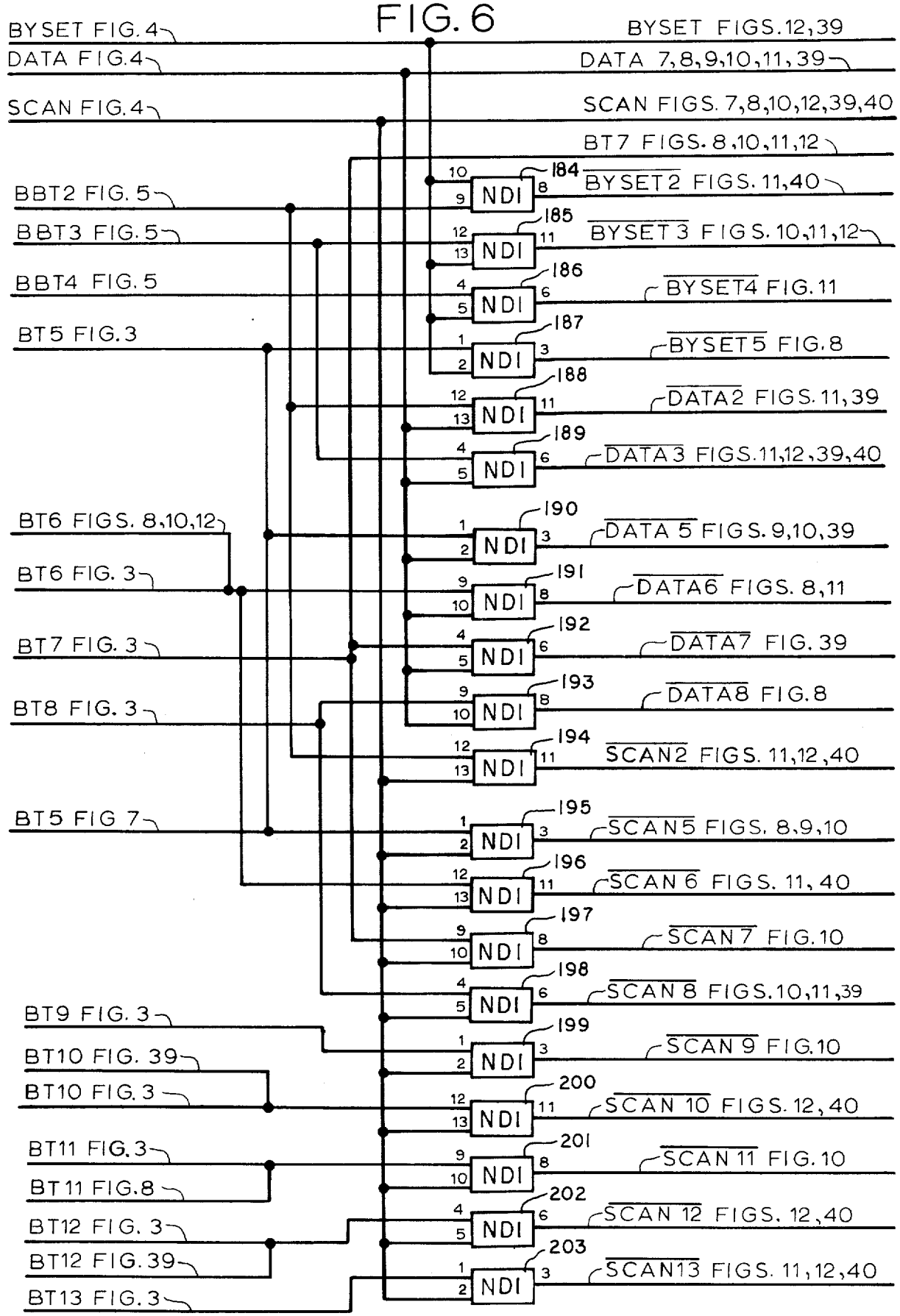
Figure 7:
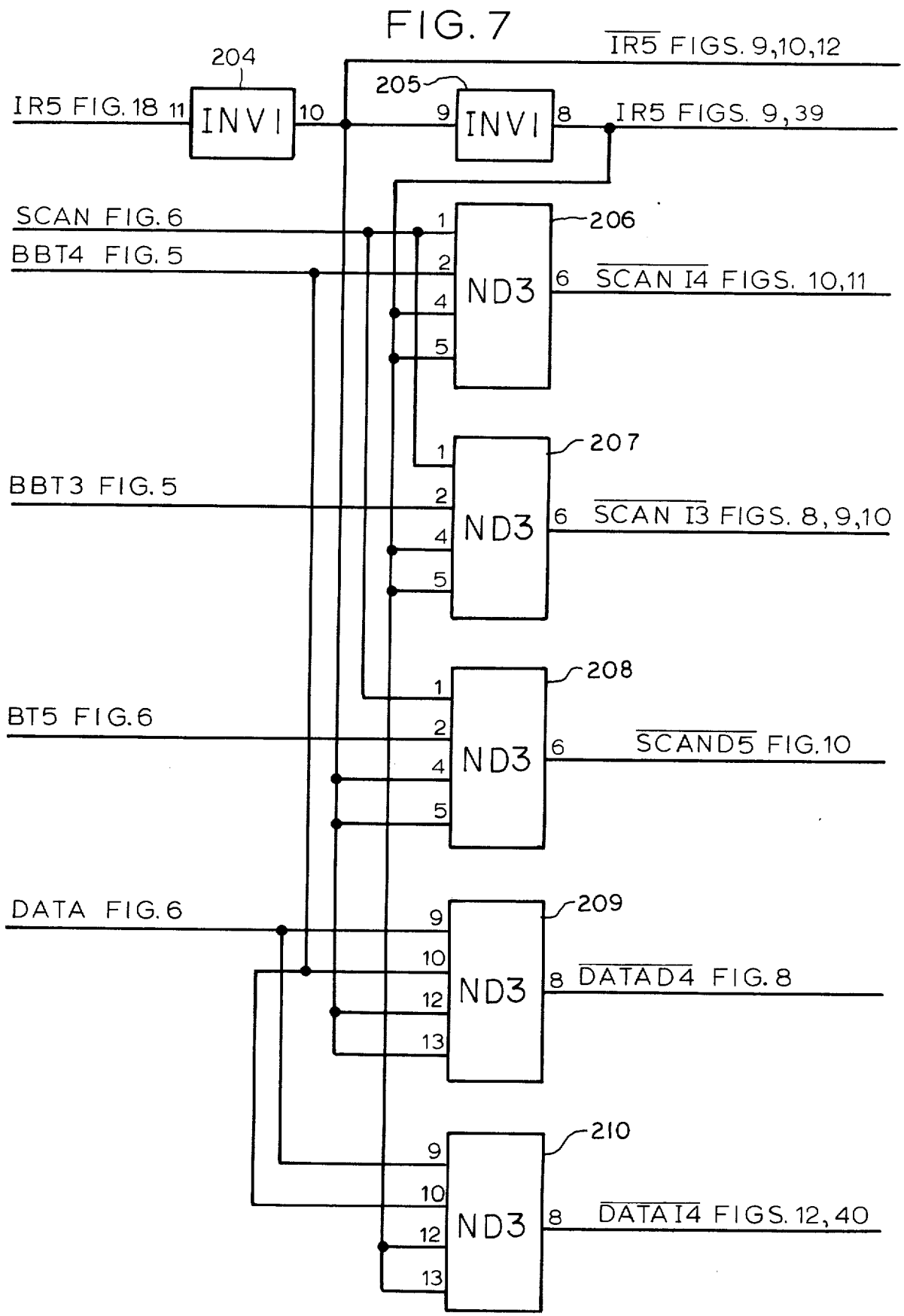

FIGS. 4–13 and FIGS. 37–40 show detailed schematic circuit diagrams of the control word generator of FIG. 1. Referring specifically to FIG. 4 for the moment, the portion of the control word generator thereshown is the operational code decoder.

The operational code decoder comprises a 74154 1/16 DECODER 120, 7404 HEX INVERTERS 121–131 and 7440 DUAL 4-NAND BUFFER gates 132 and 133 all interconnected as shown in FIG. 4.

The function of the operational code decoder is to decode instruction levels which are representative of the current operational code. Function control inputs 134 and 135 of decoder 120 are permanently low, thus the hexadecimal input on leads 136, 137, 138 and 139 is decoded and appears as a low logic level on the respective output lead 140–155. The corresponding hexadecimal output is shown adjacent to each of the leads 140–155. For example, a hexadecimal input equal to 7 would be represented as a low logic level on output 147. All other outputs would remain high. Outputs 144, 145 and 151 are not used. Inverters 121–131 and buffer gates 132 and 133 invert the decoder outputs pro- Referring now to FIGS. 5, 6 and 7, the portion of the control word generator thereshown is the bit time decoding circuitry. The circuit portion of FIG. 5 comprises 7400 QUAD 2-NAND gates 160–183 interconnected as shown. The circuit of FIG. 6 comprises 7400 QUAD 2-NAND gates 184–203. The circuit of FIG. 7 comprises 7404 HEX INVERTERS 204 and 205, and 7420 DUAL 4-NAND gates 206–210.

The function of the operational code bit time decoding circuit is to provide a series of logic levels which are a direct function of a particular operational code and bit time combination. The outputs of NAND gates 160-203 are true low logic levels. For example, on bit time 2 of the load operational code inputs 211 and 212 of NAND gate 161 are both high providing a low on its output $\overline{LOAD2}$. All other NAND gate outputs will be high at this time.

Inverters 204 and 205 and NAND gates 206-210 in addition to decoding the operational code bit time functions additionally decode instruction register bit 5. For instance, $\overline{SCAN14}$ becomes true low during bit time 4 of the scan operational code as long as bit 5 in the instruction register is equal to 1.

Figure 8:
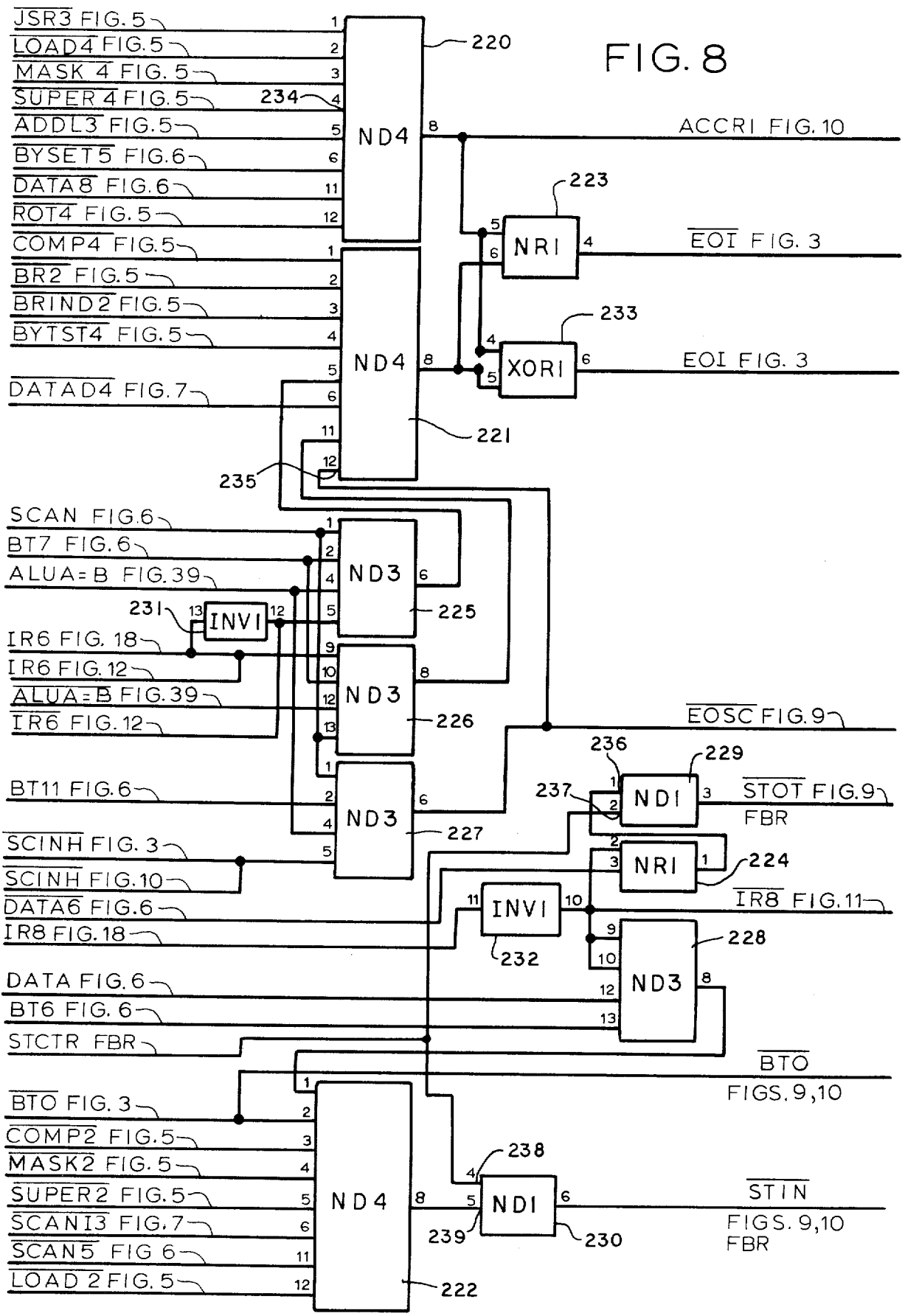

Referring now to FIG. 8, the circuit thereshown is a portion of the control word generator which generates the ACCR1, EOI, STIN and STOT functions. It comprises 7430 8-NAND gates 220, 221 and 222, 7402 QUAD 2-NOR gates, 223 and 224, 7420 DUAL 4-NAND gates 225–228, 7400 QUAD 2-NAND gates 229 and 230, 7404 HEX INVERTERS 231 and 232, and a 7486 QUAD 2-EXCLUSIVE OR gate 233.

The ACCR1 function is produced as a high output as a result of any one input to NAND gate 220 going low. ACCR1 along with CPC on FIG. 10 generates the accumulator write function. For example, during bit time 4 of the superimpose operational code, input 234 of NAND gate 220 ($\overline{SUPER4}$) goes low, thus ACCR1 goes high.

The end of instruction command is true ($\overline{EOI}$ low and EOI high) when any one input to NAND gates 220 or 221 goes low. For example, input 235 of NAND gate 221 goes low as a function of SCAN- BT11 ALU=B . $\overline{SCINH}$.

The request for the data out bus cycle ($\overline{STOT}$ low) is true when the inputs 236 and 237 of NAND gate 229 are both high. Input 237 is normally high. Input 236 goes high on DATA6 . IR8, that is, data handling operational code, bit time 6 and mode 1.

The request for data in bus cycle ($\overline{STIN}$ low) is true when the inputs 238 and 239 of NAND gate 230 are both high. Input 238 is normally high. Input 239 goes high when any one input to NAND gate 222 goes low as a function of DATA . BT6 . $\overline{IR8}$, that is, the data handling operational code, bit time 6 and mode 0.

Figure 9:
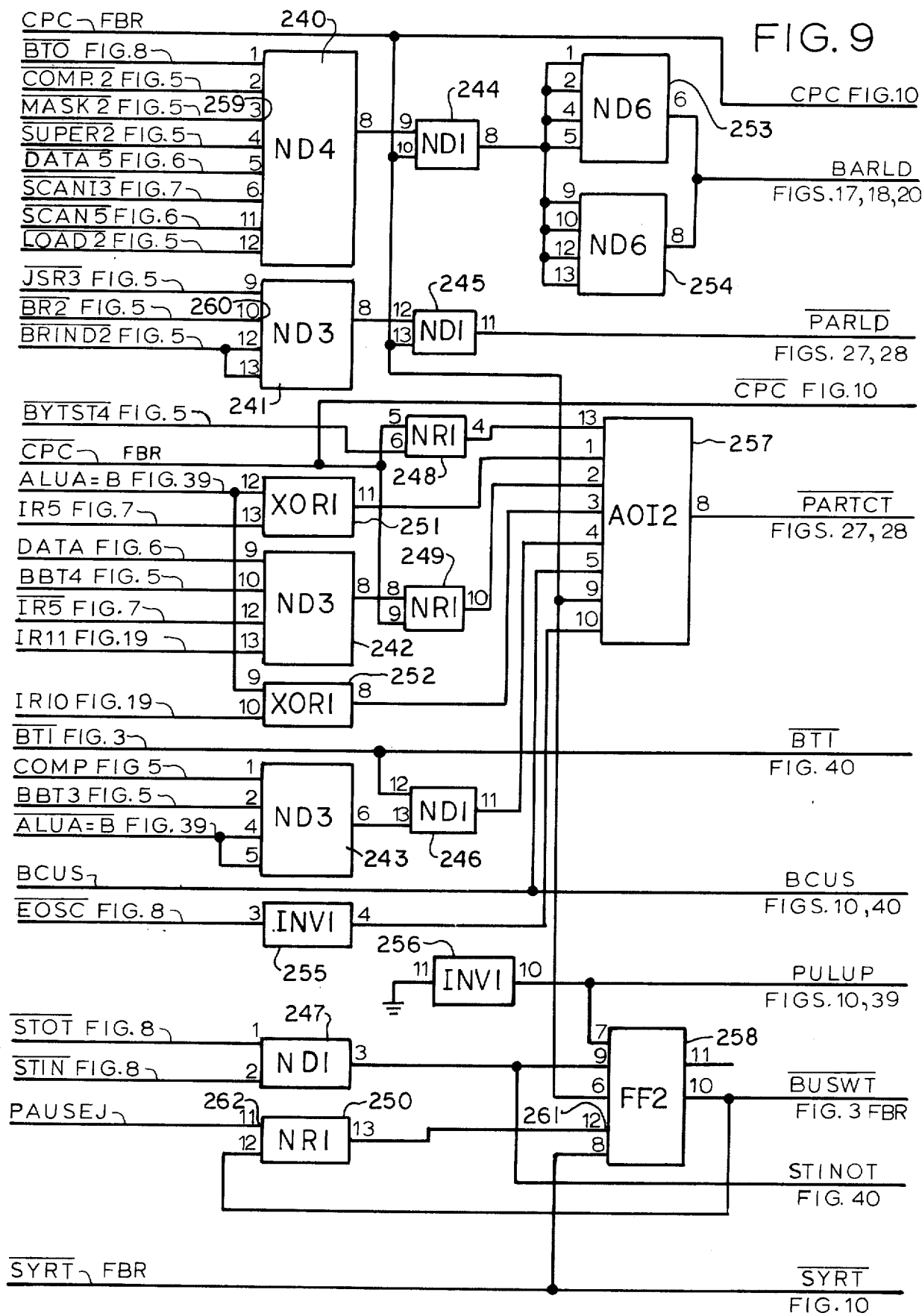

FIG. 9 shows the detailed schematic diagram of that portion of the control word generator which generates the functions BARLD, PARLD, PARCT, BCUS, BUSWT and STINOT. The circuit of FIG. 9 comprises a 7430 8-NAND gate 240, 7420 DUAL 4-NAND gates 241, 242 and 243, 7400 QUAD 2-NAND gates 244-247, 7402 QUAD 2-NOR gates 248, 249 and 250, 7486 QUAD 2-exclusive OR gates 251 and 252, 7440 DUAL 4-NAND BUFFER gates 253 and 254, 7404 HEX INVERTERS 255 and 256, 7454 4×2 AND/OR-/INVERT gate 257 and a 7476 DUAL JK FLIP-FLOP 258.

The bar load function is initiated when BARLD is high when any one input of NAND gate 240 is low and CPC is high. For example, the bus address register is loaded on bit time 2 of the mask operational code (input 259 is low).

Loading the program address register is initiated when $\overline{PARLD}$ is low. This occurs when any one input to NAND gate 241 goes low and CPC is high. For example, the program address register is loaded on bit time 2 of the branch operational code when input 260 of NAND gate 241 is low.

During certain operational codes it is necessary to advance the program address register by one count. The output of and/or/inverter 57 (PARCT) goes low on one of the following conditions.

```
BYTST4 . ALUA=B . IR5 . CPC
BYTST4 . ALUA=B . IR5 . CPC
DATA . BBT4 . IR5 . IR11 . ALUA=B . IR10 . CPC
DATA . BBT4 . IR5 . IR11 . ALUA=B . IR10 . CPC
BT1 . BCUS
COMP . BBT3 . ALUA=B . BCUS
EOSC . CPC
```

As previously mentioned, during certain operational codes it is necessary to inhibit the bit time counter until a data transfer has been completed. This is accomplished by generating the $\overline{BUSWT}$ function. BUSWT going low and providing the bus wait signal is a function of the setting of flip-flop 258. Logic functions required to set flip-flop 258 include STIN . CPC or STOT . CPC (STIN and STOT are both data transfer functions). The K input 261 of flip-flop 258 is kept low by input 262 of NOR gate 250 being high in response to PAUSEJ. PAUSEJ goes low as soon as a data transfer is completed. PAUSEJ being low along with $\overline{BUSWT}$ at a low causes flip-flop 258 to reset on CPC. $\overline{BUSWT}$ now goes high allowing the bit time counter to advance to the next bit time.

Figure 10:
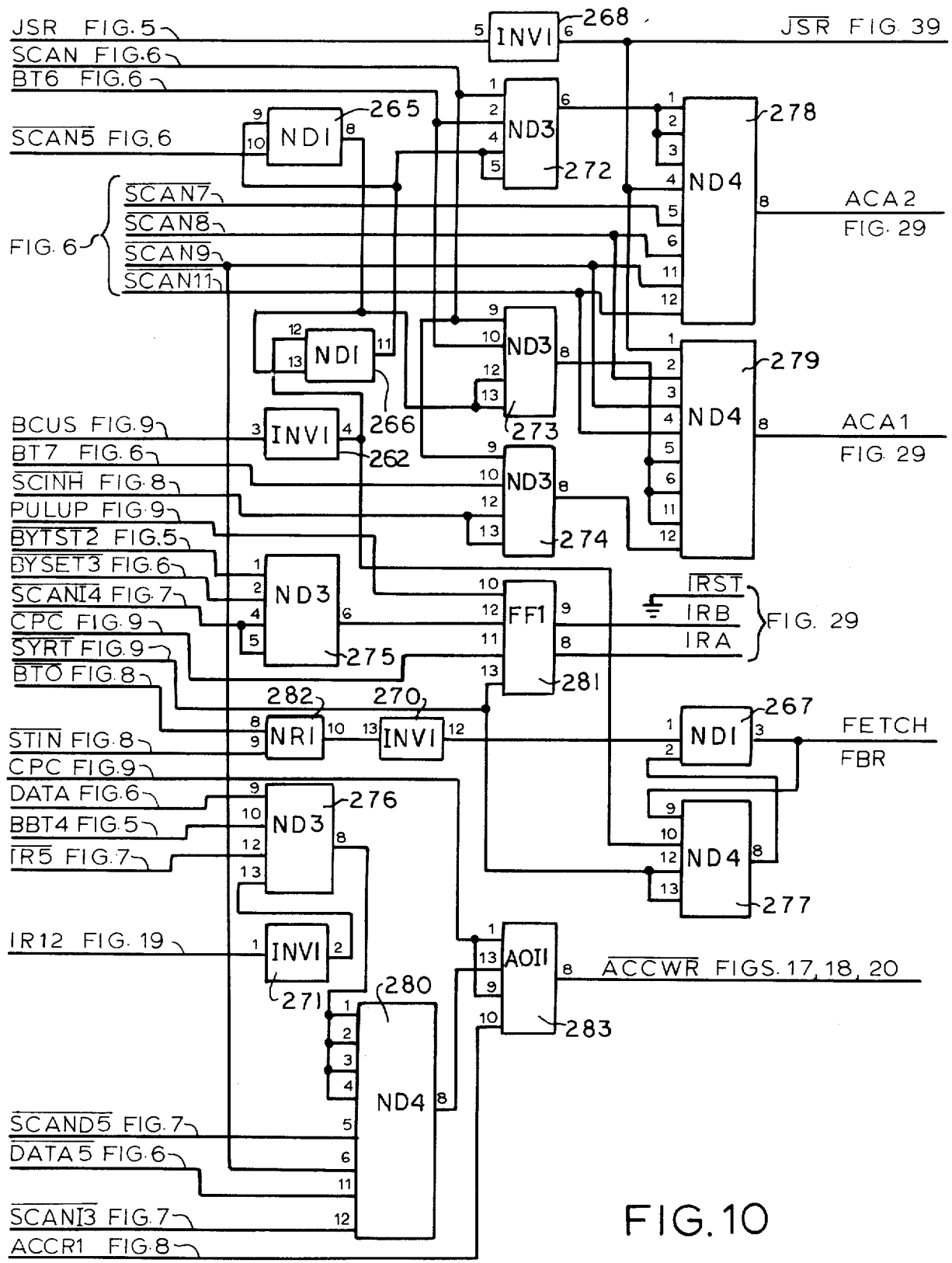

Referring now to FIG. 10, the circuit thereshown is a portion of the control word generator which initiates the functions ACA2, ACA1, IRA, IRB, FETCH and ACCWR. The circuit of FIG. 10 comprises 7400 QUAD 2-NAND gates 265, 266 and 267, 7404 HEX INVERTERS 268-271, 7420 DUAL 4-NAND gates 272-277, 7430 8-NAND gates 278, 279 and 280, a 7474 DUAL D FLIP-FLOP 281, a 7402 QUAD 2-NOR gate 282 and a 7451 DUAL 2×2 AND/OR/INVERTER 283.

ACA2 and ACA1 are used when determining the address of a particular accumulator. For example, during the jump to subroutine operational code the contents of the program address register is stored in accumulator F. Input 284 of NAND gate 278 and input 285 of NAND gate 279 are both low when JSR is low. ACA2 and ACA1 will both be high and are used in defining accumulator F. When any one input to NAND gate 278 goes low, ACA2 goes high. When any one input to NAND gate 279 goes low ACA1 goes high.

During certain operational codes it may be necessary to make a change to only one byte of data. IRA and IRB are used to define which byte is to be changed. With flip-flop 281 reset, IRA is high and IRB is low. Any one input to NAND gate 275 going low along with CPC will cause flip-flop 281 to set allowing IRA to go low and IRB to go high.

During bit time 0 and STIN the output of NAND gate 267 (FETCH) goes high. FETCH is used in the fault buffer allowing the fault buffer to distinguish between the FETCH and EXECUTE cycles. Logic gates 267 and 277 function as a latch. That is to say, when FETCH is at a high the output of NAND gate 277 is locked to a low as long as BCUS is low (input to inverter 269). FETCH remains high until the bit time counter advances from $\overline{BT0}$ and BCUS goes high.

Accumulator write ($\overline{ACCWR}$ at a low) allows data to be stored in a predetermined accumulator. $\overline{ACCWR}$ goes low as a function of the following:

```
DATA . BBT4 . IR5 . IR12 . CPC
SCAND5 . CPC
SCAN9 . CPC
DATA5 . CPC
SCAN13 . CPC
ALLR1 . CPC
```

Figure 11:
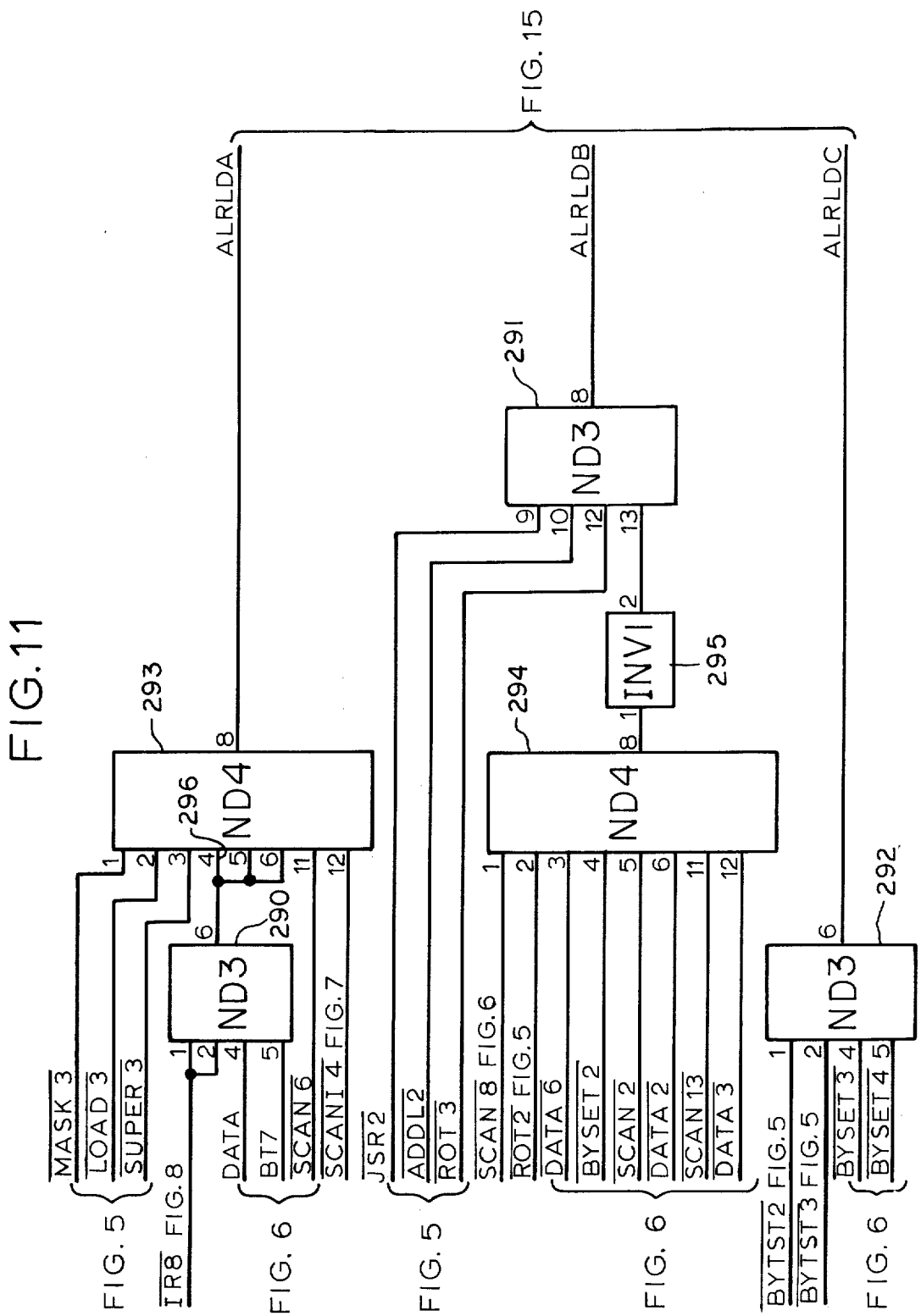

Referring now to FIG. 11, the circuit thereshown is the portion of the control word generator which generates the arithmetic logic register functions. It comprises 7420 DUAL 4-NAND gates 290, 291 and 292, 7430 8-NAND gates 293 and 294 and a 7404 HEX INVERTER 295.

As previously mentioned, this circuit is part of the circuit which provides the arithmetic logic register load function. ALRLDA, ALRLDB and ALRLDC are generated when it is necessary to load the arithmetic logic register. Any one input of NAND gate 293 going low will cause ALRLDA to go high. For example, on DATA . BT7 . $\overline{IR8}$, inputs 296 of NAND gate 293 go low, thus ALRLDA will be high. Any one input of NAND gate 291 or NAND gate 294 going low will cause ALRLDB to go high. Any one input of NAND gate 292 going low will cause ALRLDC to go high.

Figure 12:
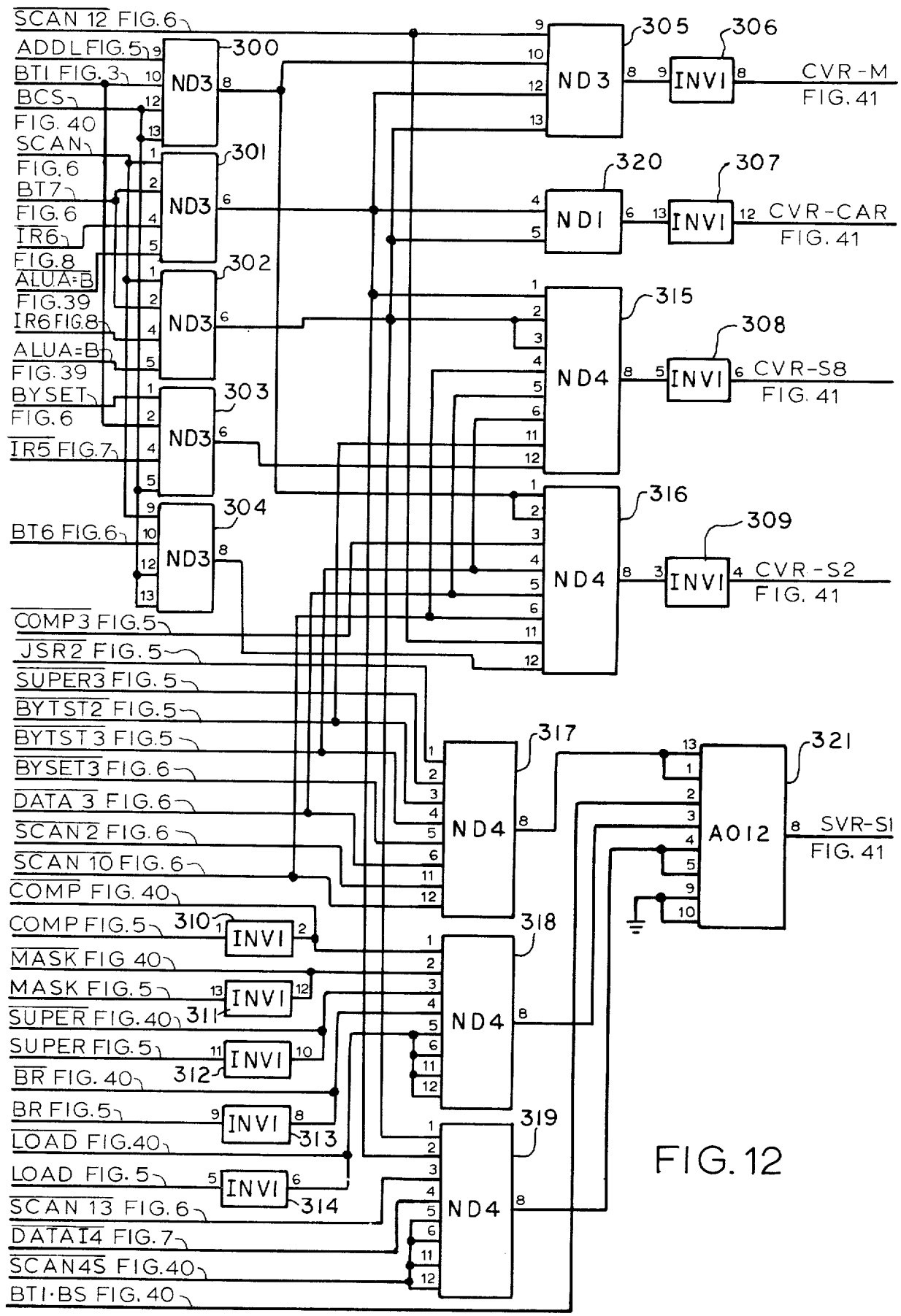

FIG. 12 is a portion of that part of the control word generator which initiates those functions during certain operational codes and bit time combinations in order to control the action taken by the arithmetic logic unit (ALU). The functions generated are CVR-S1, CVR-S2, CVR-S8, CVR-CAR and CVR-M. These are generated as a direct function of an operational code, bit time and instruction register content. The outputs of the circuit of FIG. 12 are taken to the circuit shown in FIG. 41 where they are encoded to be used as the function input to the ALU. The circuit of FIG. 12 comprises 7420 DUAL 4-NAND gates 300–305, 7404 HEX INVERTERS 306–314, 7430 8-NAND gates 315–319, 7400 QUAD 2-NAND gate 320 and a 7454 4×2 AND-/OR/INVERT gate 321.

Figure 13:
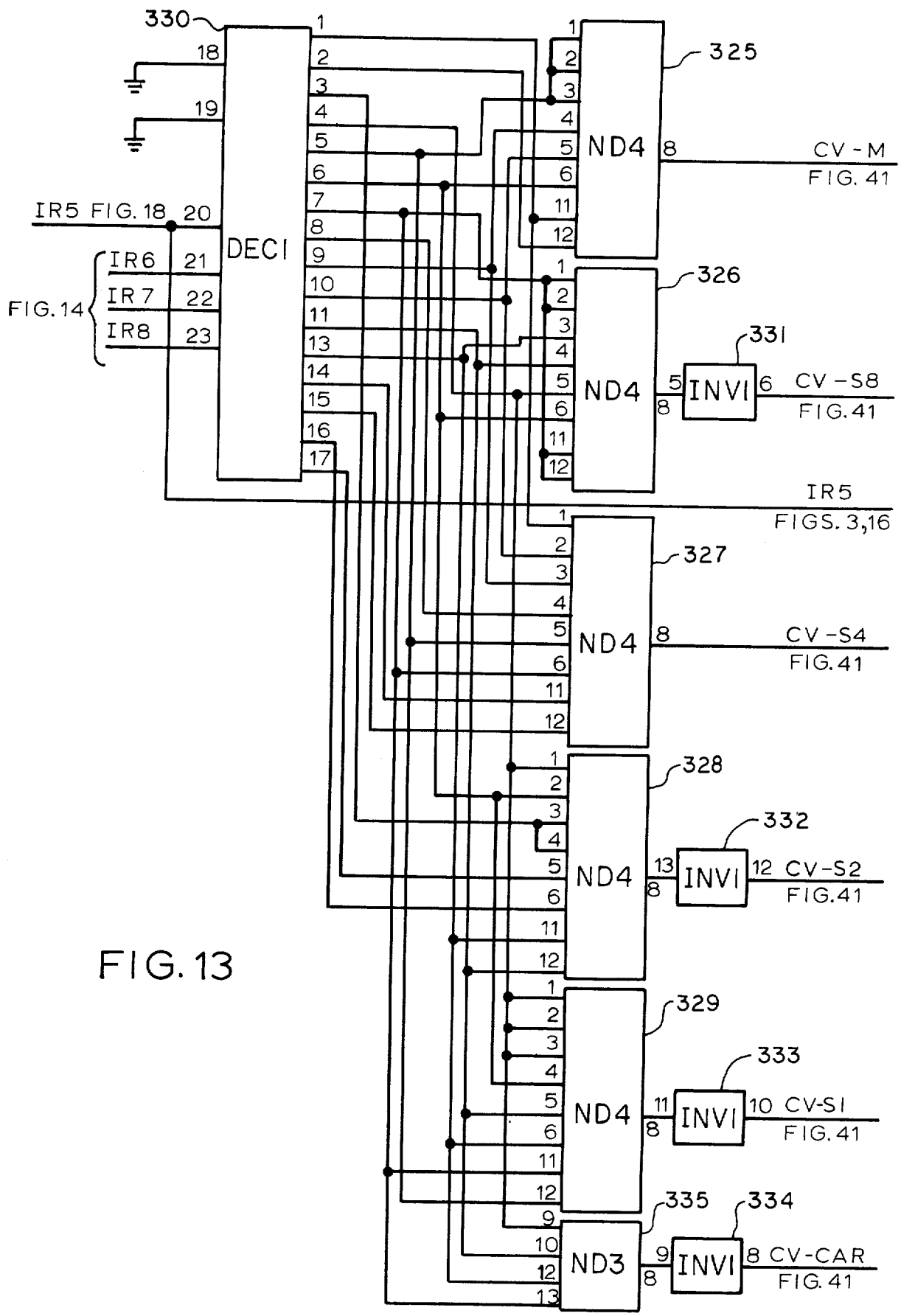
Figure 41:
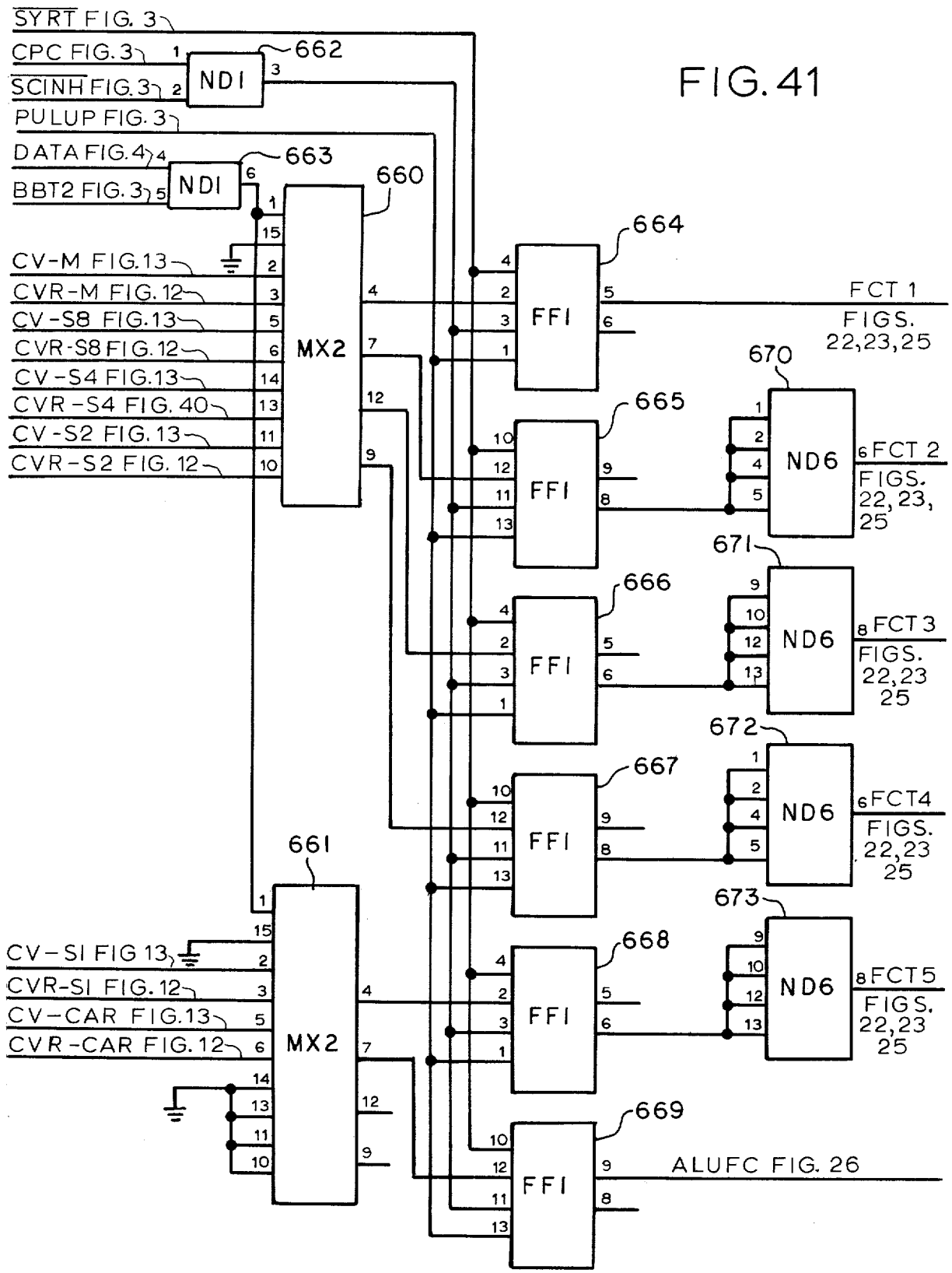
FIG. 41 is a detailed schematic circuit diagram of the function control of FIG. 1.

FIG. 13 is that portion of the control word generator which provides CV-S1, CV-S2, CV-S4, CV-CAR and CV-M which are taken to FIG. 41 where they are encoded to be used as the function input to the ALU. These outputs are generated during bit time 2 of the data handling operational code according to the content of the instruction register in bits 6, 7 and 8. The circuit of FIG. 13 comprises 7430 8-NAND gates 325–239, 74154 1/16 DECODER 330, 7404 HEX INVERTERS 331–334 and 7420 DUAL 4-NAND gate 335.

The circuit of FIG. 14 comprises 7400 QUAD 2-NAND gates 385 and 386, 7404 HEX INVERTERS 387 and 388, a 7476 DUAL JK FLIP-FLOP 389 and a 74154 1/16 DECODER 390.

As previously explained, the arithmetic logic register consists of 20 bits of data (or 5 bytes, each of 4 bits). During the process of a certain operational code it may be necessary to load the arithmetic logic register with only one byte of information. Instruction register bits 6, 7 and 8 are decoded by decoder 390 providing outputs BYTE1, BYTE2, BYTE3, BYTE4, BYTE5. These outputs are taken to FIG. 15 where they are used to control the loading of the arithmetic logic register.

Figure 15:
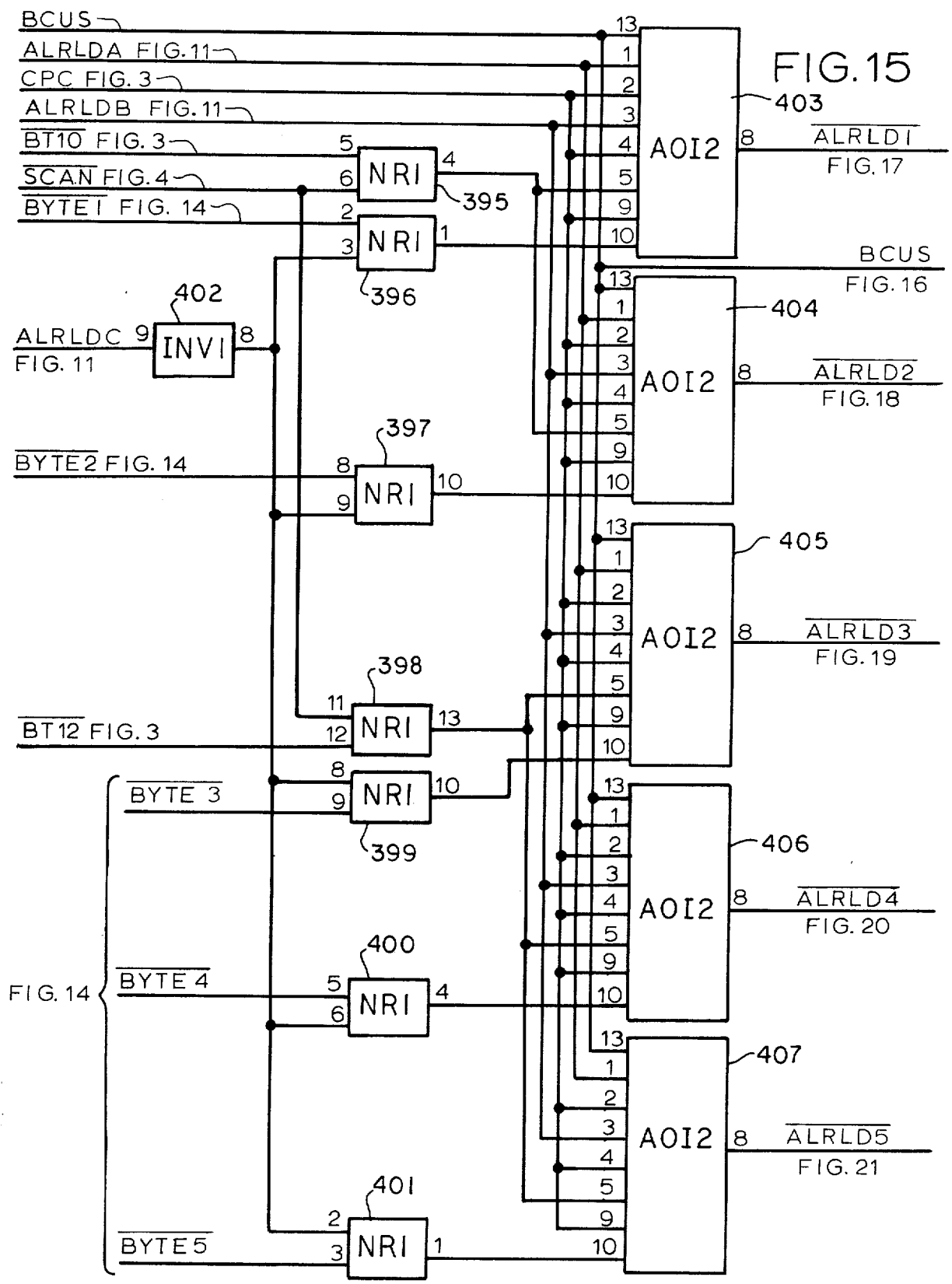

The circuit of FIG. 15 comprises 7402 QUAD 2-NOR gates 395–401, 7404 HEX INVERTER 402 and 7454 4×2 AND/OR/INVERT gates 403–407.

This circuit controls the loading of each byte in the arithmetic logic register. For example, $\overline{ALRLD1}$ going low provides the load pulse for byte 1 in the ALR. Similarly, $\overline{ALRLD2}$, $\overline{ALRLD3}$, $\overline{ALRLD4}$ and $\overline{ALRLD5}$ going low provide the load pulses for ALR bytes 2, 3, 4 and 5 respectively. All ALR bytes are loaded when BCUS . ALRLDA or CPC . ALRLDB are present. ALR byte 1 is loaded when CPC . SCAN CPC . BT10 or CPC. ALRLDC . BYTE1 is present. ALR byte 2 is loaded when CPC . SCAN . BT10 or CPC . ALRLDC . BYTE2 is present. ALR byte 3 is loaded when CPC. SCAN . BT12 or CPC . ALRLDC . BYTE3 are present. ALR byte 4 is loaded when CPC . SCAN . BT12 or CPC . ALRLD . BYTE4 are present and ALR byte 5 is loaded when CPC . SCAN . BT12 or CPC . ALRLDC . BYTE5 are present.

Figure 16:
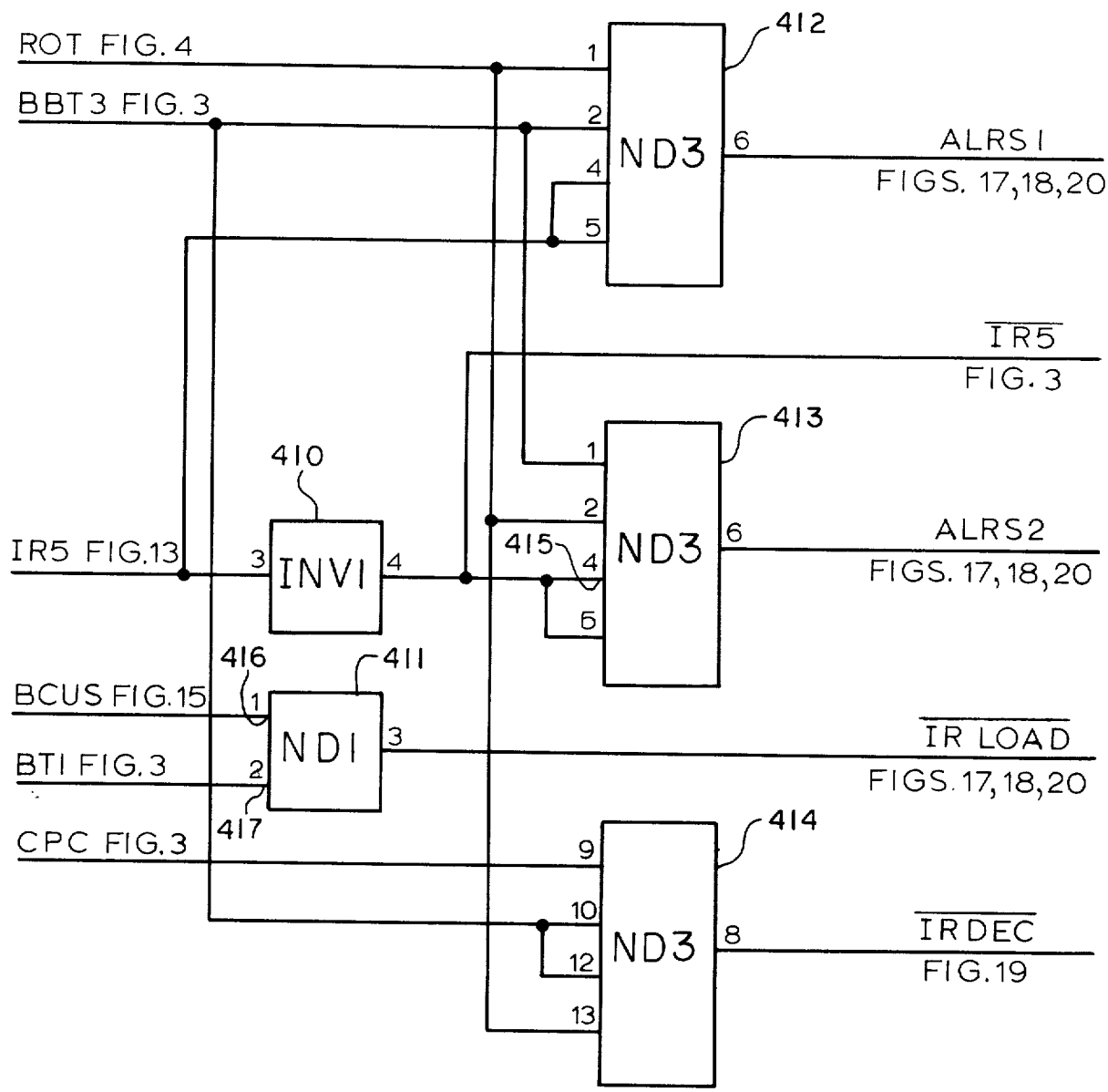

The circuit of FIG. 16 comprises 7404 HEX INVERTER 410, 7400 QUAD 2-NAND gate 411 and 7420 DUAL 4-NAND gates 412, 413 and 414. Function leads ALRS1 and ALRS2 provide the function control input to the arithmetic logic register shift register. For the most part ALRS1 and ALRS2 will be high providing a parallel load function to the arithmetic logic register.

If instruction register bit 5 is equal to 1 during bit time 3 of the rotate operational code, ALRS1 will go low due to all inputs to NAND gate 412 going high. ALRS2 will remain high due to input 415 of NAND gate 413 remaining low. This provides a shift left function to the arithmetic logic register. However, if instruction register bit 5 is equal to 0 during bit time 3 of the rotate operational code, ALRS1 will remain high and ALRS2 will go low. This provides a shift right function to the arithmetic logic register. The shift left operation is never used in the present processor.

The output of NAND gate 411 goes low when inputs 416 and 417 of NAND gate 411 both go high (BCUS . BT1). This provides a load function to the instruction register.

For the instruction register decrement, the number of rotations to be completed by the rotate operational code is stored in IR bits 9–12. The output of NAND Gate 414 ($\overline{IRDEC}$) goes low on CPC . BBT3 . ROT. Since the bit time counter is inhibited at this time, IR bits 9–12 will be decremented on each CPC. The contents of the ALR are shifted right at the same time until the rotation is complete (IR bits 9–12 equal to count 1).

Figure 37:
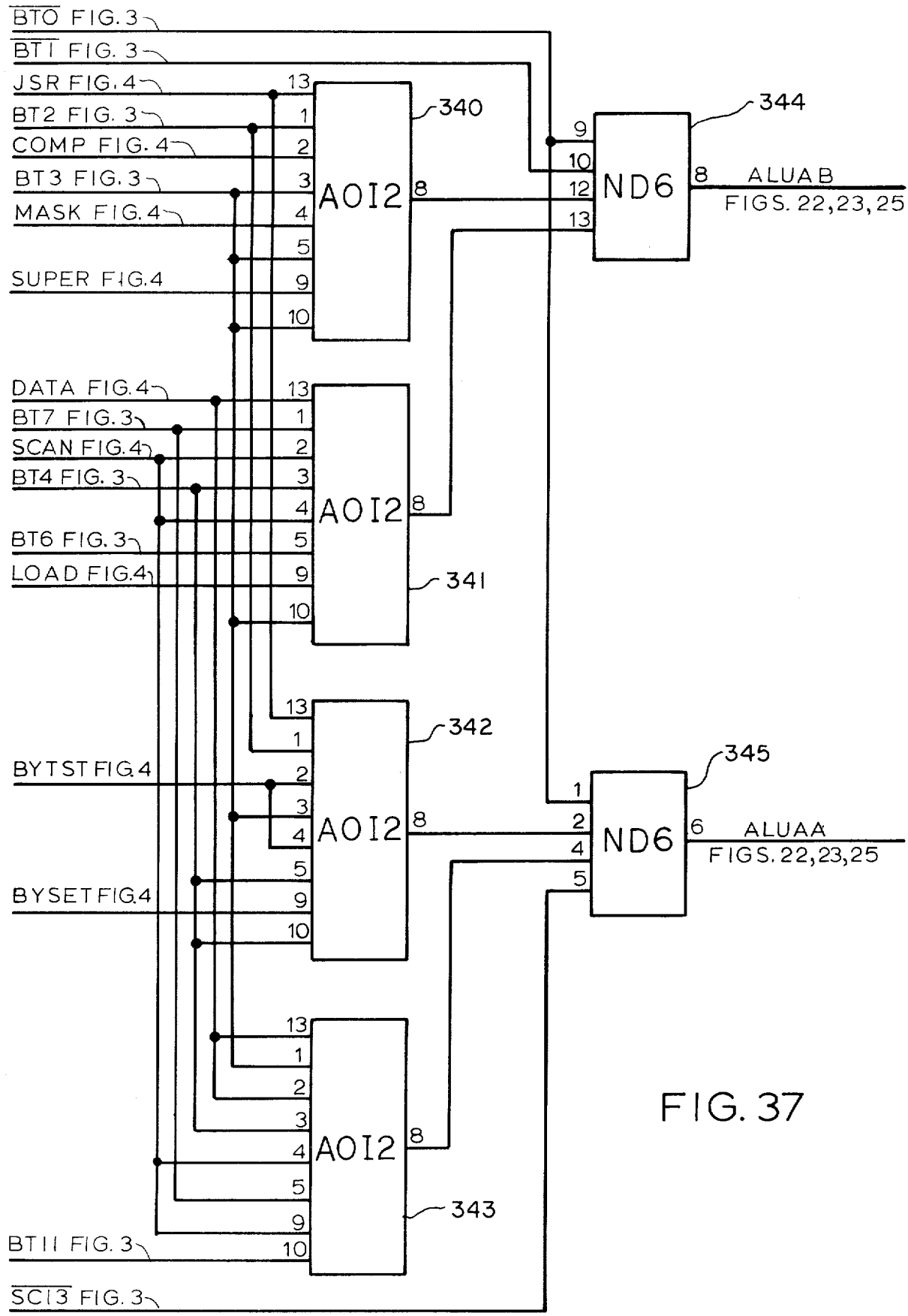
FIGS. 37-40 are detailed schematic diagrams showing additional portions of the control word generator of FIG. 1.

Referring to FIGS. 37–40 which comprise the balance of the control word generator, the circuit of FIG. 37 controls the data flow to the ALUA inputs. The arithmetic logic unit comprises two sets of inputs, namely, the ALU-A input and the ALU-B input. Control functions ALUAA and ALUAB control the data flow to the ALU-A inputs of the ALU. The circuit of FIG. 37 comprises 7454 4×2 AND/OR/INVERT gates 340–343 and 7440 DUAL 4-NAND BUFFER gates 344 and 345. Table 17 lists the ALU-A Input functions and associated data transfers.

Table 17

| ALU-A Input Functions | | |
|---|---|---|
| ALU AA | ALU AB | 1 2 3 4 5 6 7 8 9 10 11 12 13 14 15 16 17 18 19 20 |
| 0 | 0 | ACC1 through ACC20 |
| 1 | 0 | ALR1 through ALR20 |
| 0 | 1 | DAI01 through DAI20 |
| 1 | 1 | 0 0 0 0    PAR5 through PAR20 |

Figure 38:
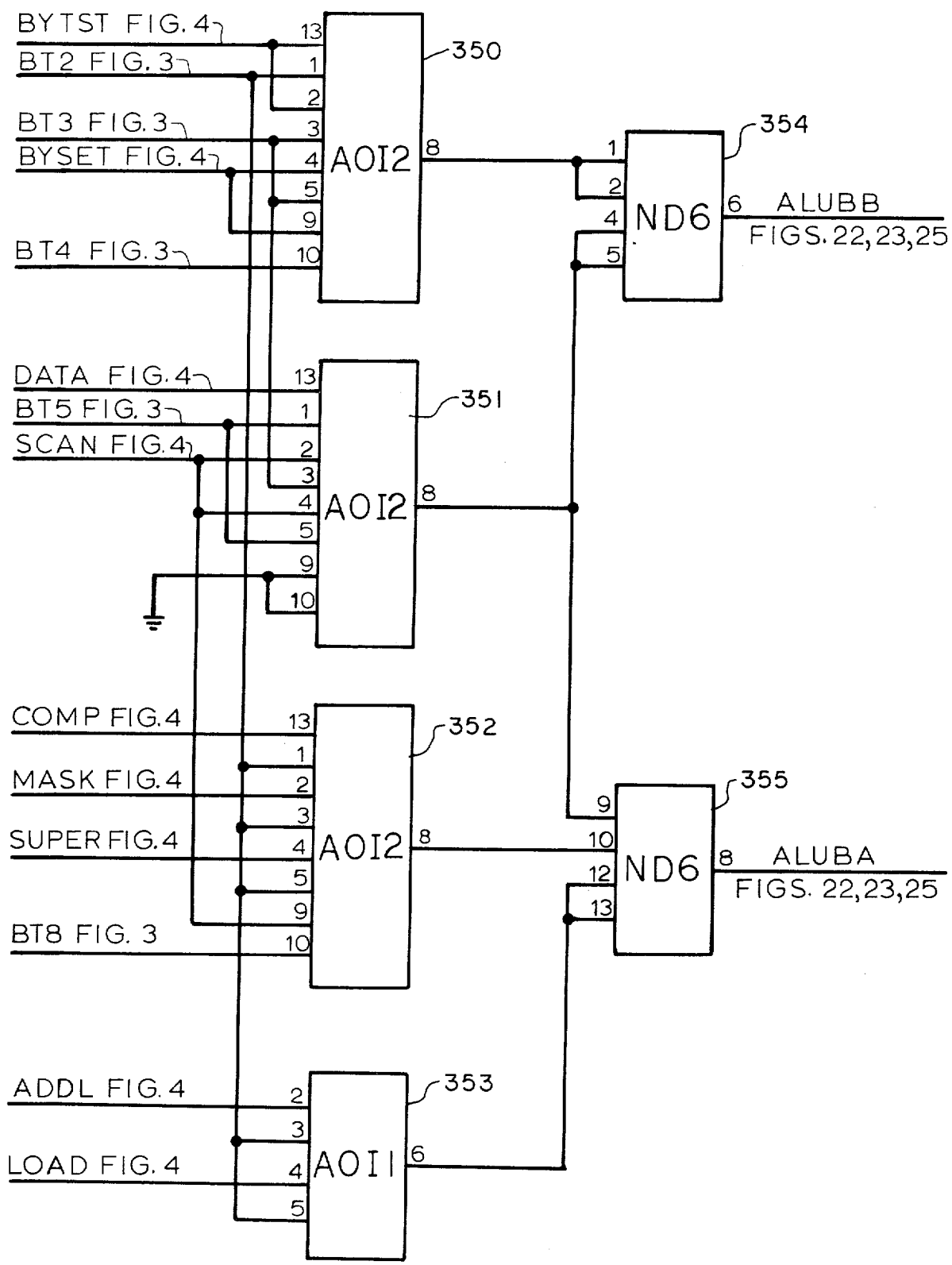

FIG. 38 is similar to FIG. 37 in that it controls data flow to the ALU but to the B inputs of the ALU instead of the A inputs. The data flow is controlled by control functions ALUBA, ALUBB and ALUBC. ALUBC is derived on the circuit of FIG. 39. The circuit of FIG. 38 comprises 7454 4×2 AND/OR/INVERT gates 350, 351 and 352, 7440 DUAL 4-NAND BUFFER gates 354 and 355 and 7451 DUAL 2×2 AND/OR/INVERT gate 353. Table 18 lists ALU-B input functions and associated data transfers.

Table 18

| ALUBA | ALUBB | ALUBC | ALU-B Input Functions DATA TRANSFER TO ALU-B INPUT 1 2 3 4 5 6 7 8 9 10 11 12 13 14 15 16 17 18 19 20 |
|---|---|---|---|
| 0 | 0 | 0 | ACC1 through ACC20 |
| 0 | 0 | 1 | 0 0 0 0    IR5 through IR20 |
| 1 | 0 | 0 | 0 0 0 0 0 0 0 0    IR9 through IR20 |
| 1 | 0 | 1 | 0 0 0 0 0 0 0 1 0 0 0 0 0 0 0 0 0 0 0 0 |

Table 18-continued

| ALUBA | ALUBB | ALUBC | ALU-B Input Functions DATA TRANSFER TO ALU-B INPUT 1 2 3 4 5 6 7 8 9 10 11 12 13 14 15 16 17 18 19 20 |
|---|---|---|---|
| 0 | 1 | 0 | IRX8-1 IRX8-1 IRX8-1 IRX8-1 IRX8-1 |
| 0 | 1 | 1 | 0 0 0 0 0 0 0 0 0 0 0 0 0 0 0 0 0 0 0 0 |
| 1 | 1 | 0 | IRX8-1 ALR5 through ALR20 |
| 1 | 1 | 1 | 0 0 0 0 0 0 0 0 0 0 0 0 0 0 0 0 0 0 0 0 |

Figure 39:
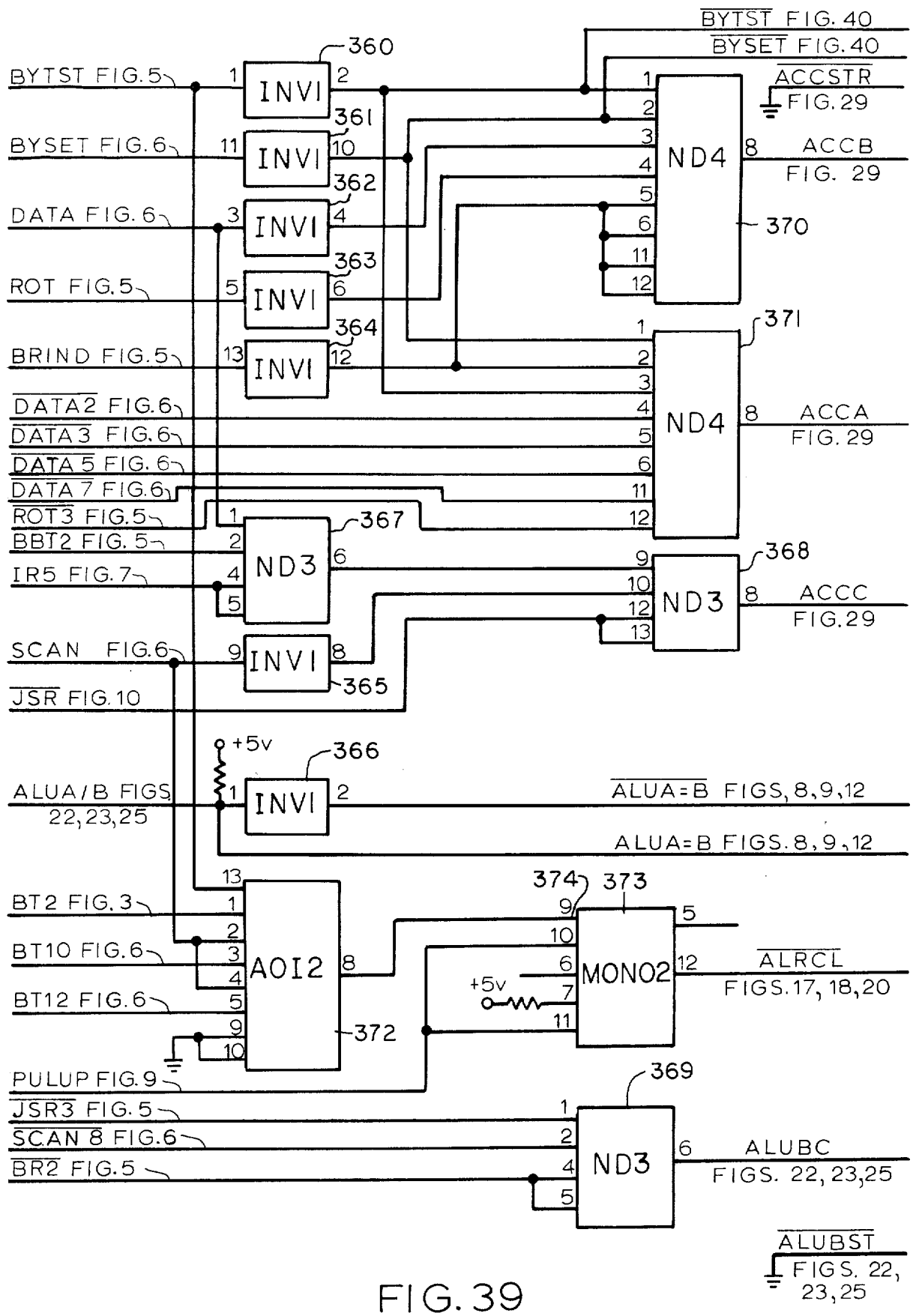

The circuit of FIG. 39 comprises 7404 HEX INVERTERS 360–366, 7420 DUAL 4-NAND gates 367-369, 7430 8-NAND gates 370 and 371, 7454 4×2 AND/OR/INVERT gate 372 and a 74123 DUAL RETRIGGERABLE MONOSTABLE MULTIVIBRATOR 373.

During certain operational codes it is required to use a predetermined accumulator in order to read or store a specific result. Instruction register bits determine the store to be used. Control functions ACCA, ACCB and ACCC select a proper accumulator according to the operational code bit time combinatiion. Table 19 lists the ACCA, ACCB and ACCC functions and associated IR bit to accumulator decoding.

Table 19:

| ACCA | ACCB | ACCC | ACCA, ACCB and ACCC Functions SELECTED IR BITS |
|---|---|---|---|
| 0 | 0 | 0 | 5,6,7,8 |
| 0 | 0 | 1 | JSR, ACA2, ACA1 |
| 1 | 0 | 0 | 9,10,11,12 |
| 1 | 0 | 1 | JSR, ACA2, ACA1 |
| 0 | 1 | 0 | 13,14,15,16 |
| 0 | 1 | 1 | JSR, ACA2, ACA1 |
| 1 | 1 | 0 | 17,18,19,20 |
| 1 | 1 | 1 | JSR, ACA2, ACA1 |

If a comparison between ALU-A input and the ALU-B input is made and they prove to be equal the output of inverter 366 ($\overline{ALUA=B}$) will go low. Monostable multivibrator 373 will fire when input 374 begins to go low which is used to clear the arithmetic logic register. Forty-five nanoseconds after firing, monostable 373 will reset.

Figure 40:
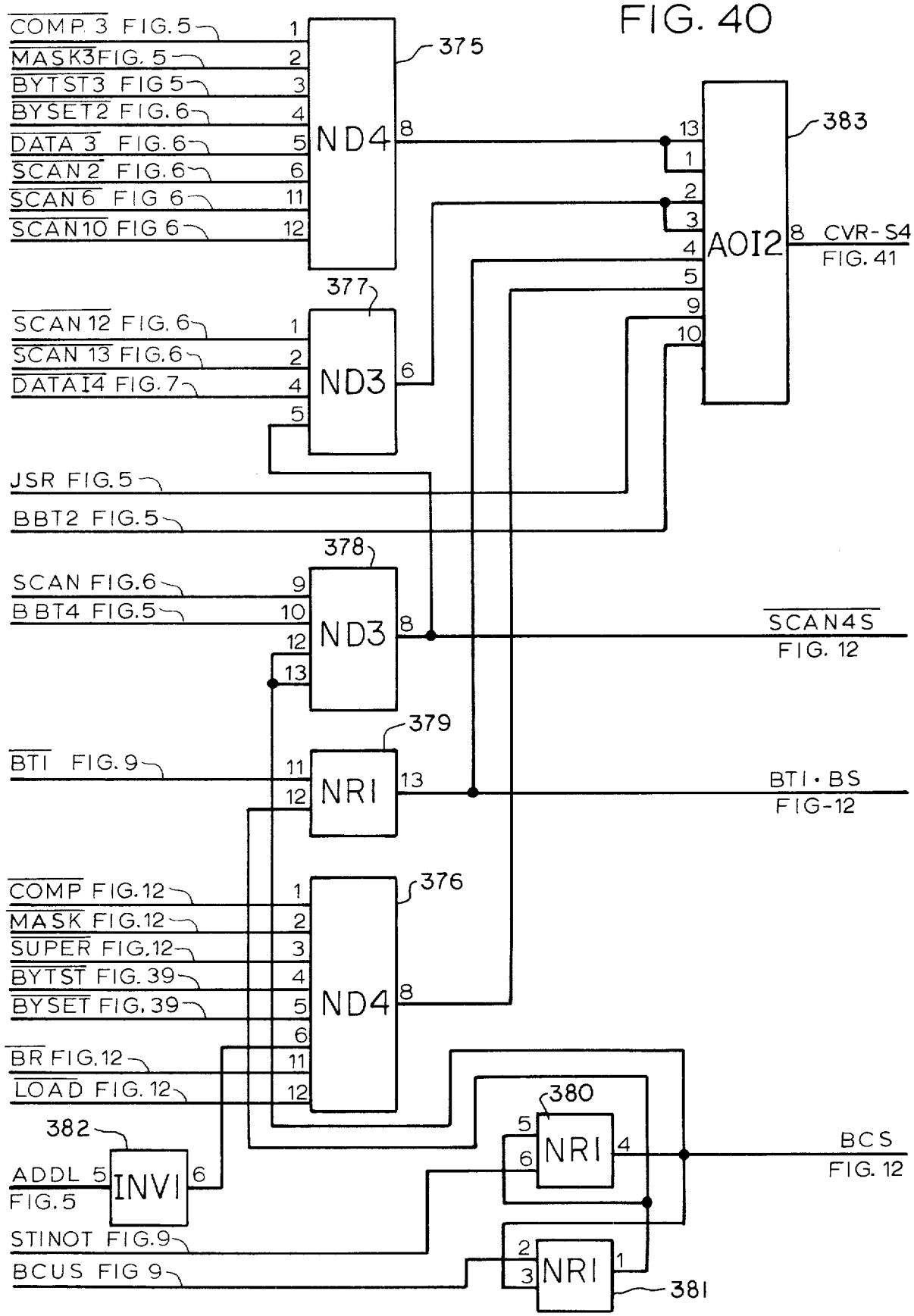

FIG. 40 comprises 7430 8-NAND gates 375 and 376, 7420 DUAL 4-NAND gates 377 and 378, 7402 QUAD 2-NOR gates 379–381, 7404 HEX INVERTER 382, and 7454 4×2 AND/OR/INVERT gate 383.

FIGS. 17, 18, 19, 20 and 21 show the major portions of the bus address register, instruction register, arithmetic logic register and accumulators corresponding to bits 1–4, 5–8, 9–12, 13–16 and 17–20 respectively.

Figure 17:
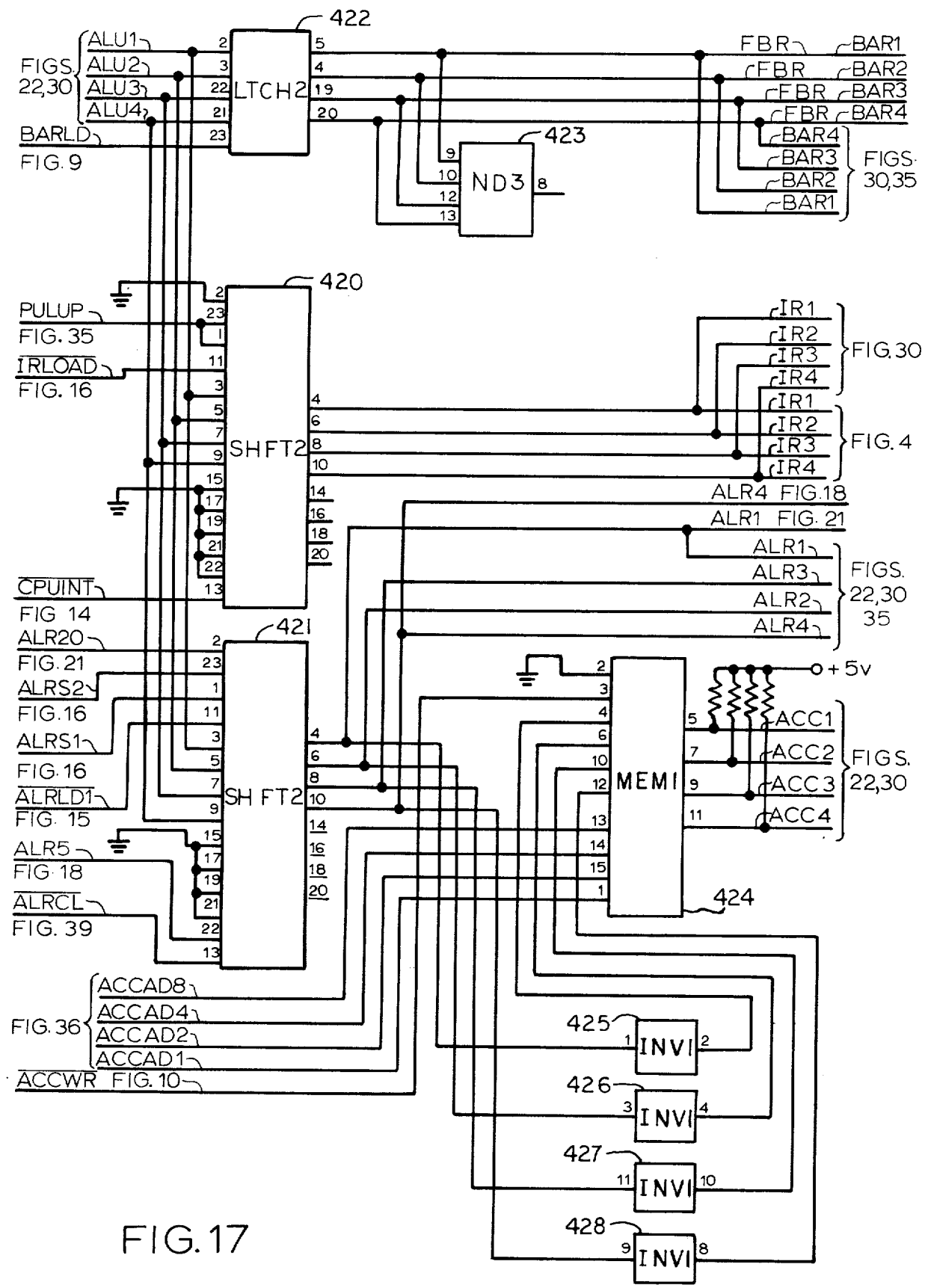
FIGS. 17–21 are detailed schematic diagrams showing the bus address register, instruction register, arithmetic logic register and accumulators of FIG. 1 in detail.
Figure 18:
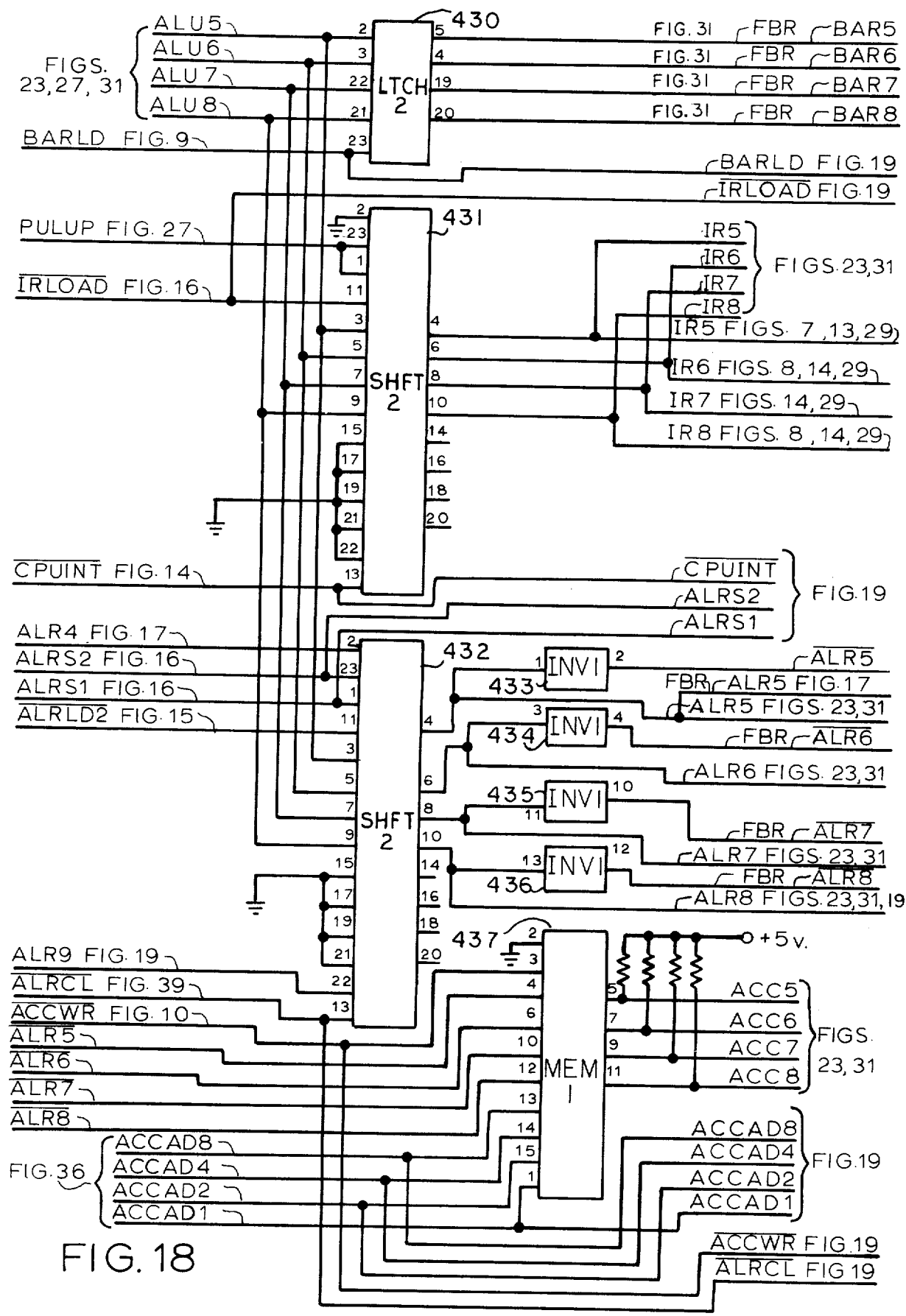
Figure 20:
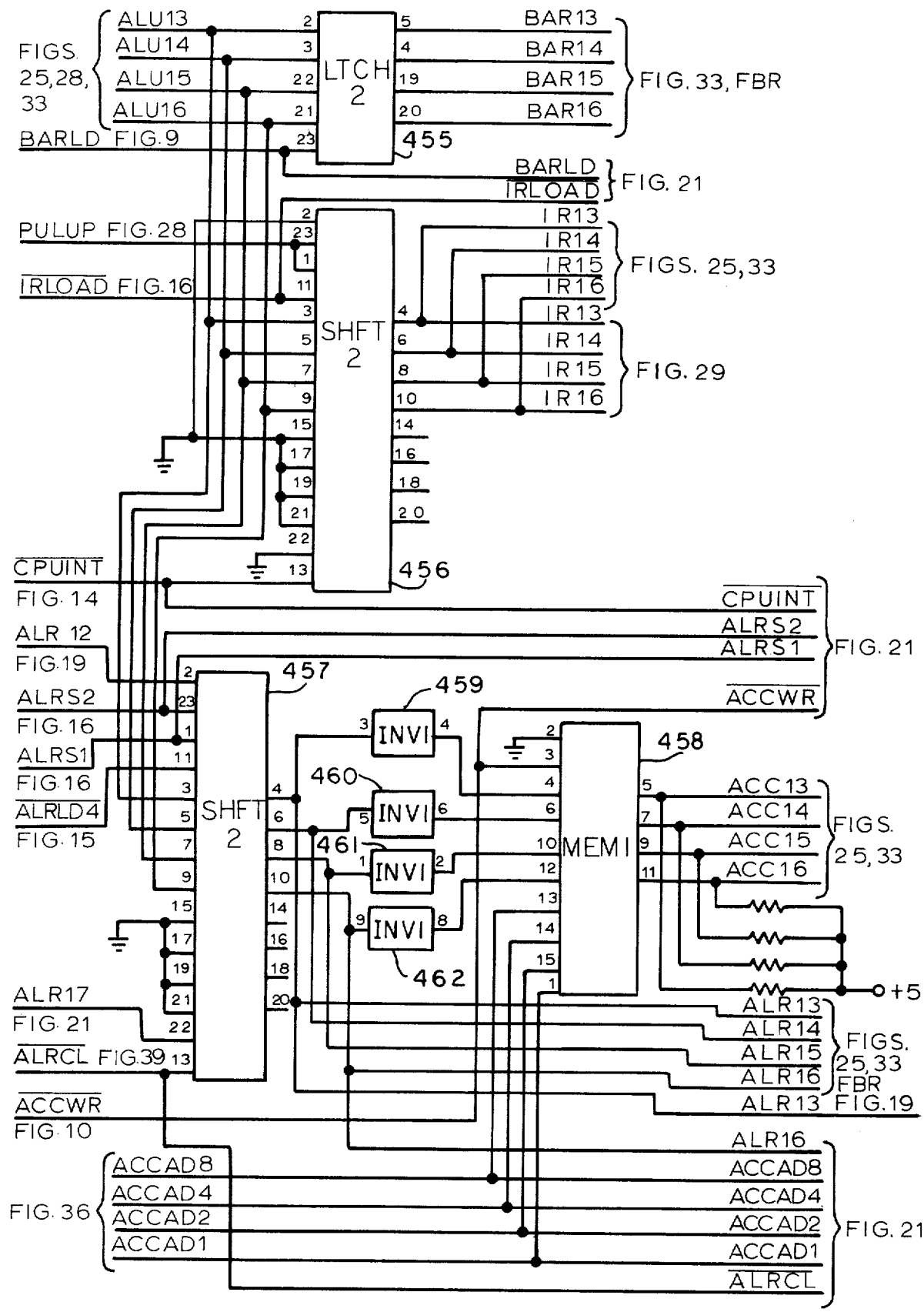
Figure 21:
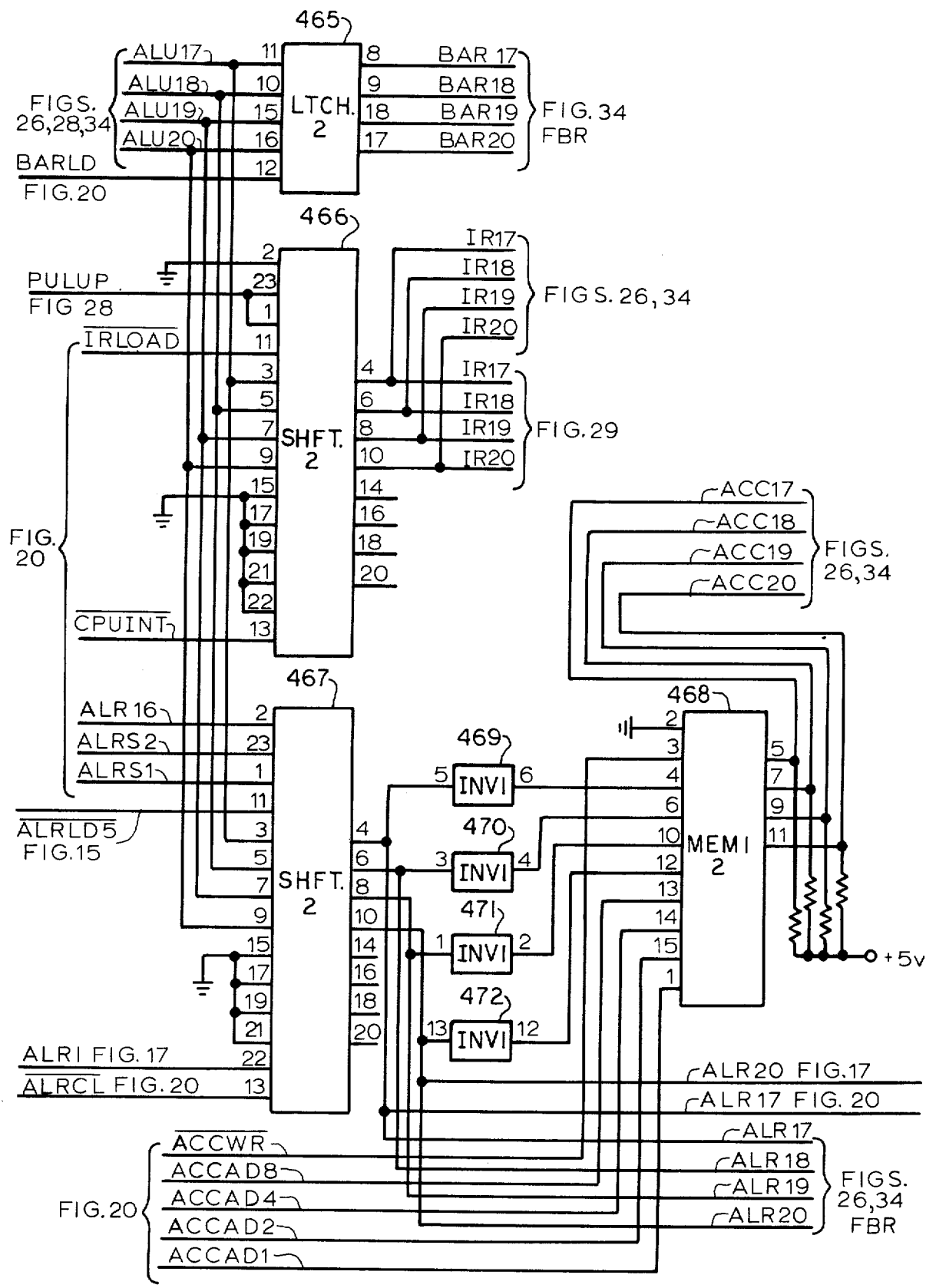

FIG. 17 comprises 74198 8-bit SHIFT REGISTERS 420 and 421, a 74100 DUAL 4-BIT LATCH 422, a 7420 DUAL 4-NAND gate 423, a 7489 16×4 RAM 424, and 7404 HEX INVERTERS 425–428. The circuit of FIG. 18 comprises 74100 DUAL 4-BIT LATCH 430, 74198 8-BIT SHIFT REGISTERS 431 and 432, 7404 HEX INVERTERS 433–436, and a 7489 16×4 RAM 437. The circuit of FIG. 19 comprises a 74100 DUAL 4-BIT LATCH 440, 74193 4-BIT UP/DOWN COUNTER 441, 74198 8-BIT SHIFT REGISTER 442, a 7420 DUAL 4-NAND gate 443, a 7489 16×4 RAM 444, and 7404 HEX INVERTERS 445–452. FIG. 20 comprises 74100 DUAL 4-BIT LATCH 455, 74198 8-BIT SHIFT REGISTERS 456 and 457, 7489 16×4 RAM 458 and 7404 HEX INVERTERS 459–462. FIG. 21 comprises 74100 DUAL 4-BIT LATCH 465, 74198 8-BIT SHIFT REGISTERS 466 and 467, 7489 16×4 RAM 468, and 7404 HEX INVERTERS 469–472.

The bus address register is a 20 bit store which is used to store the address required by the bus control unit (BCU) during a data in or data out bus cycle. The first four bits of the store stores the page number with the last 16 bits storing the address within that page. The instruction register is a 20 bit store whose function is to store instructions as they are received from the program memory. The first four bits store the present operational code being executed. The last 16 bits store information required for the execution of the operational code contained in the first four bits. The arithmetic logic register is a 20 bit store whose prime function is to store the output of the arithmetic logic unit (ALU). It also has the capability of shifting information (within the ALR) to the right in order to execute the rotate operational code. Its output acts as the "data out" lines to the bus control unit and the data lines to the accumlators. The accumulator consists of 16 scratch pad stores, each capable of storing 20 bits of information. In general, each operational code will operate on the content of one or more of these accumulators.

The arithmetic logic unit is shown in detail in the circuits of FIGS. 22, 23, 24, 25 and 26 corresponding to ALU bits 1–4, 5–8, 9–12, 13–16 and 17–20 respectively.

Figure 22:
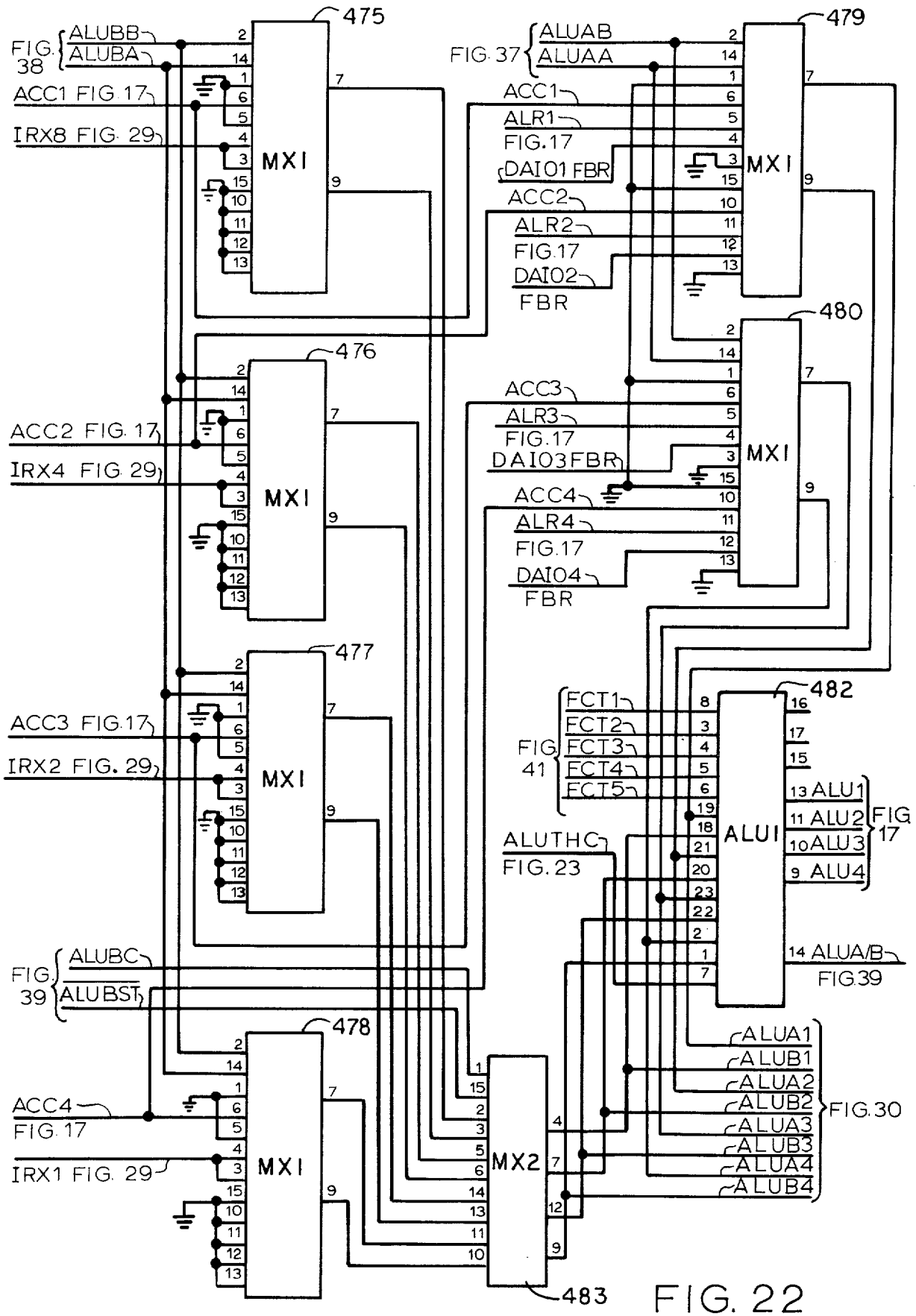
FIGS. 22–26 are detailed schematic diagrams of the arithmetic logic unit of FIG. 1.
Figure 23:
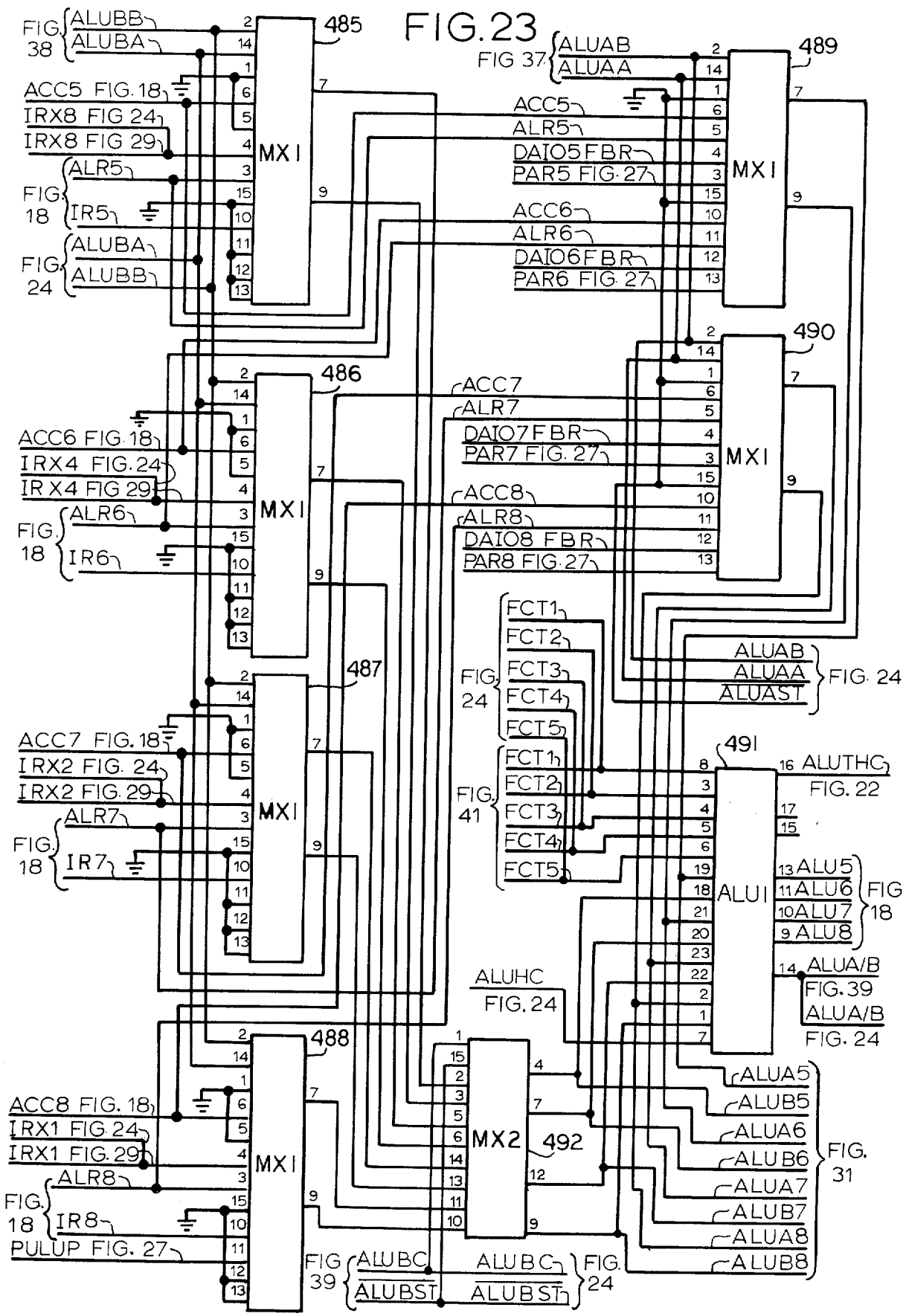
Figure 24:
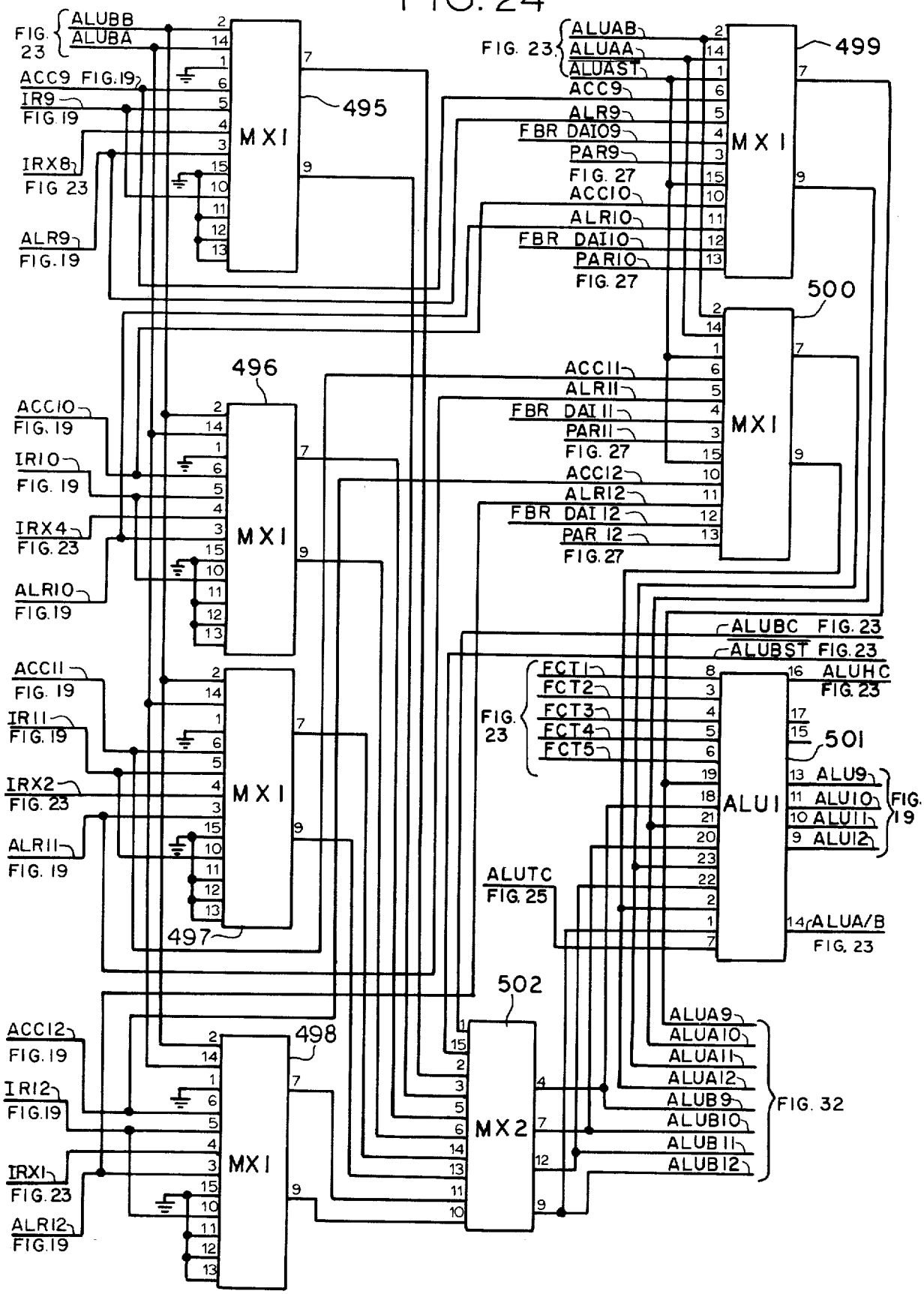
Figure 25:
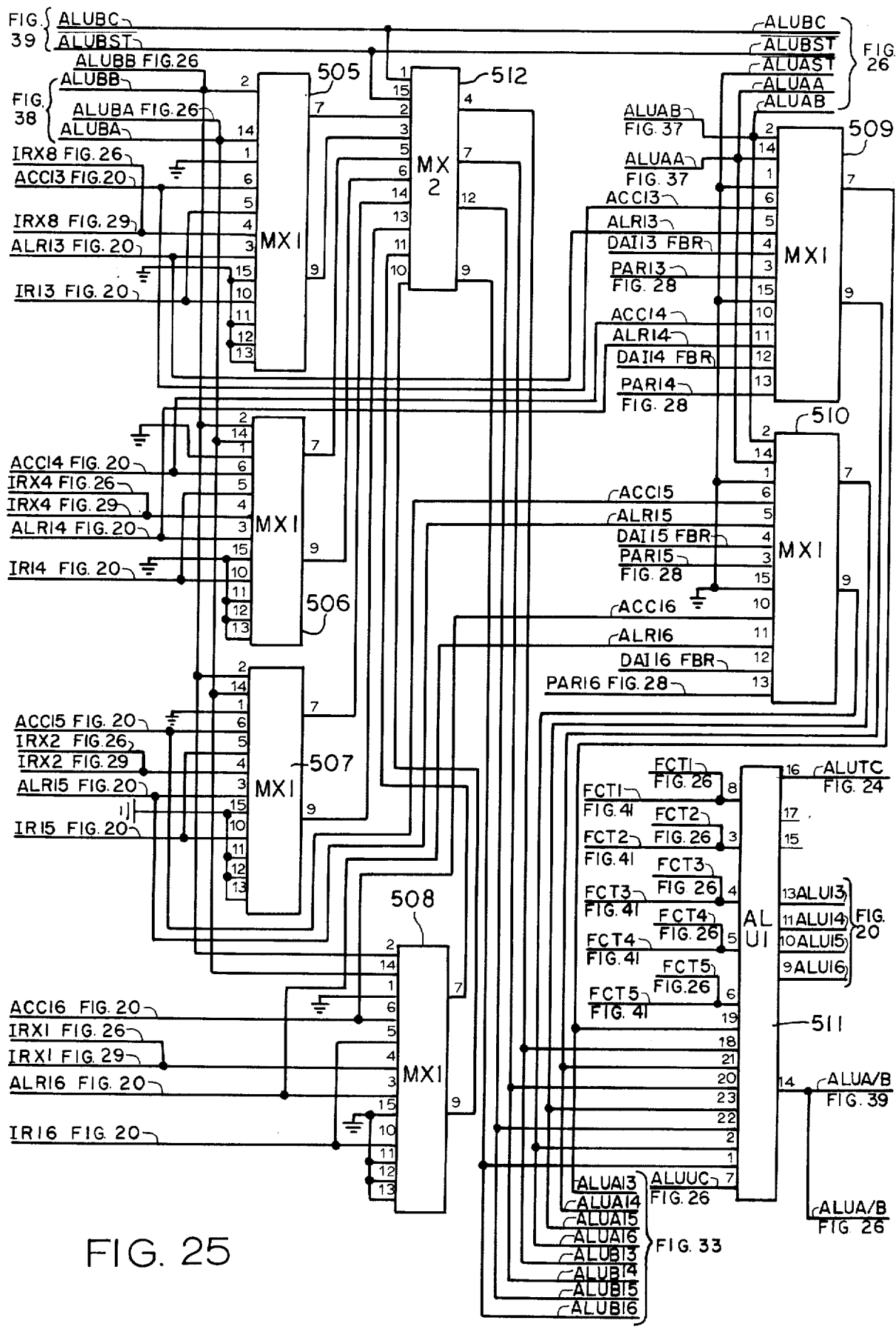
Figure 26:
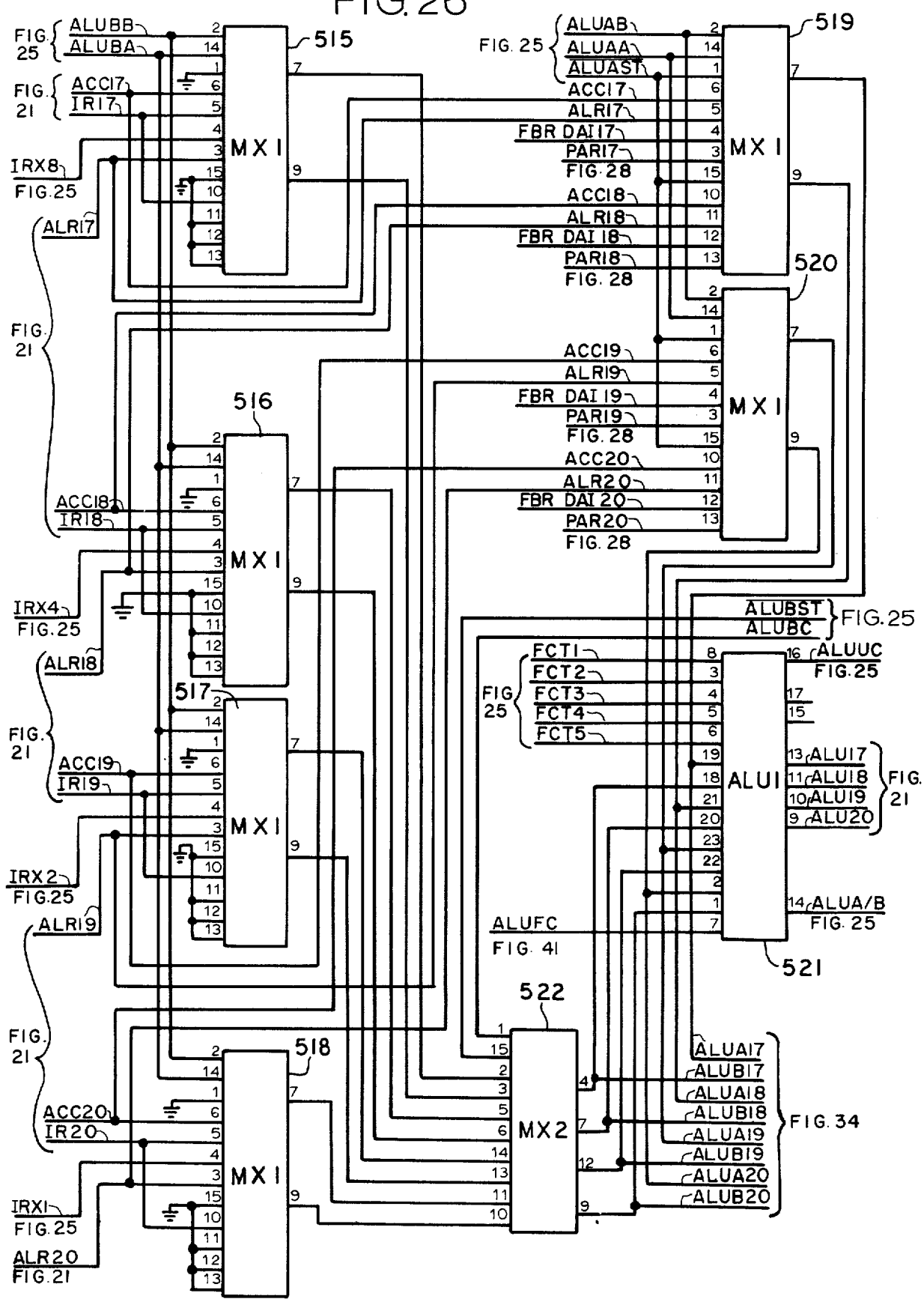

The circuit of FIG. 22 comprises 74153 DUAL 4 → 1 MULTIPLEXERS 475–480, a 74181 4-BIT ARITHMETIC AND LOGIC UNIT 482, and a 74157 QUAD 2 → 1 MULTIPLEXER 483. The circuit of FIG. 23 comprises 74153 DUAL 4 → 1 MULTIPLEXERS 485–490, 74181 4-BIT ARITHMETIC AND LOGIC UNIT 491, and a 74157 QUAD 2 → 1 MULTIPLEXER 492. The circuit of FIG. 24 comprises 74153 DUAL 4 → 1 MULTIPLEXERS 495–500, a 74181 4-BIT ARITHMETIC AND LOGIC UNIT 501, and a 74157 QUAD 2 → 1 MULTIPLEXER 502. The circuit of FIG. 25 comprises 74153 DUAL 4 → 1 MULTIPLEXERS 505–510, 74181 4-BIT ARITHMETIC AND LOGIC UNIT 511, and a 74157 QUAD 2 → 1 MULTIPLEXER 512. Lastly, the circuit of FIG. 26 comprises 74153 DUAL 4 → 1 MULTIPLEXERS 515–520, 74181 4-BIT ARITHMETIC AND LOGIC UNIT 521, and a 74157 QUAD 2 → 1 MULTIPLEXER 522.

The arithmetic logic unit is that portion of the central processor where the majority of arithmetic and logic operations are carried out during the processing of the various operational codes. The arithmetic logic unit consists of two 20 bit inputs, one 20 bit output, a single bit compare output and a function input. Either input can be connected to a selected register within the central processor. The register selected per ALU input is a function of a series of multiplexers under control of logic operations. Register inputs to ALUA input are controlled by logic functions ALUAA and ALUAB.

The register inputs to the ALUB input are controlled by logic functions ALUBA, ALUBB and ALUBC. The function performed by the ALU is controlled by the function inputs (FCT1-FCT5). The output of the ALU provides an input to the program address register, bus address register, instruction register and arithmetic logic register. Table 1 shows the ALU function control commands.

Figure 27:
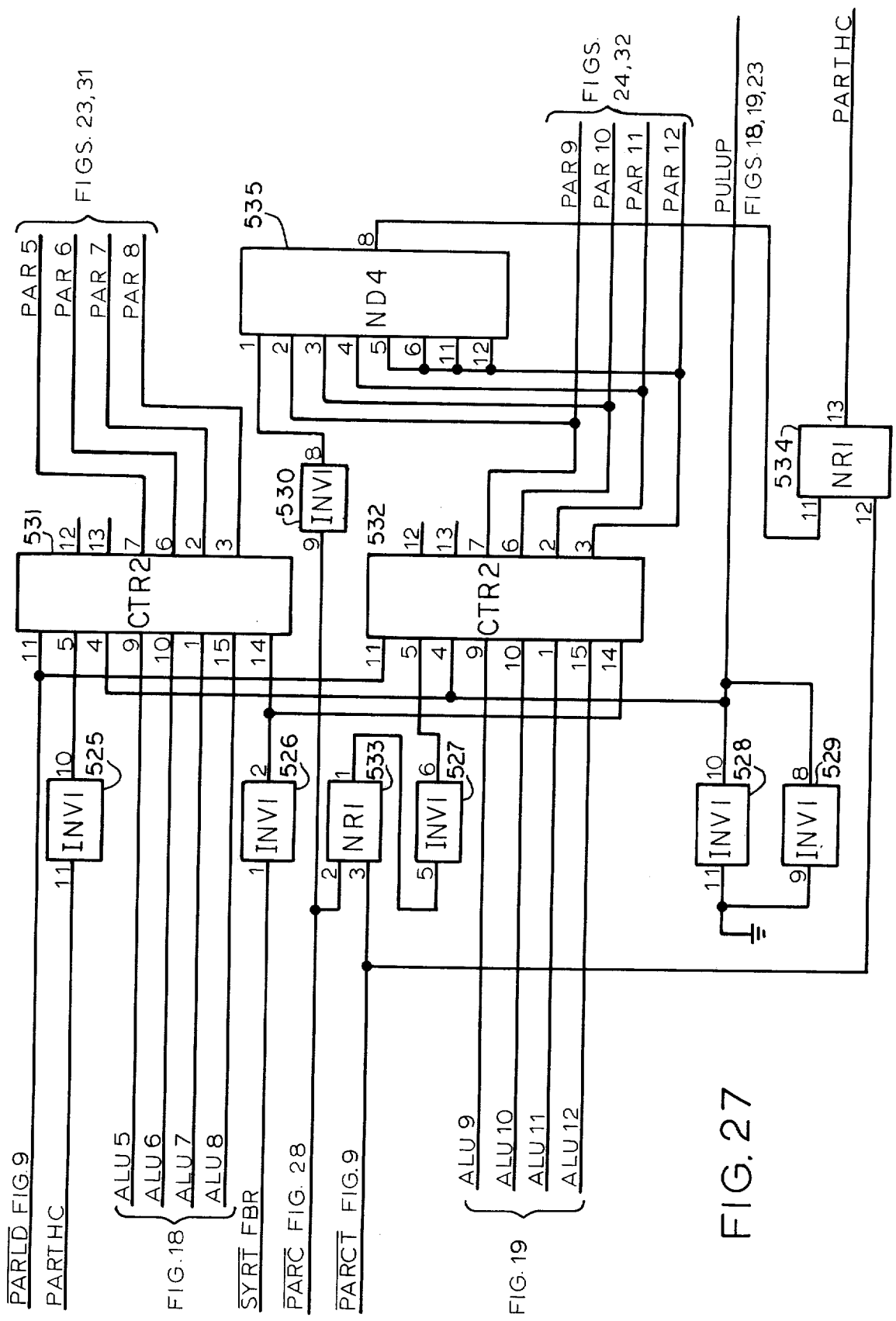
FIGS. 27–28 are detailed schematic diagrams of the program address register of FIG. 1.
Figure 28:
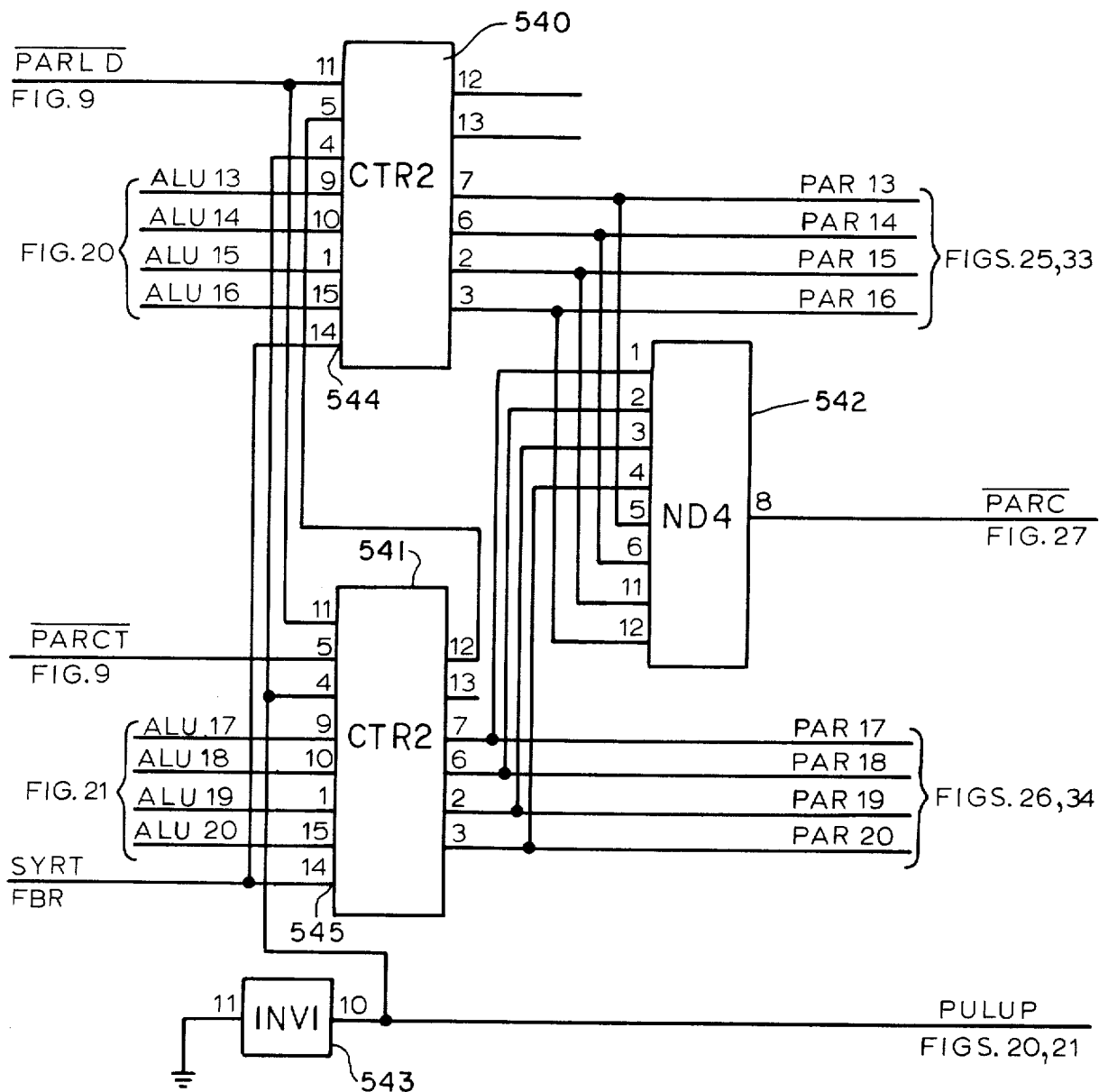

FIGS. 27 and 28 show the detailed schematic circuit diagrams of the program address register of FIG. 1. The circuit of FIG. 27 comprises 7404 HEX INVERTERS 525–530, 74193 4-BIT UP/DOWN COUNTERS 531 and 532, 7402 QUAD 2-NOR gates 533 and 534, and 7430 8-NAND gate 535. The circuit of FIG. 27 corresponds to the program address register bits 5–12.

The circuit of FIG. 28 comprises 74193 4-BIT UP/DOWN COUNTERS 540 and 541, 7430 8-NAND gate 542, and 7404 HEX INVERTER 543. The circuit of FIG. 28 corresponds to the program address register bits 13–20.

The program address register is a 16 bit binary counter (PAR bits 5–20) having a maximum possible address range of 0000-FFFF. Counters 541 and 540 of FIG. 28 are the tens and units counters respectively. Counters 532 and 531 of FIG. 27 are the hundreds and thousands counters respectively. Starting from 0000, the units counter is incremented by $\overline{PARCT}$ until count 000F is reached, after which lead CAR enables the tens counter to advance by one count to 0010. Counting continues until 00FF is reached. At count 00FF the output of NAND gate 542 ($\overline{PARC}$) goes low allowing the hundreds counter to advance by one count to 0100 on PARC . PARCT. Counting continues until 0FFF is reached. At count 0FFF the output of NOR gate 534 (PARTHC) goes high and is inverted by inverter 525 allowing the thousands counter to advance by one count to 1000. Counting continues until FFFF is reached.

The program address register can be parallel loaded with new addresses as required by the operational codes (i.e. branch instructions etc.) Parallel loading is accomplished by loading data via inputs ALU5-ALU20 upon $\overline{PARLD}$ going low.

Clearing the program address register (to address 0) is provided on $\overline{SYRT}$ at the inputs to inverter 526 for the thousands and hundreds counter and SYRT at the clear inputs 545 and 544 at the units counter 541 and tens counter 540 respectively.

Figure 29:
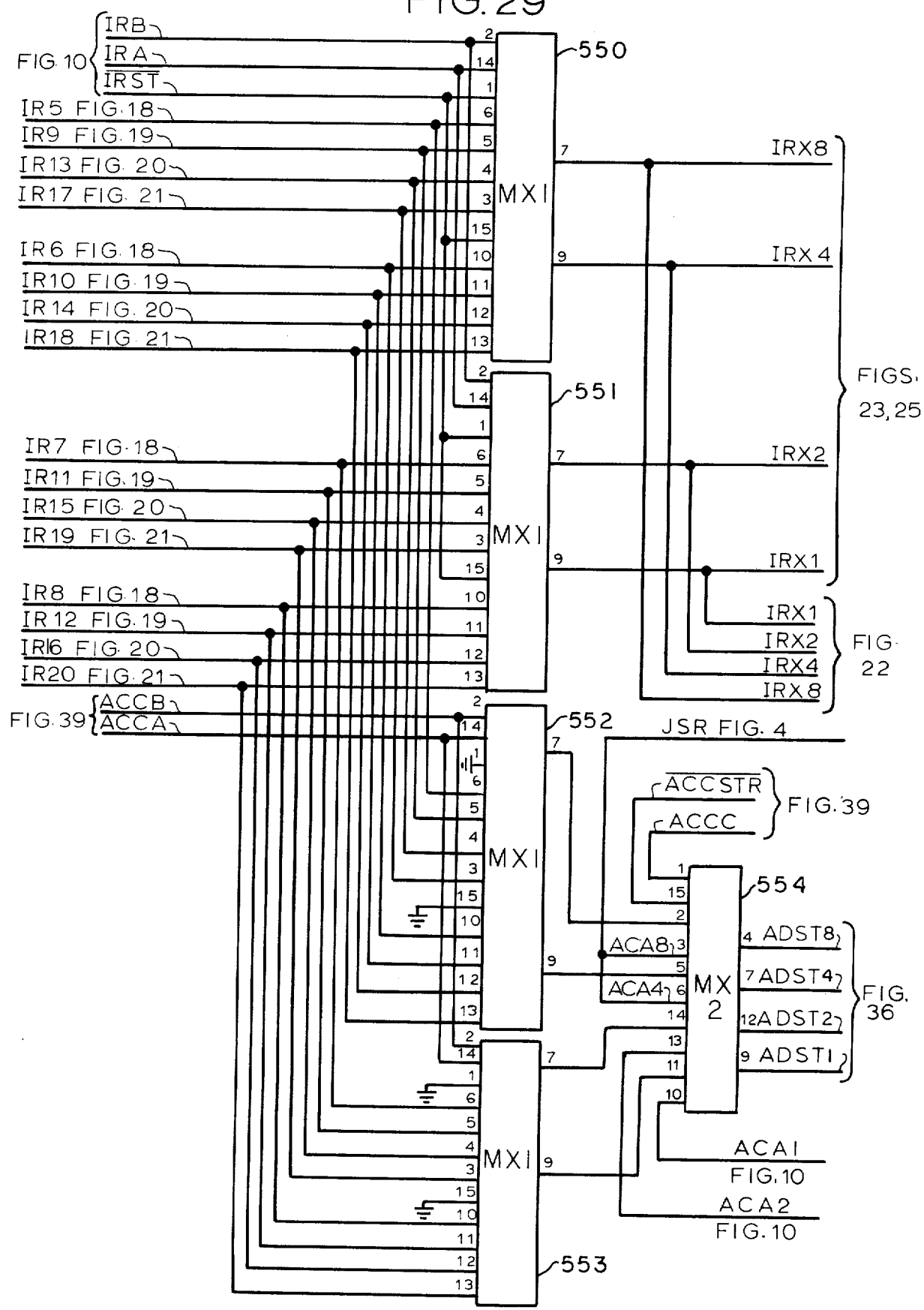
FIG. 29 is a detailed schematic diagram of the instruction register byte selector of FIG. 1 and part of the accumulator address register of FIG. 1.

Referring now to FIG. 29, there is shown a detailed schematic diagram of the instruction register byte selector and part of the accumulator address register of FIG. 1. It comprises 74153 DUAL 4 → 1 MULTIPLEXERS 550–553 and 74157 QUAD 2 → 1 MULTIPLEXER 554.

During certain operational codes it is necessary to select and change only one byte of data (4 bits). The inputs of multiplexers 551 and 550 together with control functions IRA and IRB provide the necessary IR byte selections. Outputs IRX1-IRX8 provide inputs to the arithmetic logic unit function control circuit.

During certain operational codes it is required to use a predetermined accumulator in order to read or store a specific result, Instruction register bits determine the store to be used. The inputs to multiplexers 552, 553 and 554 along with the control functions ACCA, ACCB and ACCC provide the necessary accumulator selections.

During the jump to subroutine operational code the content of the program address register is still stored in the accumulator F. Logic function inputs (ACCC, JSR, ACA2 and ACA1) to multiplexer 554 all being high define accumulator F.

Figure 30:
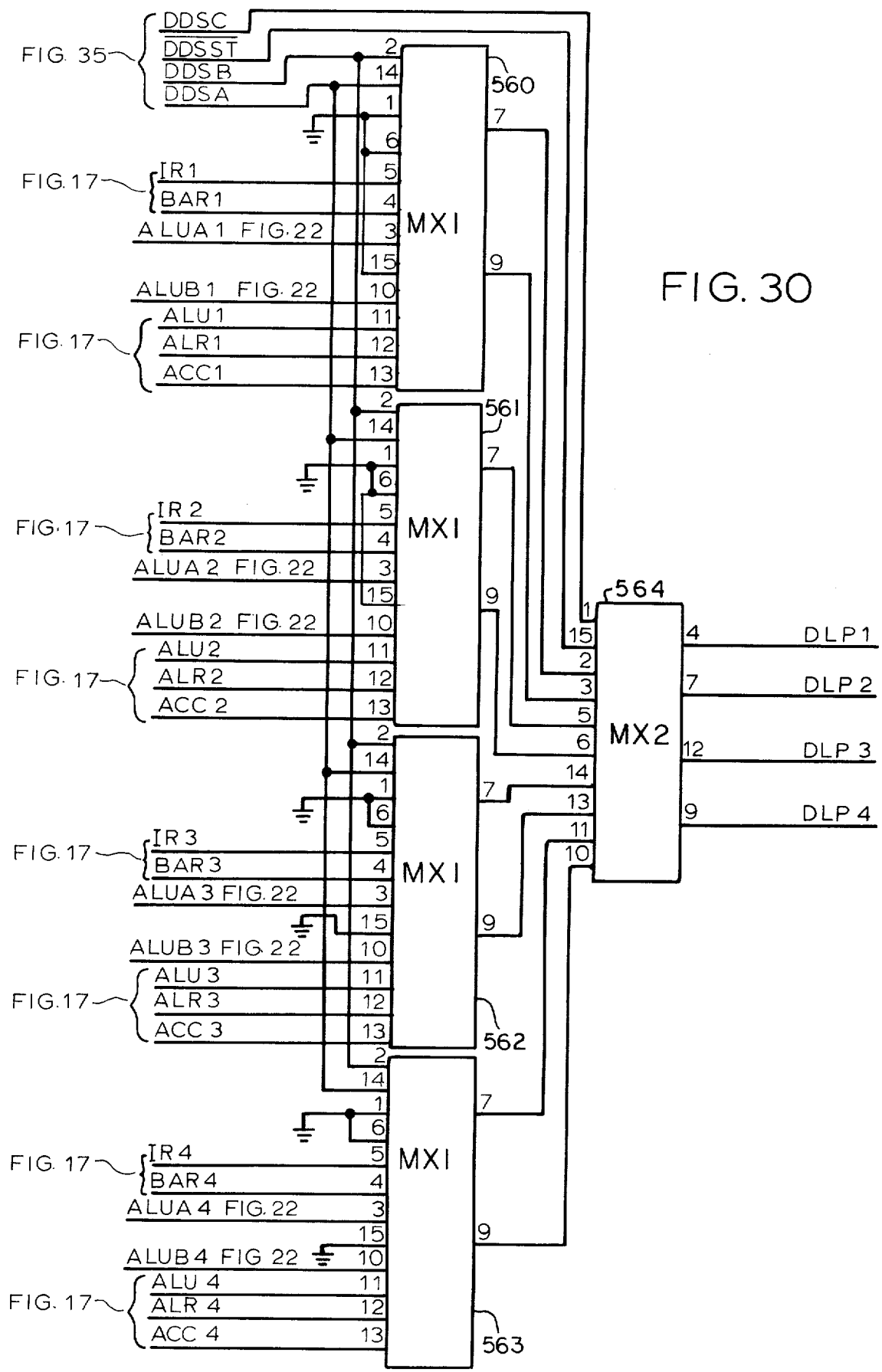
FIGS. 30–34 are detailed schematic circuit diagrams of a test panel which may be utilized to provide manual access, for display purposes, to the central processor of FIG. 1.
Figure 31:
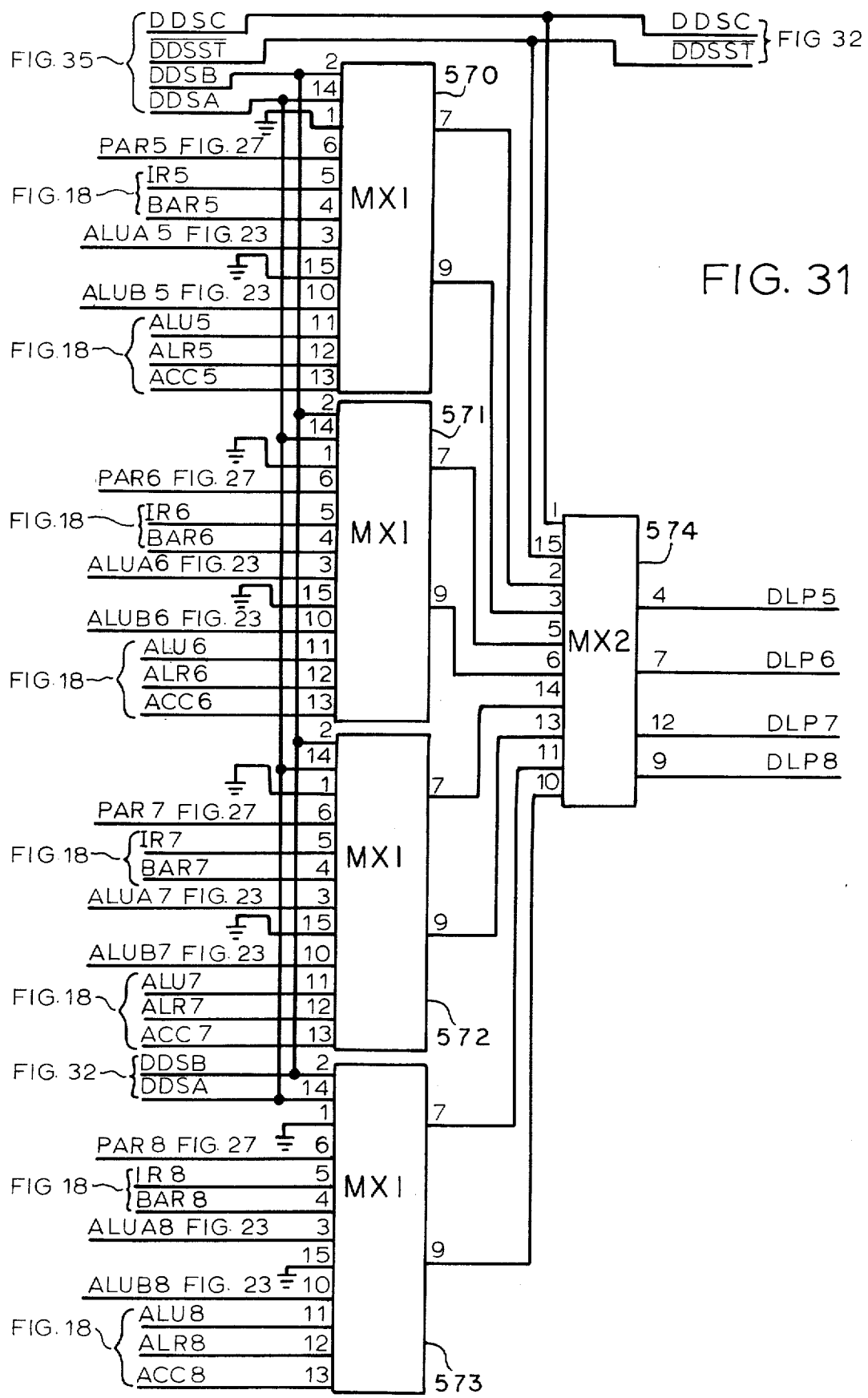
Figure 32:
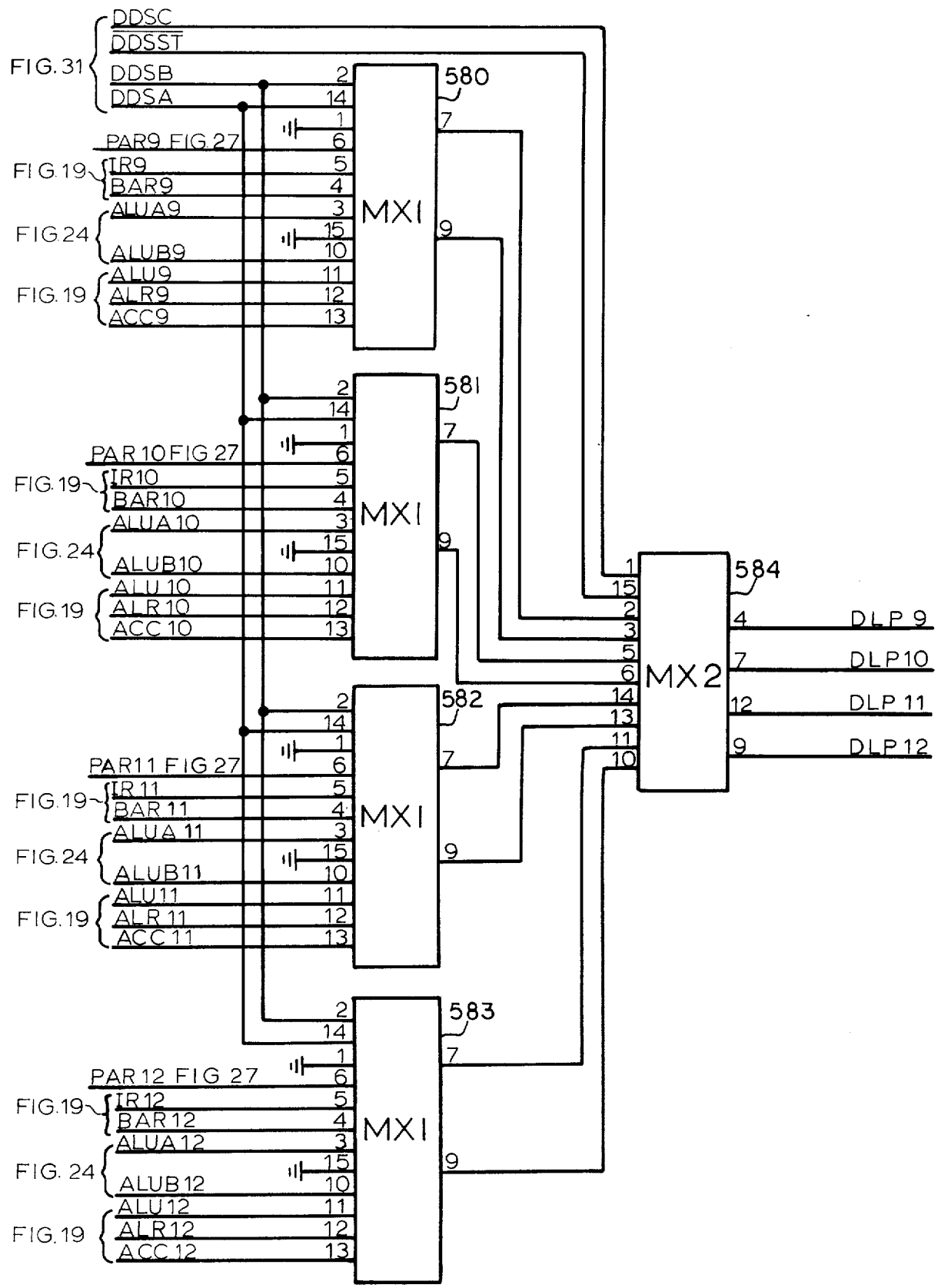
Figure 33:
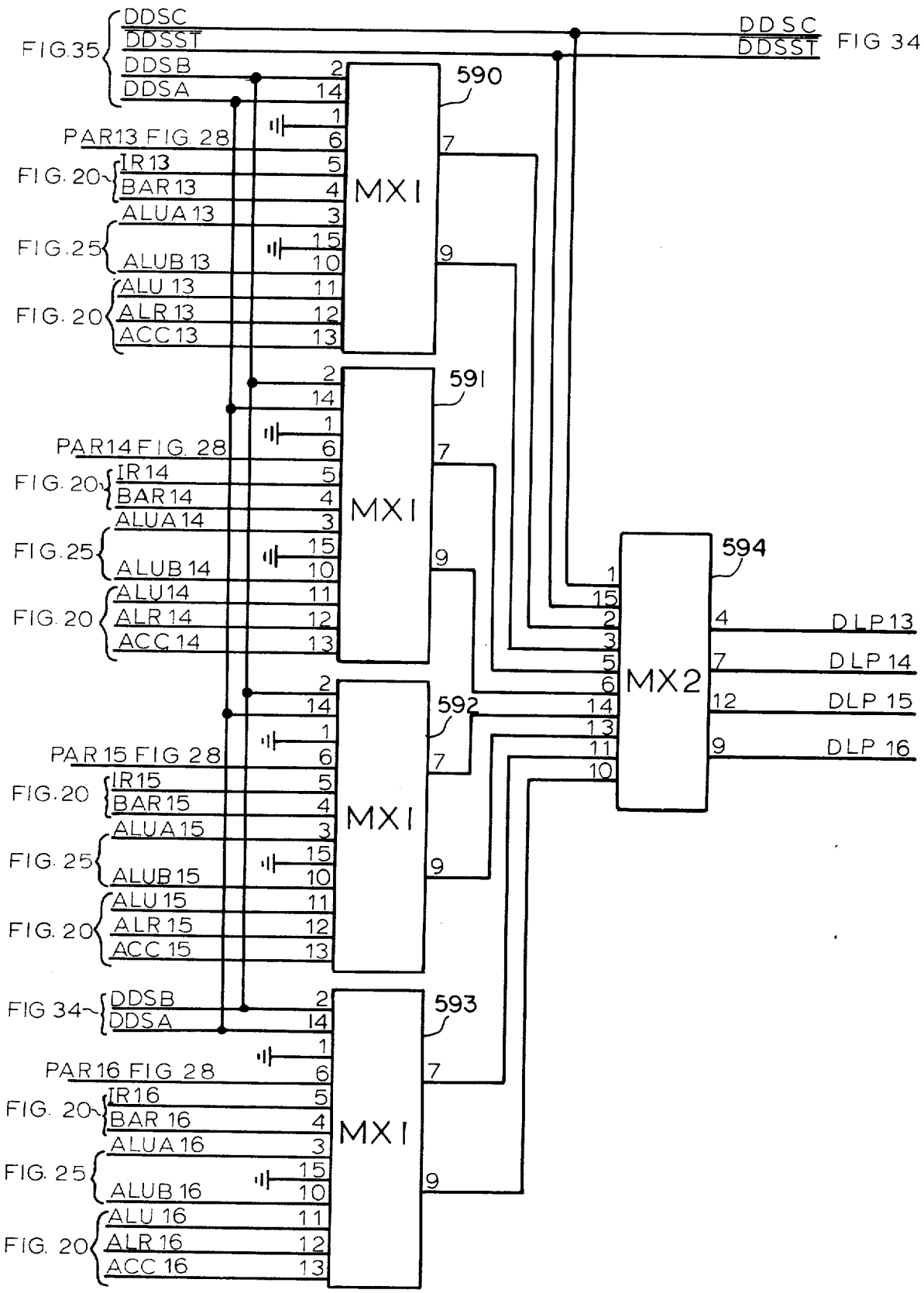
Figure 34:
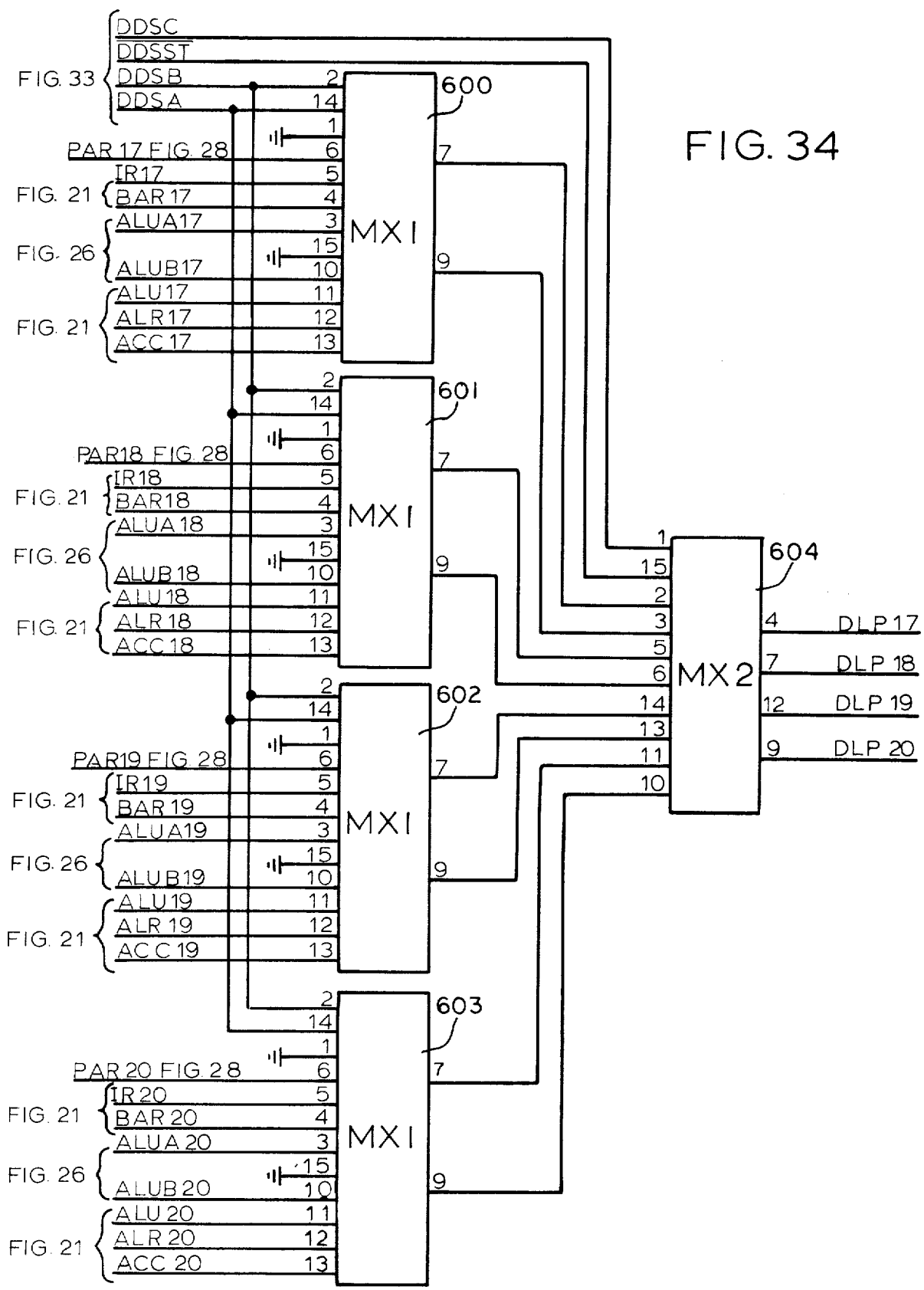

FIGS. 30–34 show detailed schematic circuit diagrams of the data display selector which is used to gate the contents of a selected register to be viewed on the data display light emitting diodes at a central processing unit test panel. These registers include program address register, instruction register, bus address register, ALU-A input, ALU-B input, ALU output, arithmetic logic register, and accumulator output. FIG. 30 corresponds to the data display selector for bits 1–4, FIG. 31 corresponds to the data display selector bits 5–8, FIG. 32 corresponds to the data display selector bits 9–12, FIG. 33 corresponds to the data display selector bits 13–16 and FIG. 34 corresponds to the data display selector bits 17–20.

The circuit of FIG. 30 comprises 74153 DUAL 4 → 1 MULTIPLEXERS 560–563 and a 74157 QUAD 2 → 1 MULTIPLEXER 564. The circuit of FIG. 31 comprises 74153 DUAL 4 → 1 MULTIPLEXERS 570–573 and a 74157 QUAD 2 → 1 MULTIPLEXER 574. The circuit of FIG. 32 comprises 74153 DUAL 4 → 1 MULTIPLEXERS 580–583 and a 74157 QUAD 2 → 1 MULTIPLEXER 584. The circuit of FIG. 33 comprises 74153 DUAL 4 → 1 MULTIPLEXERS 590–593 and 74157 QUAD 2 → 1 MULTIPLEXER 594. Lastly, the circuit of FIG. 34 comprises 74153 DUAL 4 → 1 MULTIPLEXERS 600–603 and a 74157 QUAD 2 → 1 MULTIPLEXER 604.

Selection is accomplished by the multiplexers under the control of control functions DDSA, DDSB, and DDSST. Data display selector outputs are taken to the central processing unit test panel via leads DLP1-DLP20.

Figure 35:
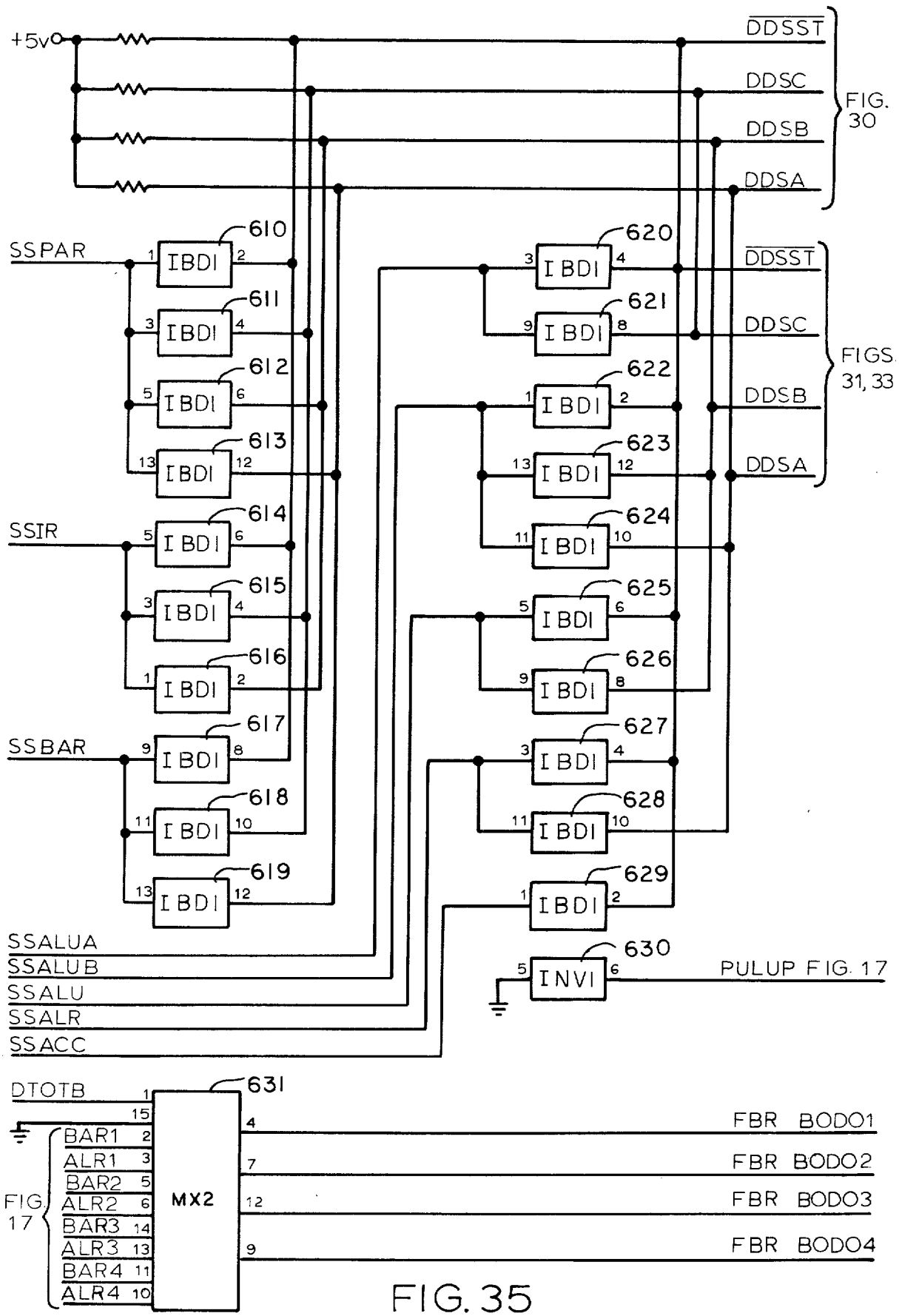
FIG. 35 is a detailed schematic circuit diagram of a portion of the test panel and of a bus control unit which may be utilized to interface the central processor of FIG. 1 to the subsystem interconnected onto the common data bus.

FIG. 35 shows another portion of the test panel. It comprises 7406 HEX INVERTER open collector buffers 610–629, 7404 HEX INVERTER 630 and 74157 2 → 1 MULTIPLEXER 631.

Control functions DDSA, DDSB, DDSC and DDSST vary from logic 1 to 0 depending upon the store selection switch operated at the central processing unit test panel. These control functions direct data flow through the multiplexers in the data display selector.

Figure 36:
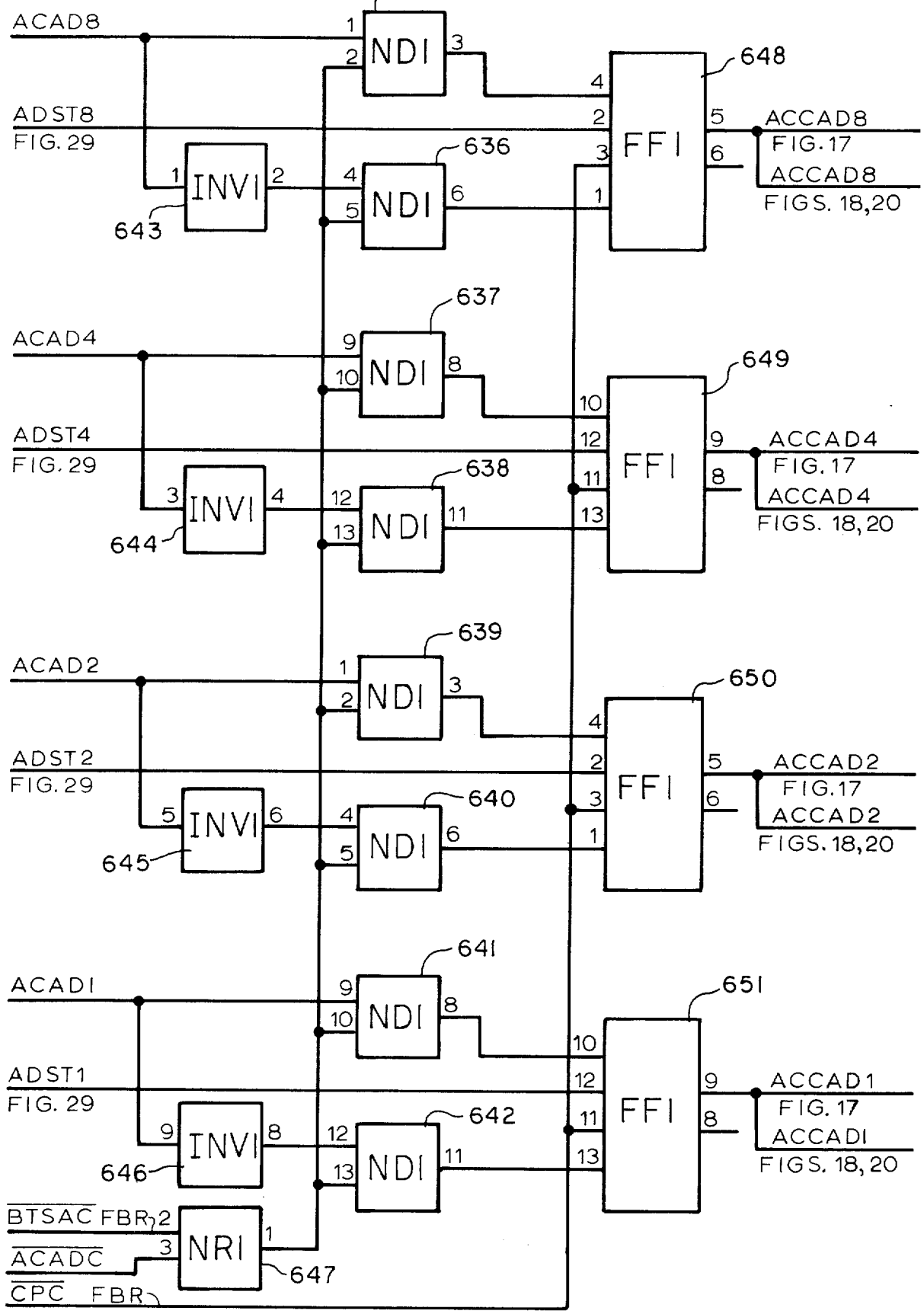
FIG. 36 is a detailed schematic diagram of the major portion of the accumulator address register of FIG. 1.

FIG. 36 shows a detailed schematic circuit diagram of part of the accumulator address register. It comprises 7400 QUAD 2-NAND gates 635–642, 7404 HEX INVERTERS 643–646, 7402 QUAD 2-NOR gate 647 and 7474 DUAL D FLIP-FLOP 648–651.

The central processor is equipped with a 16 word 20 bit scratch pad memory. Flip-flops 648–651 store the address of the accumulator currently being accessed. Outputs ACCAD8-ACCAD1 provide a hexadecimal input to the address select portion of the scratch pad memory. Accumulator addresses range from O through F. The address selected is a function of one of the following: (1) accumulator defined by instruction register bits during the processing of the operational codes (ADST8, ADST4, ADST2 and ADST1); and (2) accumulator defined by control testing switches ACC8, ACC4, ACC2, ACC1 at the central processing unit test panel (inputs ACAD8, ACAD4, ACAD2 and ACAD1). The accumulator address is gated into the flip-flops on $\overline{ADADC}$ going low (function of operating the ACCEXAM switch at the CPU test panel).

FIG. 41 is a detailed schematic circuit diagram of the function control of FIG. 1. It comprises 74157 QUAD 2 → 1 MULTIPLEXERS 660 and 661, 7400 QUAD 2-NAND gates 662 and 663, 7474 DUAL D FLIP-FLOPS 664–669, and 7440 DUAL 4-NAND BUFFERS 670–673.

The ALU function control provides the arithmetic logic unit with the proper function control during the processing of the operational code. The function to be executed is a 5-bit function defined by FCT1-FCT5. The function control leads can be applied to Table 1 in the following manner.

|      |          |
|------|----------|
| FCT1 | M (Mode) |
| FCT2 | S8       |
| FCT3 | S4       |
| FCT4 | S2       |
| FCT5 | S1       |

To facilitate a further understanding of the present invention from a software standpoint, the following Table 20 is a listing of software mnemonics as they correspond to the hardware mnemonics.

| SOFTWARE MNEMONICS | HARDWARE MNEMONICS |
|--------------------|--------------------|
| LDA                | LOAD               |
| CMP                | COMP               |
| MSK                | MASK               |
| SUP                | SUPER              |
| TST                | BYTST              |
| SET                | BYSET.IR5=1        |
| STz                | BYSET.IR5=0        |
| MOV                | DATA.IR5–8=0000    |
| AND                | DATA.IR5–8=0001    |
| ADD                | DATA.IR5–8=0010    |
| INC                | DATA.IR5–8=0011    |
| IOR                | DATA.IR5–8=0100    |
| COM                | DATA.IR5–8=0101    |
| SUB                | DATA.IR5–8=0110    |
| DEC                | DATA.IR5–8=0111    |
| LOD                | DATA.IR5–8=1000    |
| LOD+               | DATA.IR5–8=1001    |
| LOD–               | DATA.IR5–8=1010    |
| LODx               | DATA.IR5–8=1011    |
| STR                | DATA.IR5–8=1100    |
| STR+               | DATA.IR5–8=1101    |
| STR–               | DATA.IR5–8=1110    |
| STRx               | DATA.IR5–8=1111    |
| SNE                | SCAN.IR6=0         |
| SNN                | SCAN.IR6=1         |
| RTR                | ROT                |
| ADI                | ADDL               |
| BR                 | BR                 |
| BRS                | JSR                |
| BRI                | BRIND              |

While a particular embodiment of the invention has been shown and described it will be obvious to those skilled in the art that changes and modifications may be made without departing from the invention in its broader aspects, and, therefore, the aim in the appended claims is to cover all such changes and modifications as may fall within the true spirit and scope of the invention.

We claim:

1. A central processor for controlling the operation of subsystems which are interconnected on a common data bus of a telephone exchange to establish requested service between telephone subscribers, wherein the exchange includes a program memory also connected to the common data bus and containing a plurality of addressable multiple bit operational codes to be utilized by the central processor, said central processor comprising:

a program address register including means for providing and storing the address in the program memory which contains an operational code to be utilized by the central processor;

an arithmetic logic unit having an input coupled to said program address register for receiving the program memory address from said program address register, said arithmetic logic unit additionally having an output;

a bus address register having an input coupled to said arithmetic logic unit output and having an output coupled to the common data bus for receiving the program memory address from said arithmetic logic unit and for addressing the program memory at the program memory address over the common data bus to cause the program memory to transmit the operational code over the common data bus;

an instruction register having an input and an output for storing the operational code and for providing subsystem address signals responsive to the operational code;

said arithmetic logic unit input also being coupled to said common data bus for receiving the operational code and said arithmetic logic unit output being coupled to said instruction register input for transferring the operational code to said instruction register, said arithmetic logic unit also having another input coupled to said instruction register output for receiving said subsystem address signals therefrom and for transferring said subsystem address signals at said arithmetic logic unit output to said bus address register for causing said bus address register to address the subsystems corresponding to said subsystem address signals for obtaining subsystem data therefrom, and said arithmetic logic unit also including means for performing logic and arithmetic functions responsive to function control signals to provide subsystem data and control signals;

a bit time counter for providing sequential operational timing signals; and a control word generator coupled to said instruction register for providing said function control signals responsive to the operational code stored in said instruction register and coupled to said bit time counter for coacting therewith to provide said function control signals in proper time sequence.

2. A central processor in accordance with claim 1 wherein said control word generator includes detecting means for detecting selected bits of the multiple bit operational code and means responsive to said detection for providing a second multiple bit code which comprises said function control signals.

3. A central processor in accordance with claim 2 wherein said control word generator further includes means for providing said second multiple bit code having more than 5 bits and wherein said function control signals occupy 5 bits of said second multiple bit code.

4. A central processor in accordance with claim 2 wherein the operational code comprises more than four bits, and wherein said control word generator detecting means constitutes means for detecting the first four or more bits of said operational code for providing said second multiple bit code responsive to said four or more bits of said operational code.

5. A central processor in accordance with claim 4 wherein the operational code comprises twenty bits and wherein said instruction register comprises a twenty bit store for storing the operational code which comprises said twenty bits.

6. A central processor in accordance with claim 1 further comprising an instruction register byte selector coupled to said instruction register and to said arithmetic logic unit for selecting an individual group of bits of the operational code to cause said arithmetic logic unit to perform a specific preselected function responsive to said selected individual group of bits.

7. A central processor in accordance with claim 6 wherein said instruction register byte selector includes means for selecting individual groups of four bits of said operational code.

8. A central processor in accordance with claim 1 further comprising an arithmetic logic register having an input coupled to said arithmetic logic unit output for storing intermediate data results provided by said arithmetic logic unit.

9. A central processor in accordance with claim 8 wherein said arithmetic logic register is additionally coupled to said control word generator, said control word generator additionally constituting means for conditioning said arithmetic logic register to receive said intermediate data from said arithmetic logic unit.

10. A central processor in accordance with claim 8 wherein said arithmetic logic register has an output coupled to said arithmetic logic unit inputs for transferring said intermediate data to said arithmetic logic unit for further processing.

11. A central processor in accordance with claim 10 wherein said arithmetic logic register output is additionally coupled to the common data bus for transferring the intermediate data to the exchange subsystems.

12. A central processor in accordance with claim 8 further comprising a plurality of accumulators coupled to said arithmetic logic register for receiving and storing the intermediate data.

13. A central processor in accordance with claim 12 wherein each of said accumulators has an output coupled to said arithmetic logic unit for transferring said intermediate data to said arithmetic logic unit for further processing.

14. A central processor in accordance with claim 12 further comprising an accumulator address register coupled to each of said accumulators for selecting a particular one of said accumulators for storing said intermediate data.

15. A central processor in accordance with claim 14 wherein said accumulator address register is additionally coupled to said control word generator for selecting said particular accumulator in response to said control word generator.

16. A central processor in accordance with claim 15 wherein said control word generator includes means for providing a second multiple bit code responsive to the operational code and wherein said accumulator address register includes means for selecting said particular accumulator in response to said second multiple bit code.

17. A central processor in accordance with claim 14 further comprising an instruction register byte selector coupled to said instruction register for selecting individual bytes of the operational code and wherein said accumulator address register is coupled to said instruction register byte selector and includes means responsive to the selected bytes of the operational code selected by said instruction register byte selector for selecting said particular one of said accumulators for storing said intermediate data.

18. A central processor in accordance with claim 12 wherein said plurality of accumulators comprise sixteen accumulators, each said accumulator being a twenty bit store.

19. A central processor in accordance with claim 1 wherein each operational code requires a plurality of operations initiated by said bit time counter, and wherein said bit time counter includes inhibiting means for inhibiting initiation of an operation until the previous operation is completed.

20. A central processor in accordance with claim 1 wherein said program address register is a multiple bit store coupled to said control word generator and wherein said program address register is sequentially incremented by said control word generator to provide said program address register with sequential program memory addresses.

21. A central processor in accordance with claim 1 wherein said arithmetic logic unit additionally includes means responsive to certain ones of said operational codes for providing said program address register with a specific program memory address.

* * * * *

UNITED STATES PATENT AND TRADEMARK OFFICE
CERTIFICATE OF CORRECTION

PATENT NO. : 3,965,458
DATED : June 22, 1976
INVENTOR(S) : R.A. BORBAS, J.P. DUFTON, J.H. FOSTER & J.W. SEIGEL It is certified that error appears in the above-identified patent and that said Letters Patent are hereby corrected as shown below:

Title Page [75] "JEFFREY W. SIEGEL" should be --
JEFFREY W. SEIGEL --

Signed and Sealed this

Twenty-eighth Day of September 1976

[SEAL]

Attest:

RUTH C. MASON
Attesting Officer

C. MARSHALL DANN
Commissioner of Patents and Trademarks